INVENTORS: P. R. GRAY
P. L. WEDDING
BY [signature]
ATTORNEY

Aug. 8, 1967 P. R. GRAY ETAL 3,335,231

SWITCHING SYSTEM USING MOMENTARY ON-HOOK SIGNALING IN ANSWERED TRUNK TO DETECT ABANDONED CALL

Filed April 27, 1964 19 Sheets-Sheet 8

United States Patent Office 3,335,231

Patented Aug. 8, 1967

3,335,231

SWITCHING SYSTEM USING MOMENTARY ON-HOOK SIGNALLING IN ANSWERED TRUNK TO DETECT ABANDONED CALL

Preston R. Gray, Elmhurst, N.Y., and Paul L. Wedding, Louisville, Ky., assignors to Bell Telephone Laboratories, Incorporated, New York, N.Y., a corporation of New York Filed Apr. 27, 1964, Ser. No. 362,672
20 Claims. (Cl. 179—27)

ABSTRACT OF THE DISCLOSURE

An automatic step-by-step telephone switching system for sequentially connecting calling trunks through trunk finders and attendant trunks to attendant positions. Trunk and position gates regulate call distribution. Reproduced machine announcement informs a connected attendant as to the calling trunk area of origin. Trunk usage and abandoned calls are counted. Reproduced machine announcement notifies a caller of any delay in connecting to an attendant. Calling trunks previously answered by delay announcement machine are tested for abandonment of call before completing an attendant connection.

This invention relates generally to switching systems and particularly to abandoned call detection for switching systems.

Detection of abandoned calls has been known in the art for some time and has generally taken the form of means for detecting whenever a calling signal or calling condition disappears before an answer condition occurs. Once a call, evidenced by a calling signal familiary known in the art as an "off-hook" condition, has been answered in one form or another, the disappearance of the calling condition, such as a change from an "off-hook" condition to an "on-hook" condition of the calling end of a connection, is interpreted by the switching equipment as a normal release, and not an abandonment since an answer has already occurred.

At least one area of the switching art where the above latter-mentioned circumstance has not been considered as a normal release is in the well-known call distributor art. The latter will be recognized as the type of switching system particularly useful in department stores or airline reservation bureaus, or the like, where calls incoming to the facility are routed to administrative people, such as order clerks or reservation clerks, whereby the calling party may place an order, secure information, reserve an airplane ticket, et cetera. It has been known for some time in such art, and in other switching systems also, that delay may occur before a number of concurrent calls can be completed to regular answering circuits. In such circumstances, prerecorded machine announcements (or live announcements in some cases) have been used as special answering circuits to inform calling parties of the delay. Such calling parties may thereupon hang up (disconnect or go "on-hook") or wait for a regular answer. Traffic personnel have been interested in knowing not only how many calls are abandoned before any answer but also how many calls are "abandoned" after such an announcement but before a regular answer.

One of the objects of the present invention is to enable a count to be made not only of calls abandoned before any answer but also of calls abandoned after a special answer, such as a delayed answer announcement, but before a regular answer, such as to an attendant.

Where a call is first incoming to a call distributor, the latter recognizes an off-hook signal from the central office incoming on a circuit such as a trunk extending from the central office to the call distributor. Until the calling trunk is answered at the call distributor, the trunk provides toward the central office an on-hook signal indicating an unanswered condition. If the calling trunk is "answered," either by a regular attendant position or by a machine or live announcement of a delay, the calling trunk changes the on-hook signal to an off-hook signal back toward the central office, where such signal is recognized as a complete answer requiring a charge to be made. If the calling party chooses to remain off-hook thereafter, the call distributor will eventually complete the specially answered trunk to a regular attendant. If the calling party disconnects after the announcement, there may be a substantial delay before the central office can send an on-hook disconnect signal to the call distributor, particularly where so-called joint control (calling and called) of release is involved. During such a delay, the call distributor may try to complete to a regular attendant what appears to be a legitimate calling trunk, only to have the distributor attendant find no one on the other end of the call. Such use of attendants is most inefficient, not to mention the fact that such circumsances are most annoying to attendants.

It is another object of the present invention to prevent completing calls to attendants where calling party disconnect has taken place.

The above objects are accomplished in the disclosed exemplary embodiment of the invention by momentarily changing the off-hook signal of a specially answered (such as a machine announcement) trunk to an on-hook signal back toward the central office just prior to completing the calling trunk to an attendant. If the calling party has disconnected, the incoming trunk at the call distributor will collapse preventing completion of the call; whereas, if the calling party has not disconnected, the call distributor will complete the call. The aforementioned collapse of the trunk circuit will cause a count to be made of a call abandoned after a delayed answer announcement and will preclude the inefficient and annoying connection of the trunk to an attendant.

In switching systems involving calling party control only, a disconnect (going on-hook) by a calling party after a delayed answer announcement will ordinarily cause the calling condition (off-hook signal) to be removed very quickly at the incoming end of the call distributor. However, such central offices must always determine whether a calling party on-hook signal is legitimate or merely a "switch-hook-fumbling" situation. This necessitates a timed release before the central office can send an on-hook signal to the call distributor. This sort of timed release is merely a matter of milliseconds, being controlled generally by the release time of slow-release relays.

On the other hand, in switching systems involving joint control (calling and called party control), the central office circuitry will maintain an off-hook signal toward a call distributor incoming trunk which has been answered even though the calling party may have disconnected. However, the calling party disconnect will start a fairly long timing interval (perhaps 15 to 30 seconds), at the end of which time the central office will send the call distributor an on-hook signal.

While not necessarily limited thereto, the present invention is especially adapted for use in the latter-mentioned situation to prevent the connection to a call distributor attendant of a "calling" trunk during that relatively long central office time-out period where the calling party has actually disconnected but where the central office is maintaining an off-hook signal to the "answered" trunk at the call distributor. It will be appreciated by those skilled in the art that the invention is also useful in other joint control systems having no calling party disconnect time-out feature, wherein an established connection (both calling party and call distributor off-hook) will never release (except under manual control of a maintenance man) due to only the calling party going on-hook.

The principal feature of the present invention, whereby the foregoing objects are accomplished, is the provision in a switching system wherein a calling circuit has been specially answered of means for momentarily sending an on-hook signal toward the calling facility to test for calling party disconnect before connecting the calling circuit to a regular answering circuit. The exemplary embodiment uses impedance signaling, a relatively high impedance for on-hook and a relatively low impedance for off-hook. It will be appreciated by those skilled in the art that other types of signaling may be used as well.

The objects and features of the invention will be more fully appreciated by the following detailed description of the exemplary embodiment set forth in the drawings wherein.

Figure 2:
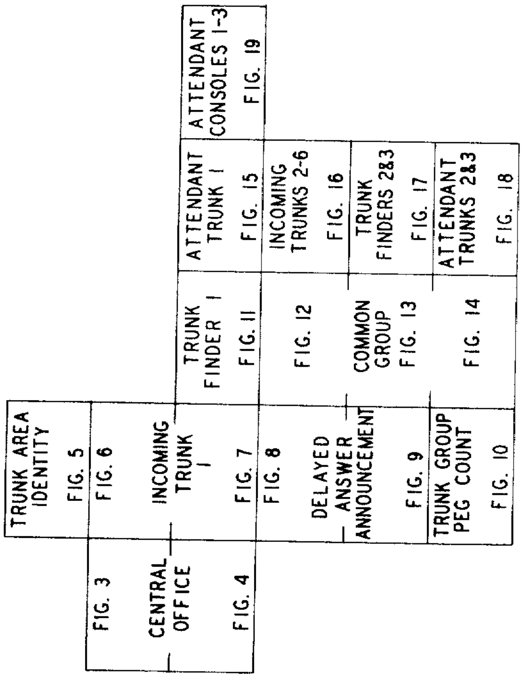
FIG. 2 shows how FIGS. 3 through 19 may be arranged to disclose the details of a step-by-step type of automatic call distributor embodying the invention and how a typical central office may be connected thereto.
Figure 1:
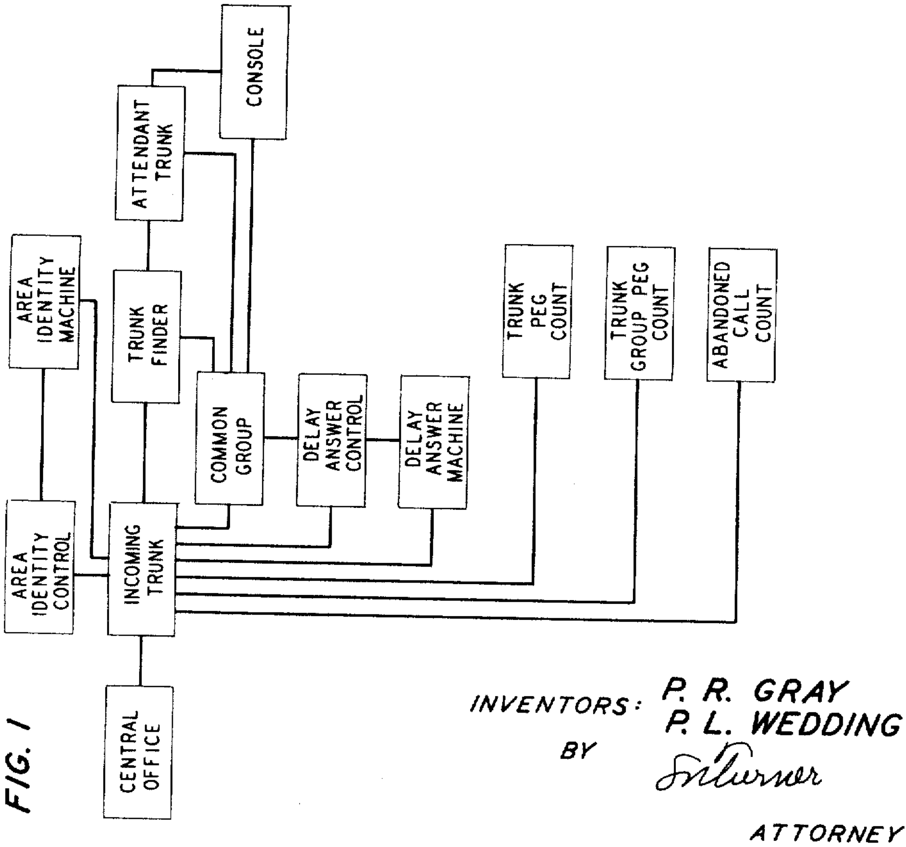
FIG. 1 shows a block diagram of the main functional parts of the disclosure.
Figure 1A:
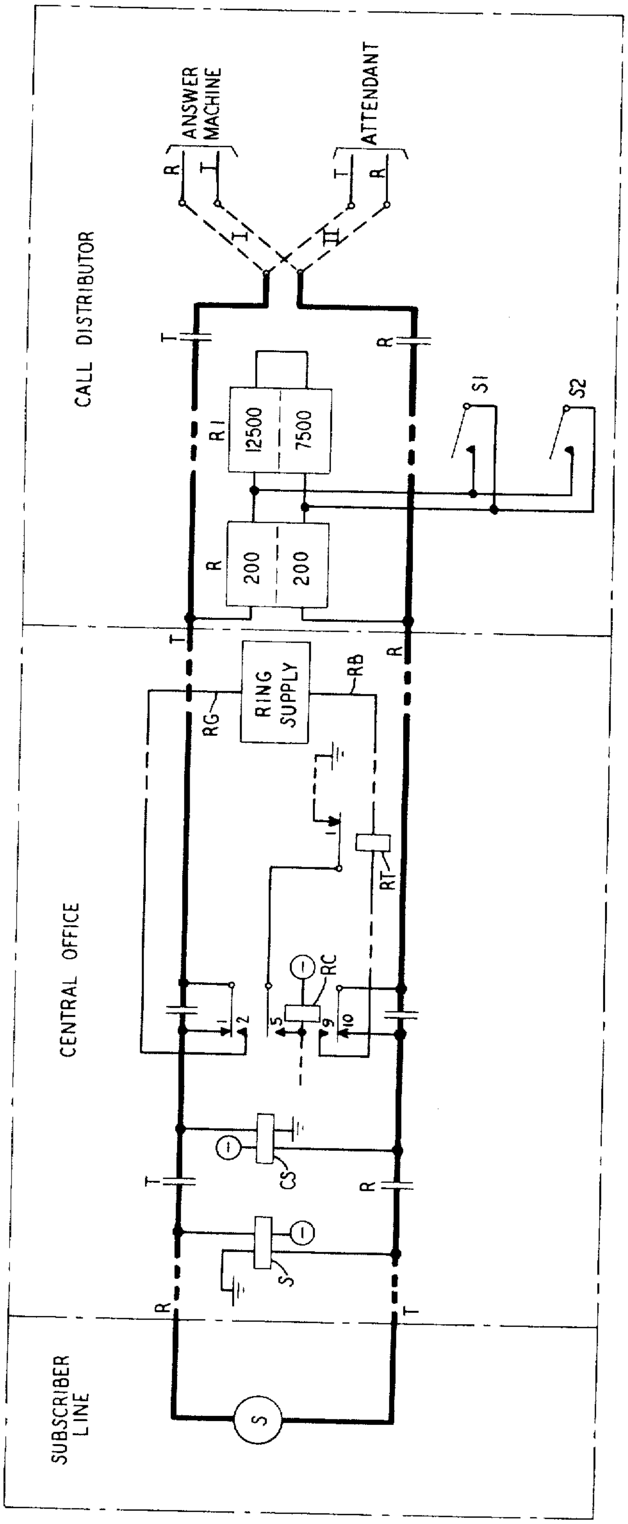
FIG. 1A is a skeletonized feature sketch with respect to which the basic signaling feature of the invention may be understood.

The following description of the exemplary embodiment illustrated in the drawings is organized as follows:

*Block diagram—FIG. 1*
*Feature sketch—FIG. 1A*
*Detailed description—regular answer* (Attendant).—Main Components . . . Start Conditions . . . Console Ready . . . Control Ready . . . Central Office Initiates Call . . . Incoming Trunk Detects Call . . . Trunk Call Enters Trunk Gate . . . Trunk Finder Seizes Trunk . . . Call Completed to Attendant Console . . . Central Office Ringing Trip . . . Trunk Area Identification . . . Release of Connection.
*Detailed description—special answer* (Machine).—Delayed Answer Time-Out . . . Release Before Answer . . . Delayed Answer Announcement . . . Trunk Finder Siezes Trunk . . . Calling Party Disconnect Test . . . Controlled Release of Abandoned Call . . . Trunk Finder Shower.

Figure 3:
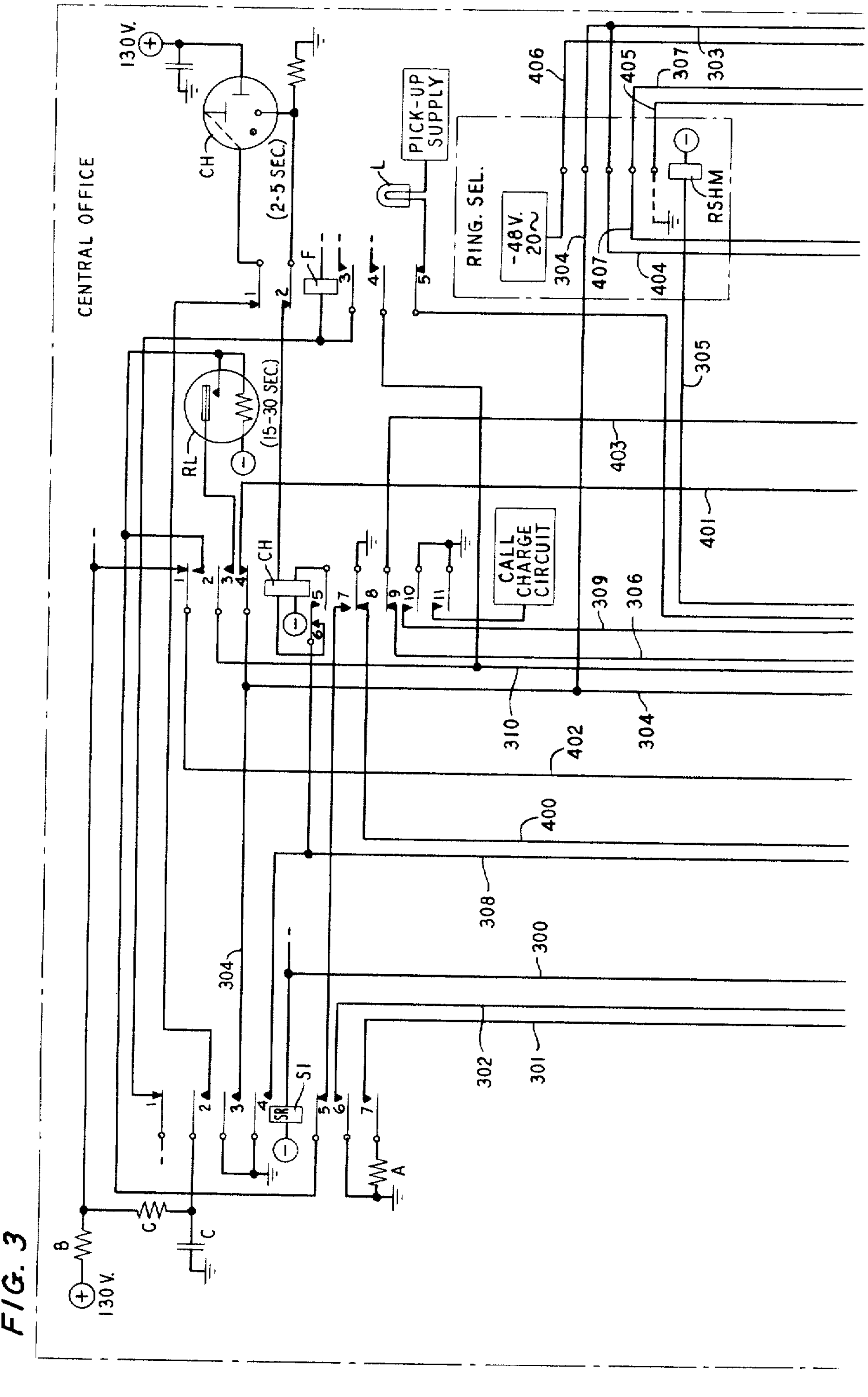
FIGS. 3 and 4 show sufficient circuitry of a typical central office to enable an understanding of the invention.

In the following description certain conventions are used as follows:

(1) a parenthetical number after a functional apparatus reference number or character indicates the number of the drawing figure wherein it appears, such as relay S1(3) of FIG. 3.

(2) a relay contact which is open when the relay is released and closed when the relay is operated may be referred to alternatively as a front or make contact, such as contact 2 of relay S1(3).

(3) a relay contact which is open when the relay is operated and closed when the relay is released may be referred to alternatively as a back or break contact, such as contact 5 of relay S1(3).

(4) wherever a battery or other source of potential is indicated by a symbol, such as a minus sign inside of a circle, it is assumed that the other terminal (not shown) is grounded unless otherwise specified.

(5) the expressions "on-hook" and "off-hook" carry their usual well-known meaning in the switching art.

*Block Diagram—FIG. 1*

The block diagram of FIG. 1 represents the basic functional parts of a call distributor embodying the present invention. One incoming trunk is shown connected to a central office and through a trunk finder and an attendant trunk to a console; but, it will be understood that there may be additional trunks connecting to other central offices and additional trunk finder-attendant trunk-console arrangements for dealing with the trunks of the call distributor. The common group circuit acts as a means for regulating traffic in the call distributor. In this regard, all incoming trunks in a calling condition are allowed to enter a trunk gate and all attendant consoles which are available for accepting incoming calls are allowed to enter a position gate. All of the trunks in the trunk gate are then connected one at a time through trunk finder-attendant trunk combinations to available console positions. During the course of establishing a connection from an incoming trunk to a console the area identity control circuit comes into play to connect the incoming trunk to an area identity machine whereby a prerecorded phrase may be verbally communicated to the console attendant to indicate to the attendant the area of origin of the incoming trunk call. For instance, there may be a group of incoming trunks connected to a central office such that all of these trunks may come from Miami; and, there may be other groups of trunks connected to other central offices coming from other areas such as Chicago, New York, etc. Incident to the connection of any incoming trunk to a console position, the area identity machine will be controlled to provide to the attendant a prerecorded word or phrase such as "Miami" or "Chicago" or "New York" etc. such that the console attendant knows the area of origin of the incoming call. This information is useful, such as in an instance where the call distributor may be serving an airline ticket agency, to help the attendant in accomplishing the administrative functions required by the call. The trunk peg count circuit keeps track of the number of times a particular trunk carries a calling condition. The trunk group peg count circuit keeps track of the number of times that a particular trunk group carries a calling condition. The delay answer control and delay answer machine circuits are available for providing to a calling subscriber a prerecorded machine announcement in the event that a delay is incurred in completing the incoming call to a regular attendant. If an incoming trunk call is delayed for a prescribed interval of time, the control circuits connect the trunk to the delay answer machine to provide to the calling subscriber an announcement to the effect that the completion of the call has been delayed and that the calling subscriber may wait or hang up. At the end of the announcement the incoming trunk will be returned to its calling condition such that this incoming trunk may thereafter be connected to an attendant as soon as one is available. In the event that a call is abandoned before any answer or after having been connected to a delay answer announcement, the abandoned call count circuit keeps track of the number of such abandoned calls.

*Feature sketch—FIG. 1A*

FIG. 1A is a highly skeletonized arrangement illustrating a connection which may be set up between a calling subscriber line and a call distributor through a central office trunk circuit. During the process of setting up this call a supervisory relay, such as relay S(1A), is operated over the closed calling subscriber loop circuit. The operation of relay S(1A) initiates functions of the central office circuitry for extending the call through the trunk circuit of the central office and out over the tip and ring leads T and R into the call distributor. During the process of setting up this connection the central office circuitry causes the operation of the ringing control relay RC(1A) which locks over its make contact 5 to ground over contact 1 of the ringing trip relay RT(1A). The operation of relay RC(1A) causes ringing current to be transmitted to the incoming circuit at the call distributor by extending ringing ground over make contact 2 of relay RC(1A) to the top lead T, thence into the call distributor, through the upper winding of relay R(1A), the upper winding of relay R1(1A), the lower winding of relay R1(1A), the lower winding of relay R(1A), thence over the ring lead R back into the central office, over make contact 9 of relay RC(1A), thence through the winding of relay RT(1A) back to the ringing supply to minus 48 volt direct current with 20 cycle ringing current superimposed thereon. It will be noticed in connection with relays R(1A) and R1(1A) in the call distributor that each of the windings of the R(1A) relay may have an impedance of approximately 200 ohms and that the upper winding of relay R1(1A) may have an impedance of 12,500 ohms and that the lower winding of relay R1(1A) may have an impedance of 7500 ohms. Since all of these windings of relays R(1A) and R1(1A) are in series with the winding of the ringing trip relay RT(1A), relay RT(1A) is unable to operate on the very small amount of current flowing in this high impedance circuit. In this connection, the relative high impedance (some 20,400 ohms) presented by the series arrangement of the windings of relay R(1A) and R1(1A) to the tip and ring loop back to the central office represents a so-called "on-hook" signal (an "unanswered" signal) from the call distributor to the central office. This on-hook signal is to be distinguished from an off-hook signal (to be explained hereinafter) in that the high impedance signal from the call distributor indicates to the central office that the call has not been answered, whereas a low impedance signal from the call distributor back toward the central office is an indication that the call has been answered ("off-hook").

At the time that the ringing signal is transmitted from the central office to the call distributor, a portion thereof is returned through the condensers of FIG. 1A bridging the back contacts 1 and 10 of relay RC(1A), back through condensers T and R to the calling subscriber line loop so that the calling subscriber may hear the ringing condition. In the call distributor, under normal circumstances, in response to the ringing signal transmitted thereto, relay R1(1A) will operate in series with relays R(1A) and RT(1A), the latter two relays not being able to operate with the lower amount of current flowing in this high impedance circuit. It is to be noted that relay R1(1A) will operate on the direct current alone such that the operation of relay R1(1A) can occur during the absence of the 20 cycle current, such as during the silent interval of the ringing cycle as is well known. Upon the operation of relay R1(1A) in the call distributor, circuitry is brought into motion whereby eventually the tip and ring leads T and R are extended over the dotted connection II to a console attendant's position, terminating therein at the attendant's telephone circuit. The circuit operation which results from the completion of this "regular" connection to an attendant results in the equivalent of the closing of switch S1 in FIG. 1A, which shunts down relay R1(1A), maintains the direct current loop to the central office, and reduces the impedance of this loop from some 20,400 ohms to some 400 ohms. The lower impedance of the R(1A) relay windings enables relay RT(1A) of the central office to operate. Relay RT(1A), in operating (known in the art as the "ringing trip" function) releases relay RC(1A), thereby removing the ringing supply from the line and completing direct current circuits through contacts 1 and 10 of relay RC(1A) to the windings of relay CS(1A) and the tip-ring loop to the call distributor. The changing of the impedance of the tip-ring loop from the call distributor back to the central office, from a relatively high impedance of 20,400 ohms to a relatively low impedance of 400 ohms, represents a change of signal from "on-hook" to "off-hook." This change in impedance, in addition to causing ringing trip to take place in the central office, completes an obvious circuit for operating relay CS(1A) in the central office over this effectively low impedance (off-hook) loop. All during the time that the answer condition prevails in the call distributor, the winding of relay R1(1A) is short-circuited to represent this answer condition and thereby to maintain toward the central office an off-hook signal.

Under the assumed circumstances it is assumed that the central office circuitry is arranged for what is known in the art as joint party control with single party disconnect time-out. This means that either calling or called party by remaining off-hook can control the connection exclusively of the other to a certain extent. As long as both relays S(1A) and CS(1A) are operated, indicating that both the calling party and the call distributor are off-hook, all of the switching equipment in the central office will be held in the condition representing the completion of the connection. If the calling subscriber hangs up (goes on-hook) relay S(1A) will release. On the other hand, if the call distributor hangs up (goes on-hook), relay CS(1A) will release. As indicated above, if both relays S(1A) and CS(1A) release, the entire switching equipment of the central office will drop away, removing all vestiges of the existing connection. On the other hand, if relay S(1A) is released with relay CS(1A) still operated, or if relay CS(1A) is released with relay S(1A) still operated, the central office initiates a timing operation to time a predetermined period, such as fifteen to thirty seconds, at the conclusion of which relay RC(1A) will be momentarily operated to initiate circuit operations for completing the collapse of the central office switching equipment.

If relay S(1A) releases with relay CS(1A) operated, the calling end of the central office connection releases but the called end remains off-hook until the end of the time-out. On the other hand, if relay CS(1A) releases with relay S(1A) operated, all of the central office circuitry remains as it was until the time-out occurs.

It is the above mentioned time-out operation (fifteen to thirty seconds) of the central office which has been responsible for the undesirable circuit operations which have taken place in prior art call distributors and which problem has been solved by the present invention. The problem comes about in the prior art by virtue of the fact that the call distributor may connect an incoming call to a pre-recorded delayed answer announcement machine (connection I of FIG. 1A) in the event that an incoming call has not been answered by a regular attendant within a prescribed interval of time (such as fifteen to twenty-five seconds). In FIG. 1A, whenever an incoming call to the call distributor is completed to an answer machine, as a "special" answer condition, circuits are brought into play which in effect accomplish the same function as the closing of switch S2. This, as will be appreciated from previous description, amounts to an answer condition transmitted from the call distributor back to the central office in the form of a low impedance, or "off-hook" condition such that the calling subscriber will be charged for the call even though the calling subscriber has not yet reached a regular attendant.

The announcement machine may provide to the calling subscriber a statement such as, "There has been a delay in the completion of your call. If you will wait your call will be completed. If you do not wish to wait please hang up and try again." In response to this announcement by the machine, the calling subscriber may do either of the suggested things. The calling party may hang-up, in which case relay S(1A) of the central office is released and eventually the central office circuits will time-out, releasing all of the connections between the central office and the call distributor. If, on the other hand, the calling subscriber chooses to wait, the incoming call at the call distributor will be routed to a regular attendant as soon as one is available. The problem existing in prior art distributor circuitry comes about by virtue of the fact that once the off-hook (answer) signal has been transmitted to the central office as an incident to the machine announcement connection, the incoming trunk circuit at the call distributor has this off-hook indication locked therein so that the control circuitry of the call distributor will attempt to complete this incoming trunk call to a regular attendant as long as this answer condition prevails. As mentioned above, however, it may very well occur that the calling subscriber has hung up, in which case the central office circuitry will wait for some fifteen to thirty seconds before breaking down the connection to the call distributor. During this time-out period the call distributor control circuitry may very well try to complete this incoming call to a regular attendant, whereupon when the attendant answers what seems to be a legitimate call she finds no calling subscriber. This situation has caused considerable concern among traffic people, not to mention the fact that traffic people have no measure of the number of such calls which are abandoned after a delayed answer announcement.

The present invention solves both of these problems by providing circuitry for not only preventing such abandoned calls from ever reaching a regular attendant but also for providing a count of the number of such calls abandoned after a delayed answer announcement as well as of calls abandoned before any answer. At such time as the control circuitry of the call distributor attempts to complete what apears to be an incoming call, still prevailing by virtue of the fact that the incoming truck at the cal distributor is in an answered condition (off-hook), the control circuitry momentarily (for about 500 milliseconds) opens switch S2, thereby presenting to the central office a relatively high impedance (on-hook signal) represented by the windings of relays R(1A) and R1(1A) in series. If the calling subscriber has waited on the call, relay S(1A) will have remained operated. When the high impedance (on-hook signal) is transmitted from the call distributor to the central office for the 500 millisecond period, relay CS(1A) will release but relay S(1A) remaining operated, will hold the central office connection over the relatively short 500 millisecond period of time. At the end of the 500 millisecond interval, switch S2 will be reclosed, thereby causing the re-operation of relay CS(1A). During the 500 millisecond interval, when relay CS(1A) is released, relay R1(1A) of the call distributor will re-operate and relay R(1A) will release. Since relay R1(1A) re-operates, the call distributor circuitry will be maintained in an off-normal condition. At the end of the 500 millisecond interval, when switch S2 is closed, relay R1(1A) will release and relay R(1A) will re-operate, thereby continuing the off-normal condition of the call distributor circuitry. As long as one of the relays R(1A) and R1(1A) remains operated, before, during and after the 500 millisecond interval, the control circuitry at the call distributor knows that the central office is still in a calling condition (off-hook) and proceeds to complete the call to a regular attendant. If, on the other hand, during the 500 millisecond interval, during which switch S2 is opened, the calling subscriber had previously hung up (gone on-hook), relay S(1A) of the central office will have released, thereby in effect placing the entire control of the central office equipment under control of relay CS(1A). When relay CS(1A) releases in response to the high impedance (on-hook) signal from the call distributor during the 500 millisecond interval, the central office switching circuitry will immediately release all connections, thereby causing the release of both relays R(1A) and R1(1A) of the call distributor. In the call distributor, if relays R(1A) and R1(1A) both become released, this is an indication to the call distributor that there is no longer a calling condition on that particular incoming trunk circuit. In response to this lack of calling condition, the control circuitry of the call distributor causes an indication to be made that a call was abandoned after a delayed answer announcement and does not complete this call through to a regular attendant.

DETAILED DESCRIPTION—REGULAR ANSWER (ATTENDANT)

The following detailed description will first describe the various main components of the detailed disclosure consisting of FIGS. 3 through 19 followed by a detailed description of a call incoming from the central office to and answered by a regular attendant.

*Main components*

Figure 4:
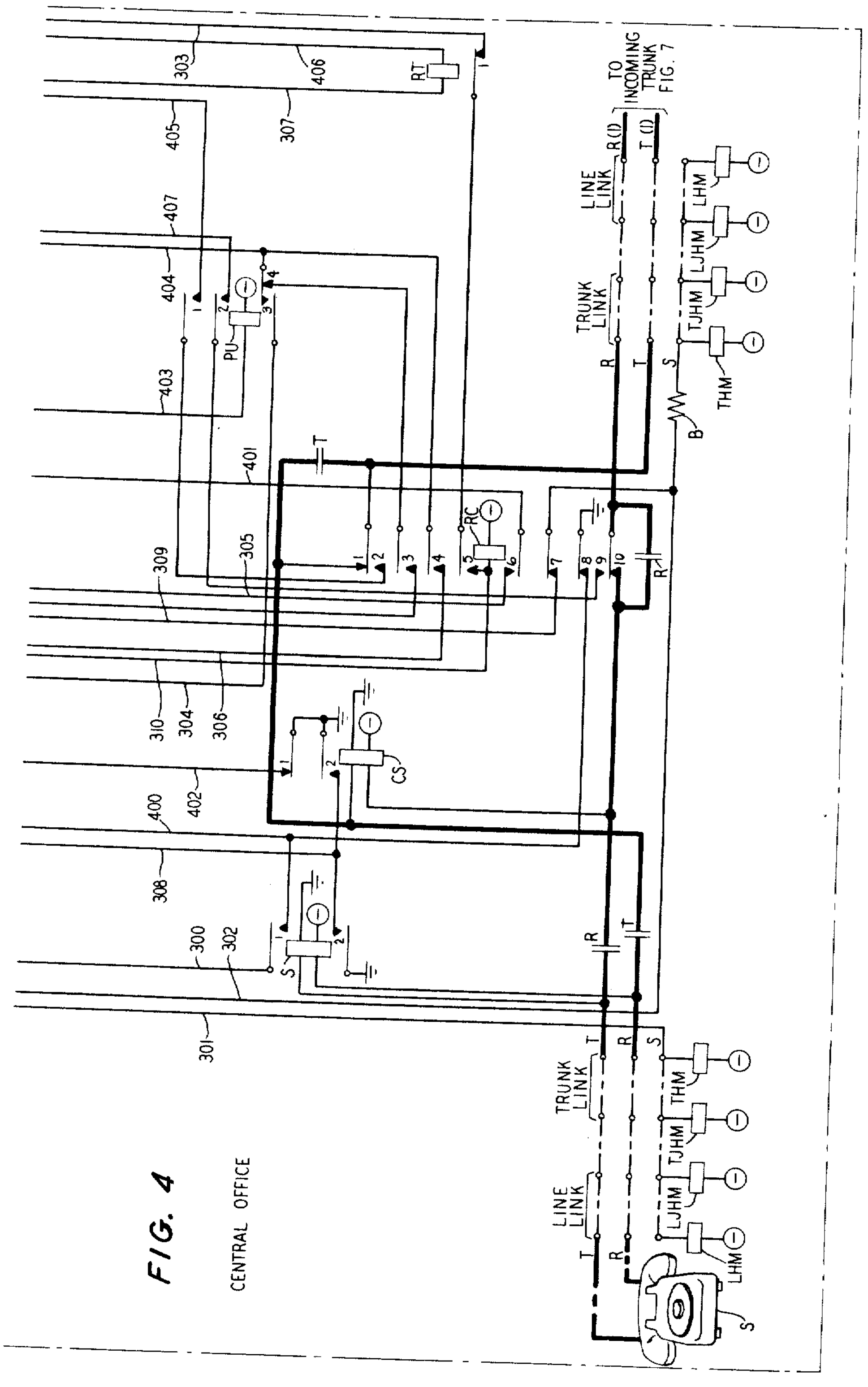

FIGS. 3 and 4 show those portions of the central office, and particularly the intra-office trunk thereof necessary to an understanding of the present invention. The particular central office chosen as exemplary in the present instance is of the type fully disclosed in Patent 2,585,904 to A. J. Busch of Feb. 19, 1952. The Busch patent relates to a common control marker type crossbar switching system and in FIG. 4 are illustrated the various line and trunk link crossbar switch frames whereby a connection may be extended from subscriber S in FIG. 4 through to the tip and ring leads T(1) and R(1) into the incoming trunk circuit of FIG. 7 for the purposes of initiating an incoming call to the call distributor of FIGS. 5 through 19.

Figure 6:
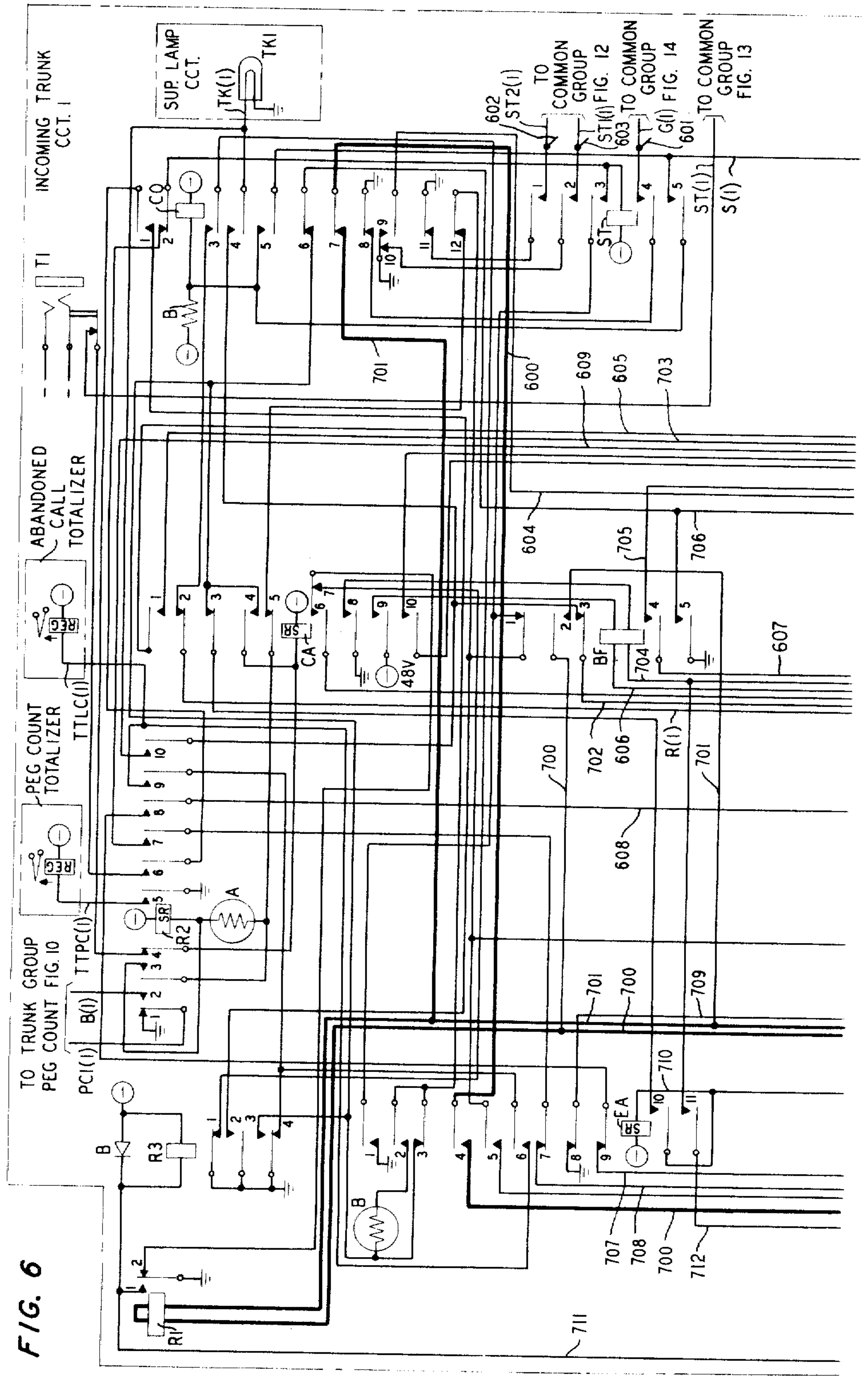
FIGS. 6 and 7 show details of an incoming trunk at the call distributor.
Figure 7:
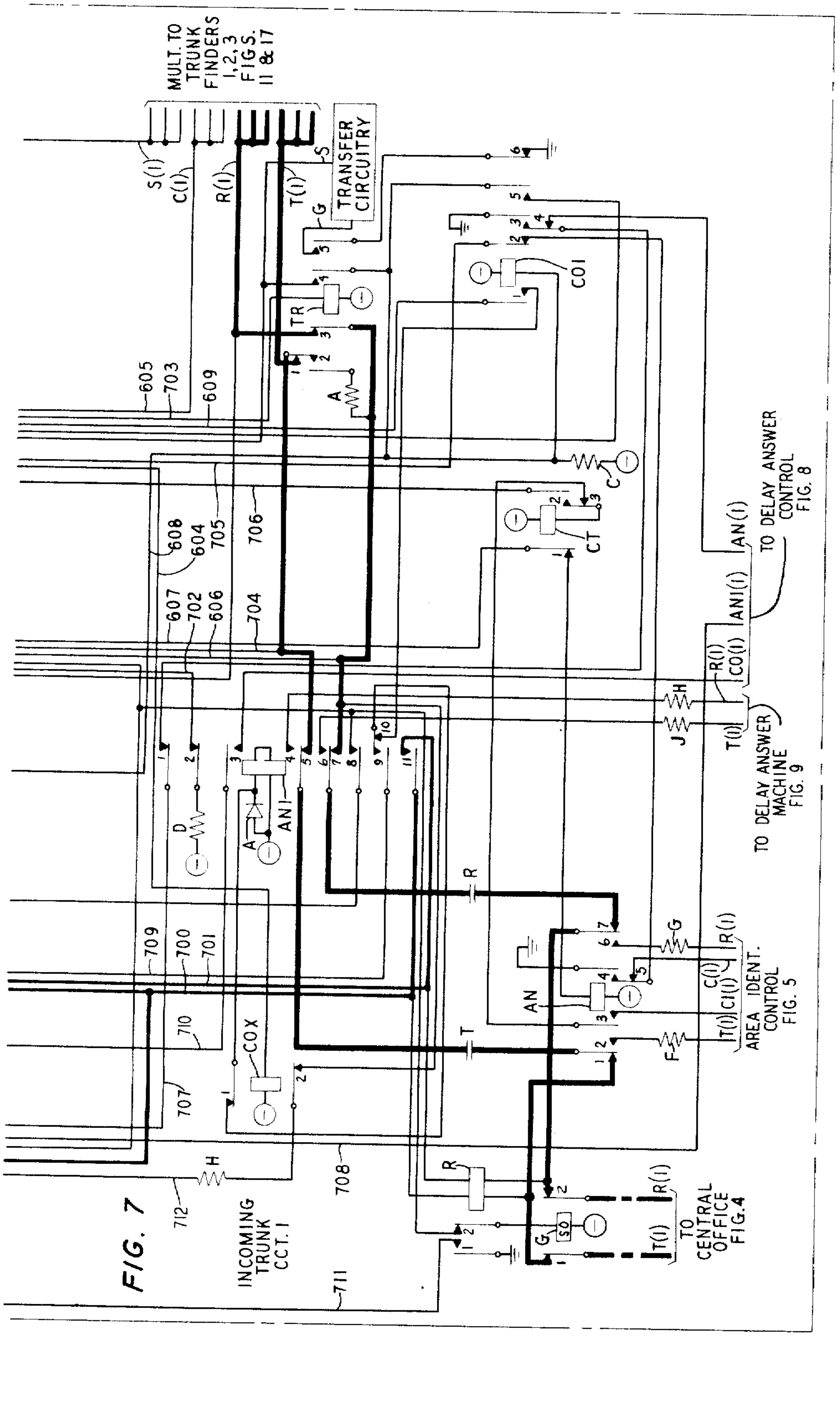
Figure 16:
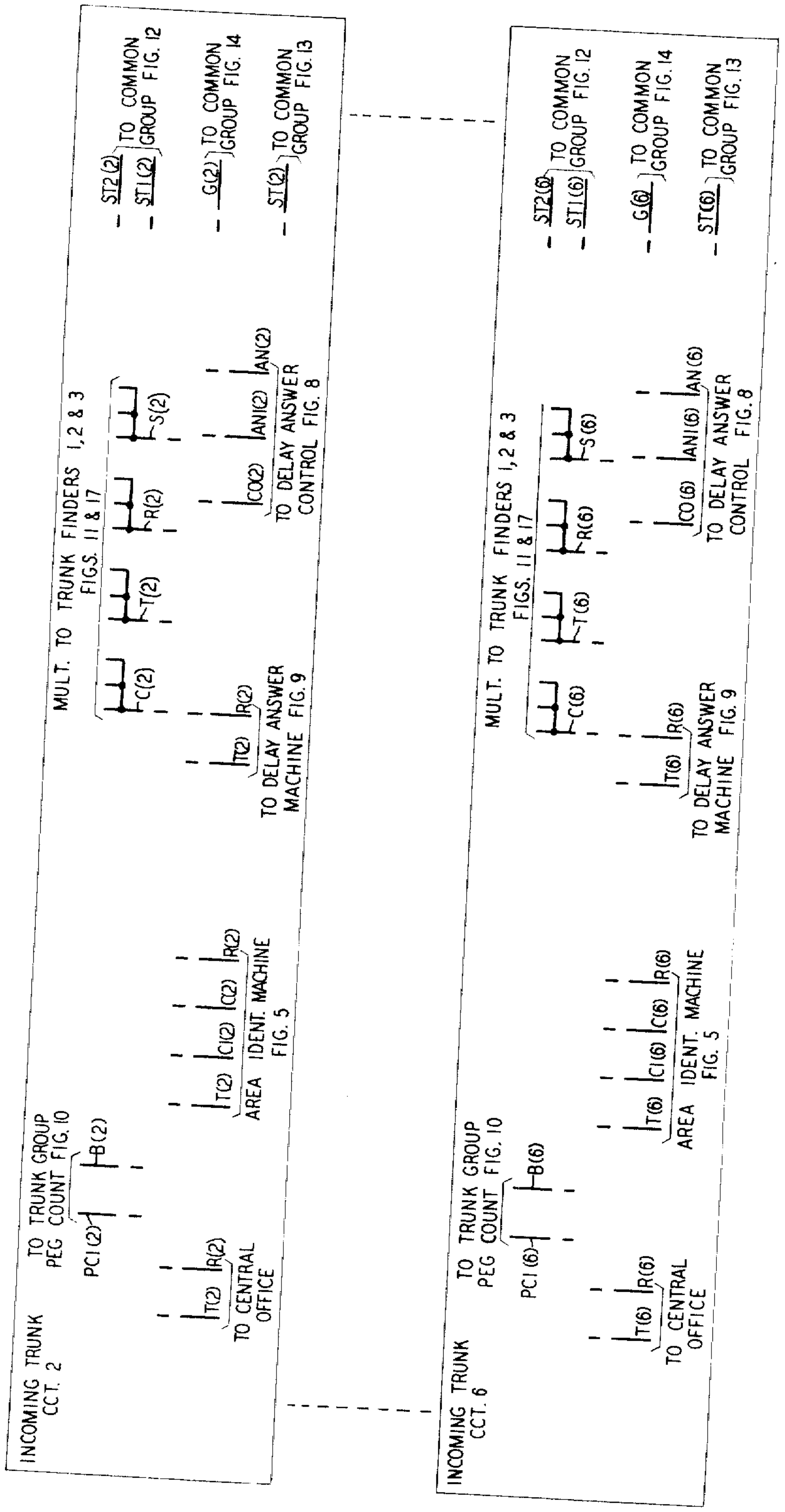
FIGS. 16, 17 and 18 illustrate additional incoming trunks, trunk finders, attendant trunks and attendant consoles.

FIGS. 6 and 7 disclose in detail one incoming trunk circuit connected to the central office of FIG. 4 and including an abandoned call totalizer (FIG. 6) and a peg count totalizer (FIG. 6). The trunk circuit of FIGS. 6 and 7 extends from the central office of FIGS. 3 and 4 and is assumed to represent an area of origin such as the City of Miami. FIG. 16 illustrates in block form five other incoming trunk circuits numbers 2 through 6 which could be connected to five other central offices so as to represent five additional areas of origin such as Chicago, New York, San Francisco, et cetera.

Figure 11:
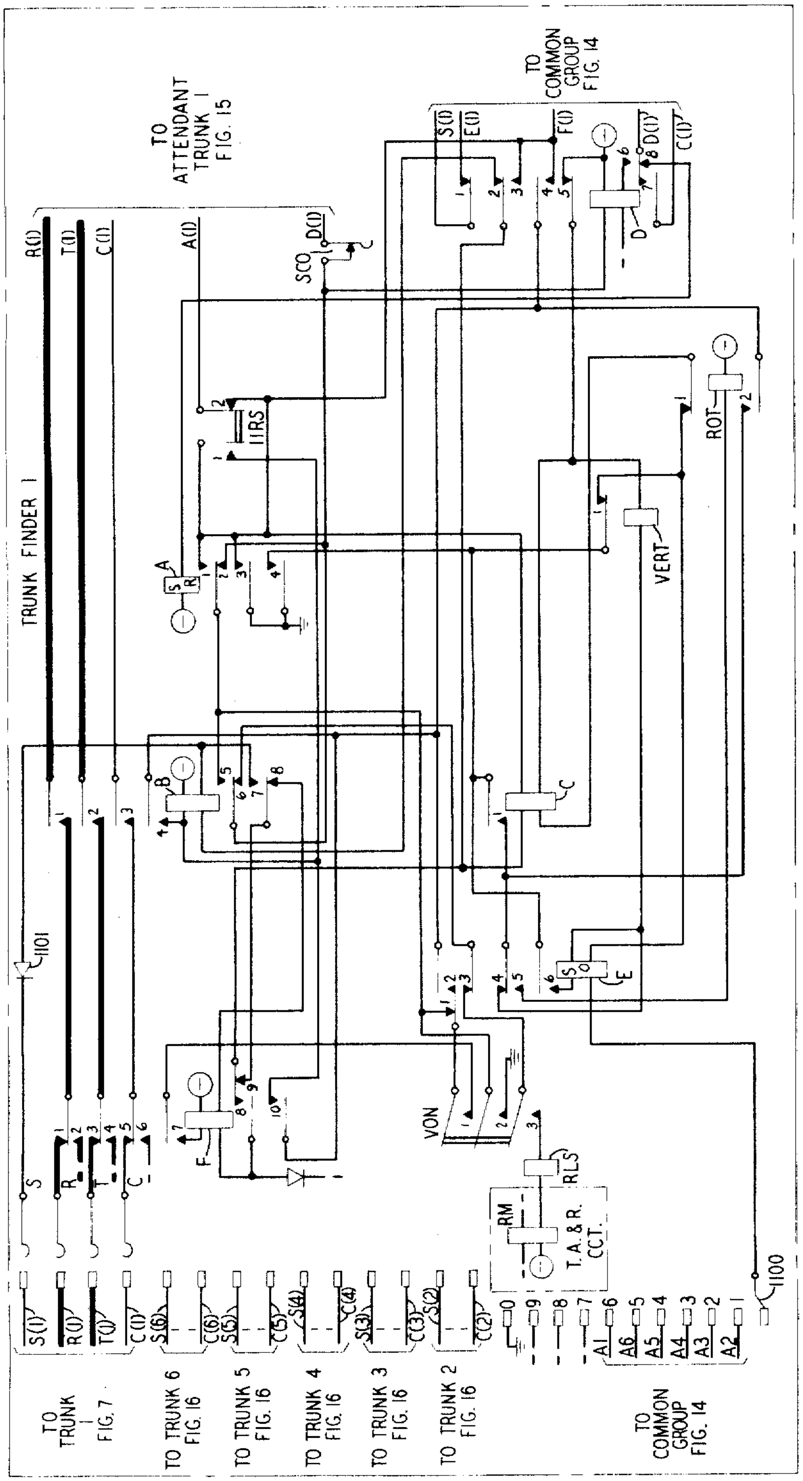
FIGS. 11, 15 and 19 show details of a trunk finder, an attendant trunk and an attendant console, by means of which incoming trunk calls are answered in regular fashion by attendants.
Figure 17:
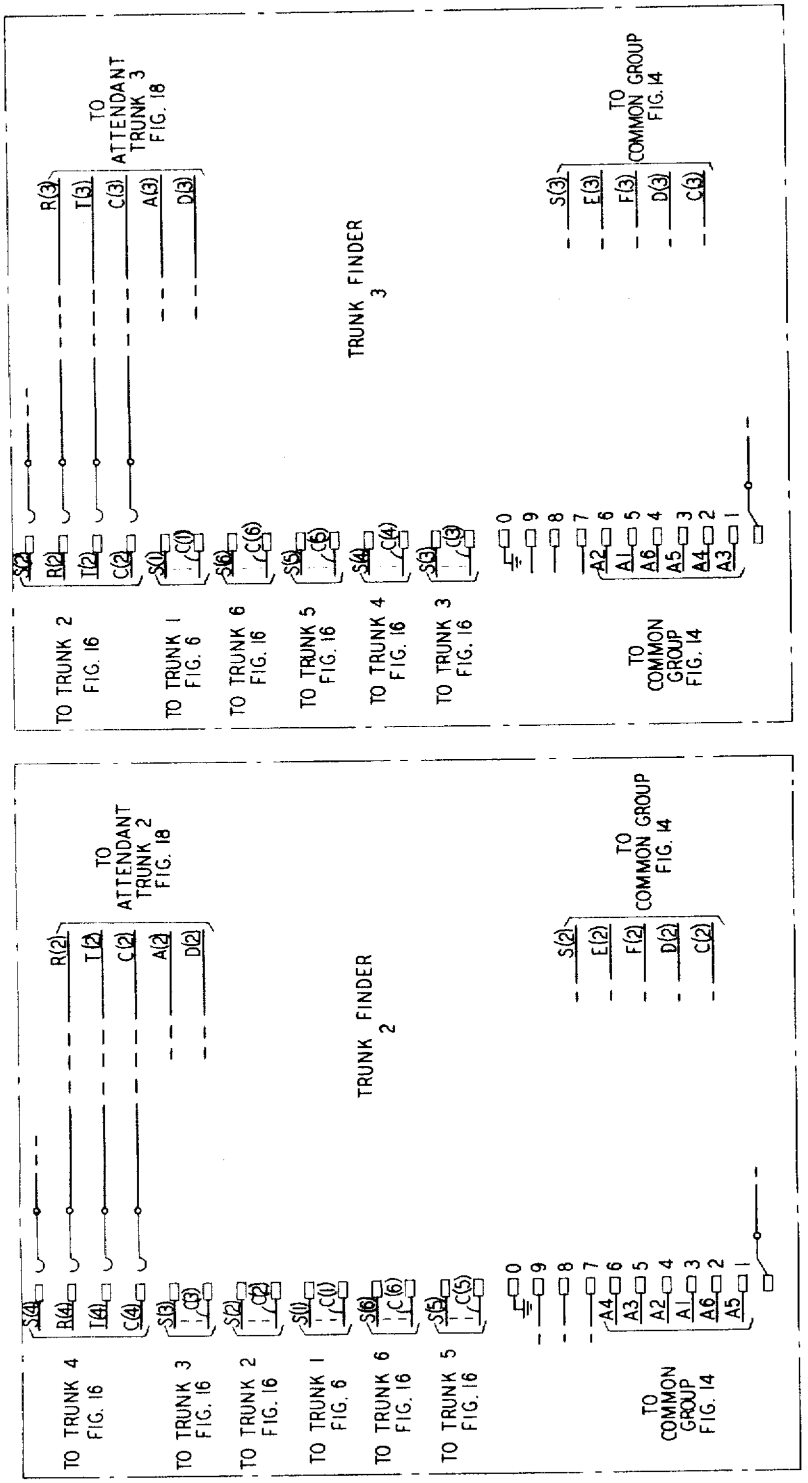
Figure 18:
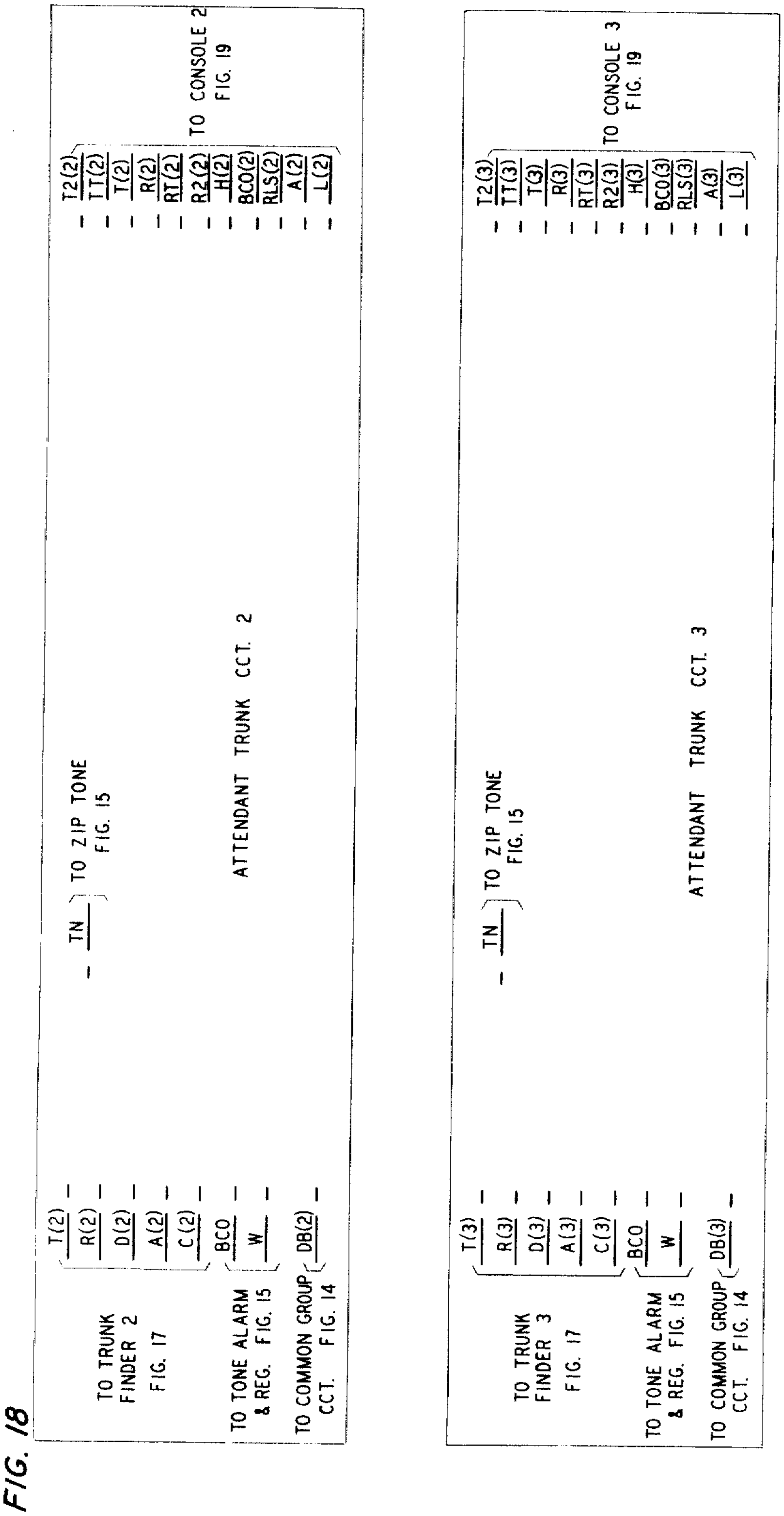

FIG. 11 shows the details of a step-by-step type trunk finder which had access to all six trunks illustrated in FIGS. 6, 7 and 16. The trunk finder of FIG. 11 is associated permanently with an attendant trunk circuit shown in FIG. 15, which in turn is associated with an attendant's console shown in FIG. 19. When the trunk finder of FIG. 11 is brounght into operation, such for instance as to make connection with incoming trunk No. 1 of FIGS. 6 and 7, it completes a connection from the trunk of FIGS. 6 and 7, through the trunk finder of FIG. 11, through the attendant trunk circuit of FIG. 15 and into console No. 1 of FIG. 19. FIGS. 17 and 18 indicate in block diagram form two other trunk finder-attendant trunk combinations which in turn respectively effect connections from incoming trunk circuits to consoles 2 and 3 shown diagrammatically in FIG. 19.

Figure 5:
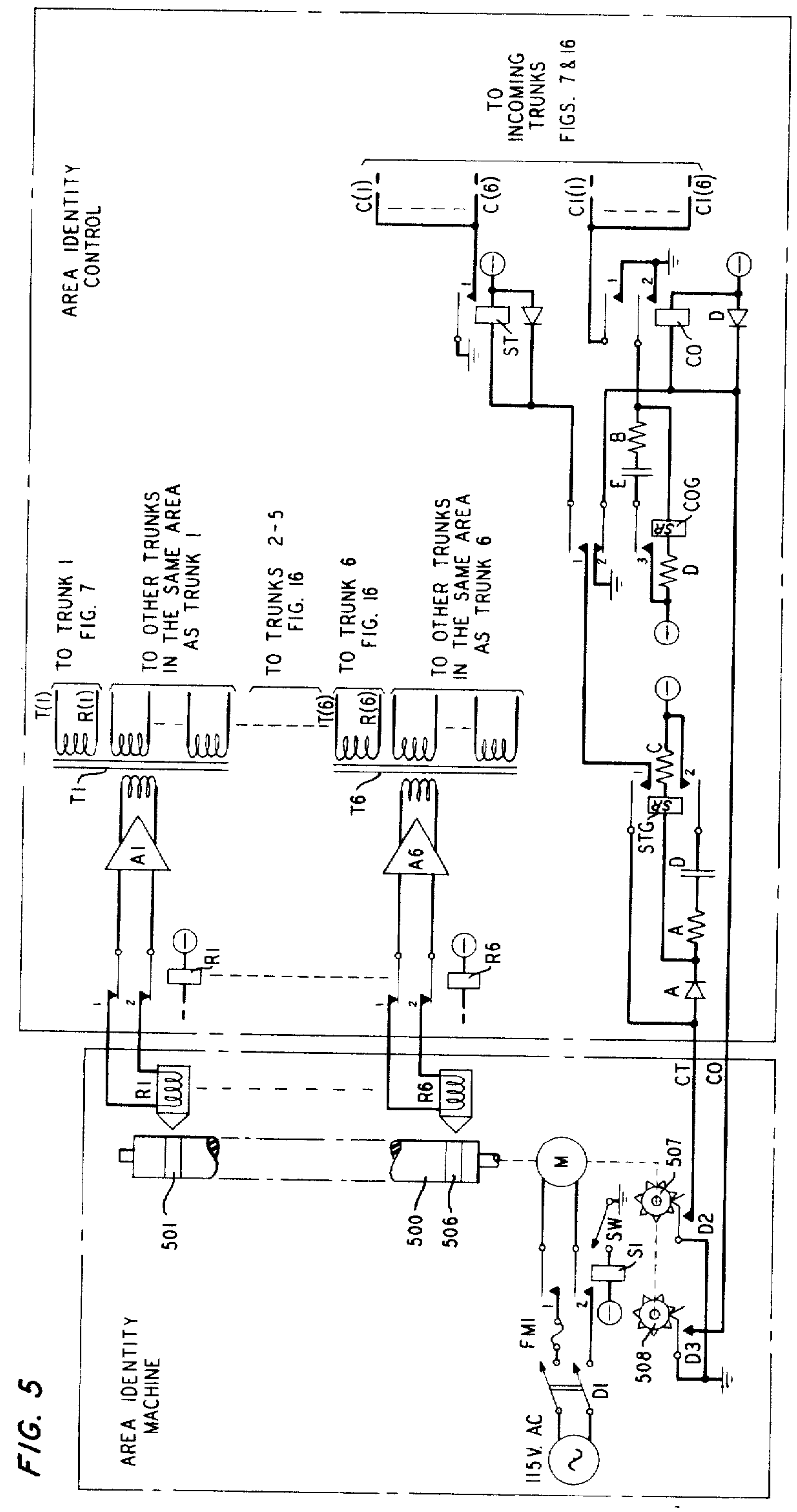
FIG. 5 shows circuitry for enabling the area of origin identity of calling trunks to be provided to attendants.

At the time that an incoming trunk call is completed to a console attendant, the area identity control circuitry of FIG. 5 comes into play whereby the area of origin of the particular trunk group involved is reproduced verbally to the console attendant. In FIG. 5 is shown an area identity machine in the left portion of the figure, including a magnetic drum 500 having pre-recorded thereon six separate tracks 501 through 506 such that when the drum 500 is rotated the respective pick-up heads R1(5) and R6(5) will transmit through respective amplifiers A1(5) through A6(5) whatever verbal phrase has been pre-recorded on the associated magnetic track. For instance, assuming that the trunk circuit of FIGS. 6 and 7 has an area of origin of the City of Miami, Florida, magnetic track 501 may have had pre-recorded therein the single word "Miami" and which will be reproduced through amplifier A1(5) and transformer T1(5) to all of the incoming trunk circuits whose areas of origin are the same, namely "Miami." By the same token, all of the tranks appearing in trunk group 6, which it might be assumed have an area of origin of Chicago, will have the word "Chicago" reproduced from track 506 through amplifier A6(5) and transformer T6(5) into all of the trunks belonging to that group.

Figure 12:
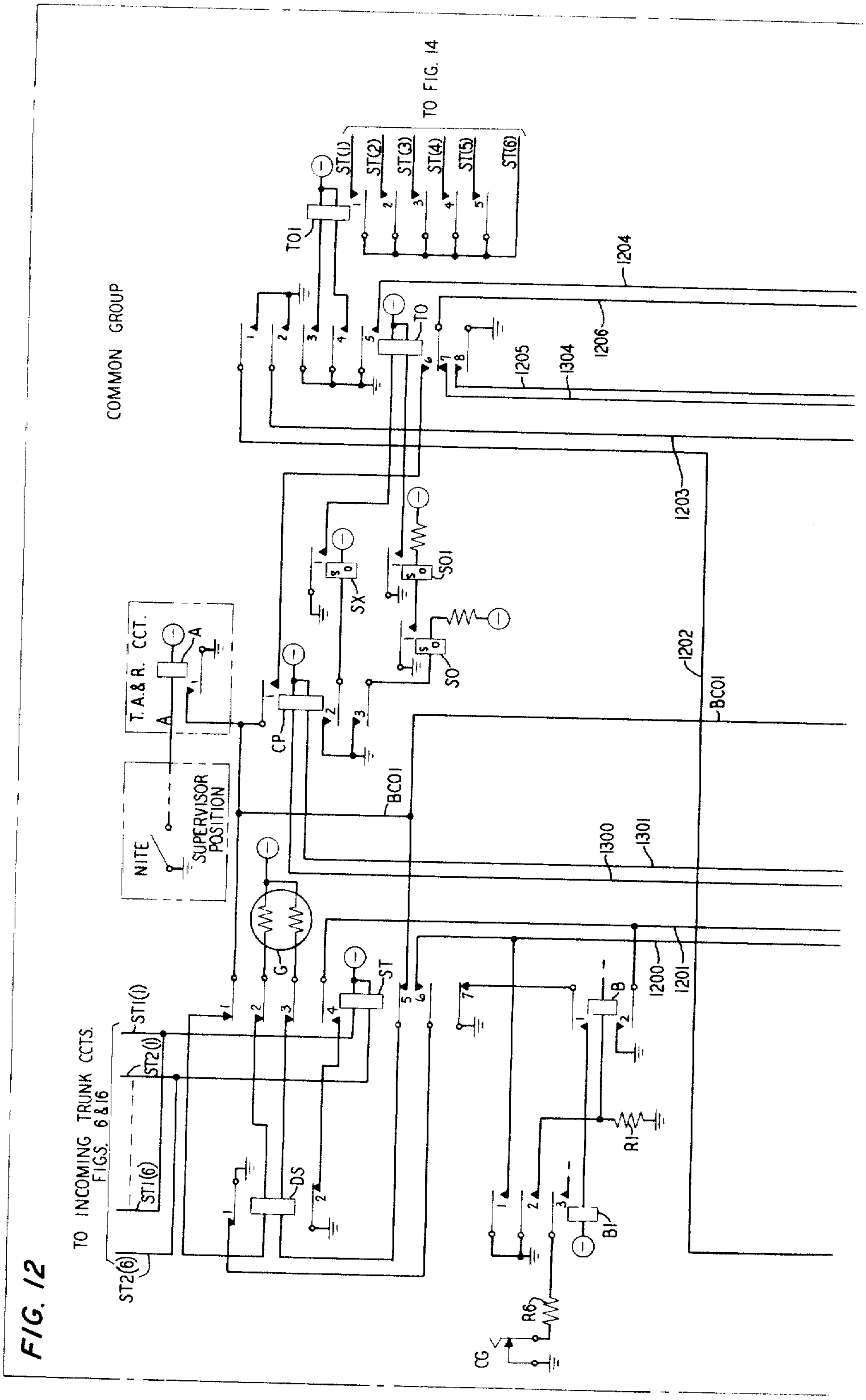
FIGS. 12, 13 and 14 show common control circuits of the call distributor.
Figure 13:
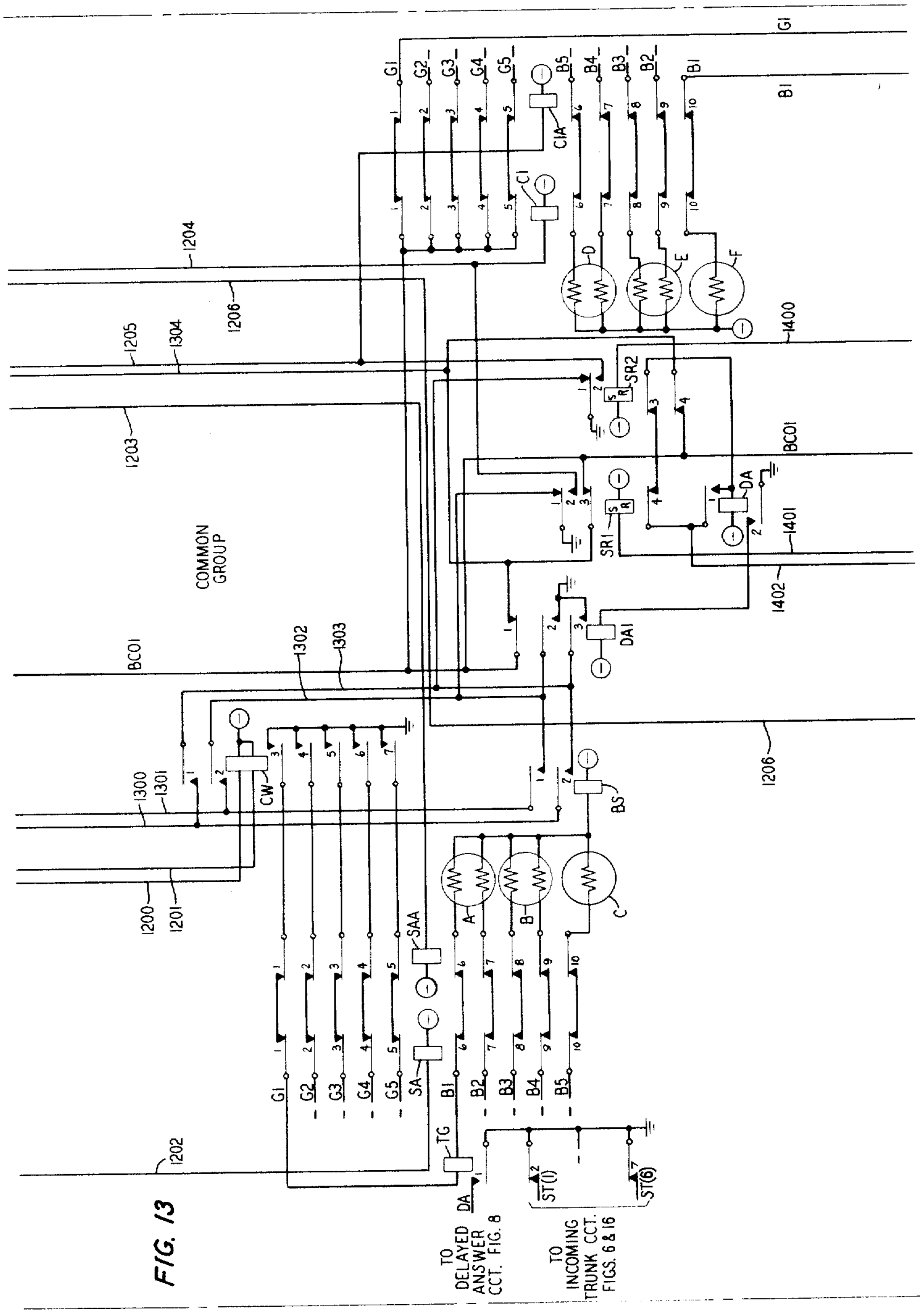
Figure 14:
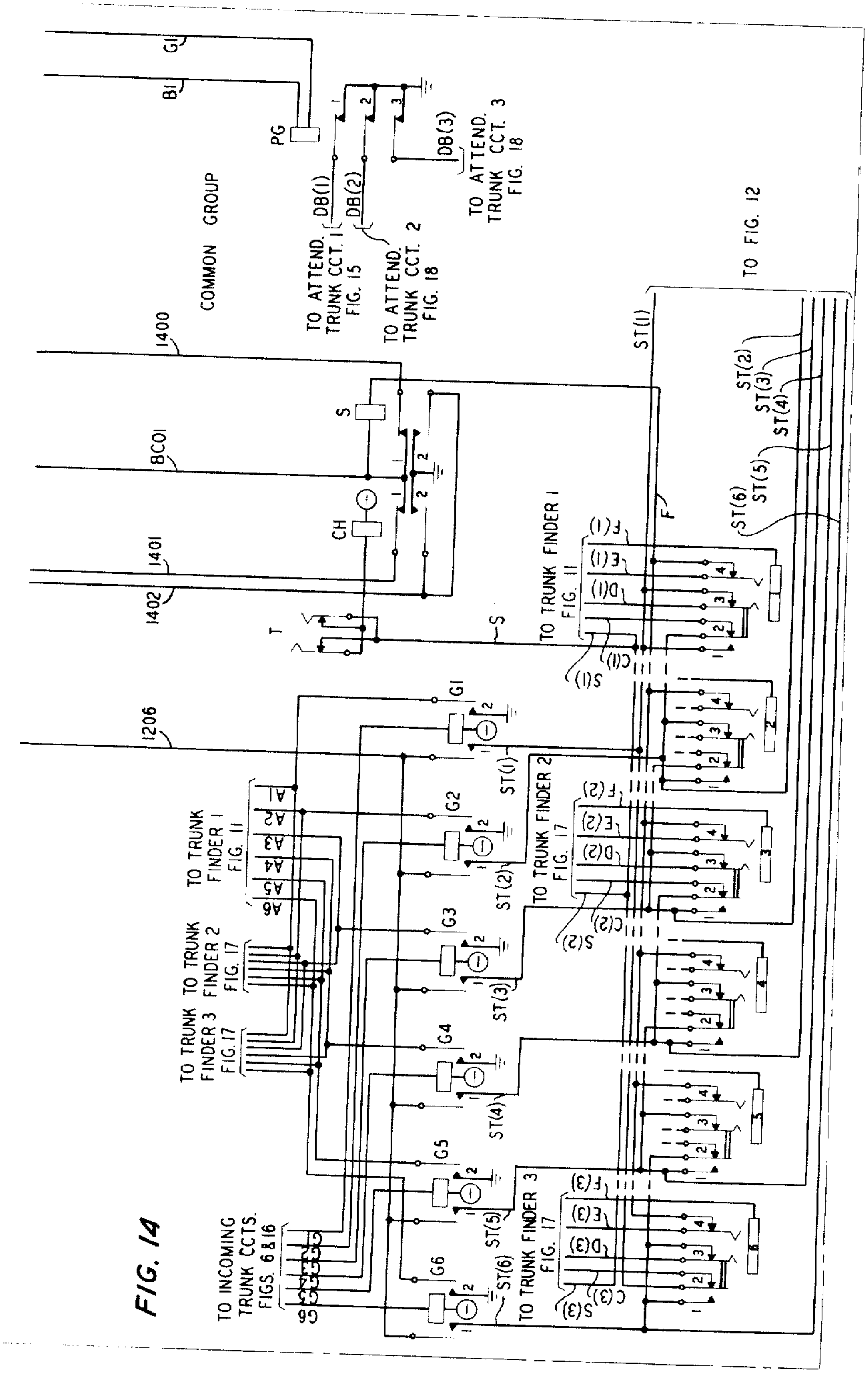

FIGS. 12, 13 and 14 show the details of the common group circuit which controls the action of the call distributor. In FIG. 13 is shown a relay TG(13) which represents a "trunk gate." When relay TG(13) is released, incoming trunk circuits may "enter" the trunk gate to be routed to console attendants. When relay TG(13) is operated, the trunk gate is said to be "closed" such that no more incoming trunks may be dealt with by the automatic circuitry of the call distributor until all trunks which were previously inside the gate have been dealt with. In FIG. 14 is shown a relay PG(14) which represents a "position gate." When relay PG(14) is released, all attendant consoles which are ready to receive calls may enter the position gate. When relay PG(14) is operated, no attendant positions may enter the position gate for completion of calls until such time as all positions previously entered in the gate have handled calls. The common group circuit of FIGS. 12, 13 and 14 regulates traffic inside of the call distributor to complete all incoming trunk circuits in calling conditions to regular attendants as soon as the latter are available to accept calls. In this connection, the common group circuit of FIGS. 12, 13 and 14 allocates and starts trunk finders of FIG. 11 and 17 to find and connect the calling incoming trunks, and generally regulates the flow of traffic through the call distributor.

Figure 8:
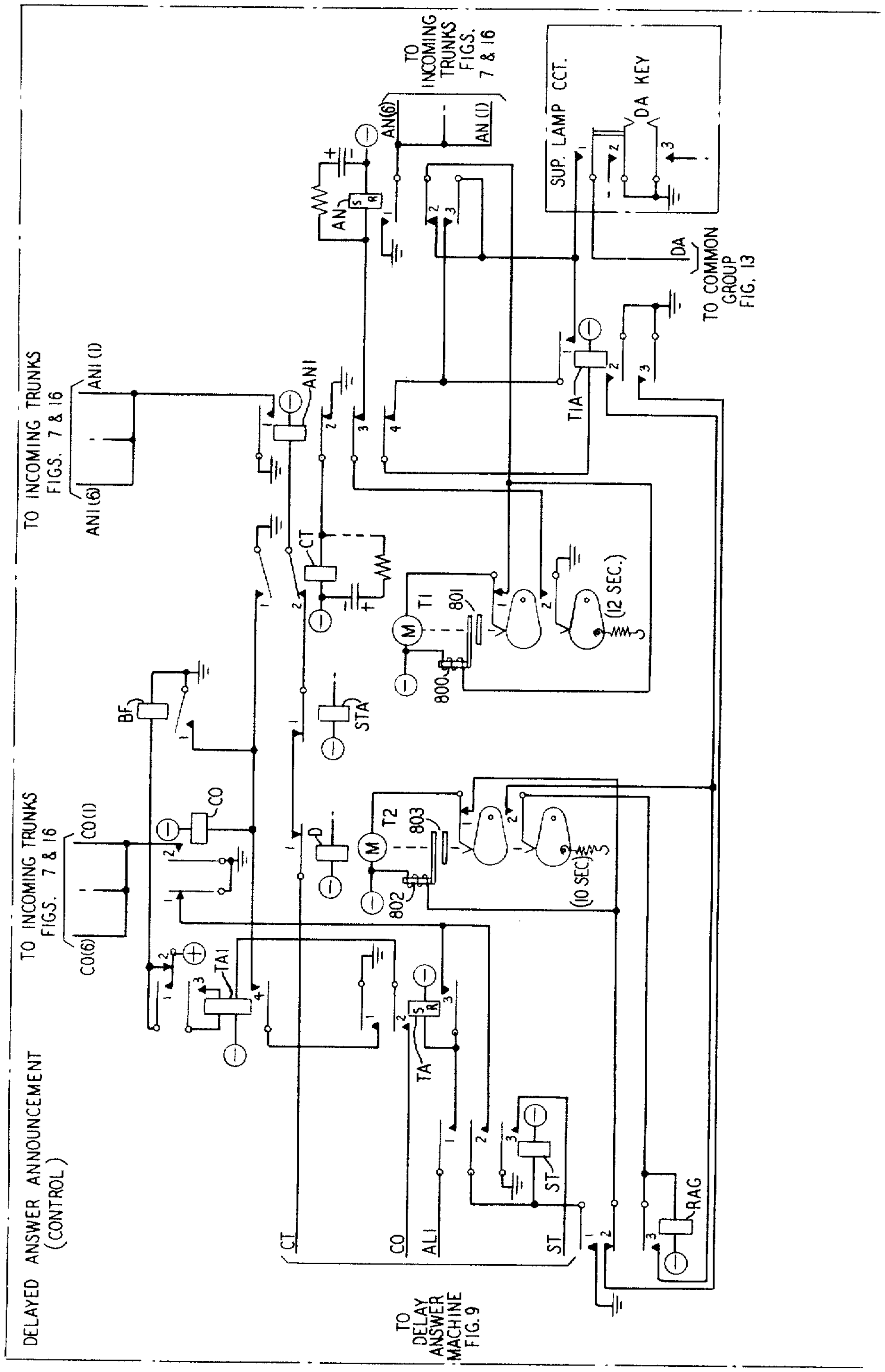
FIGS. 8 and 9 show circuitry for providing delayed answer announcements to calling trunks; and, FIG. 10 shows circuitry for making peg counts of trunk group usages.
Figure 9:
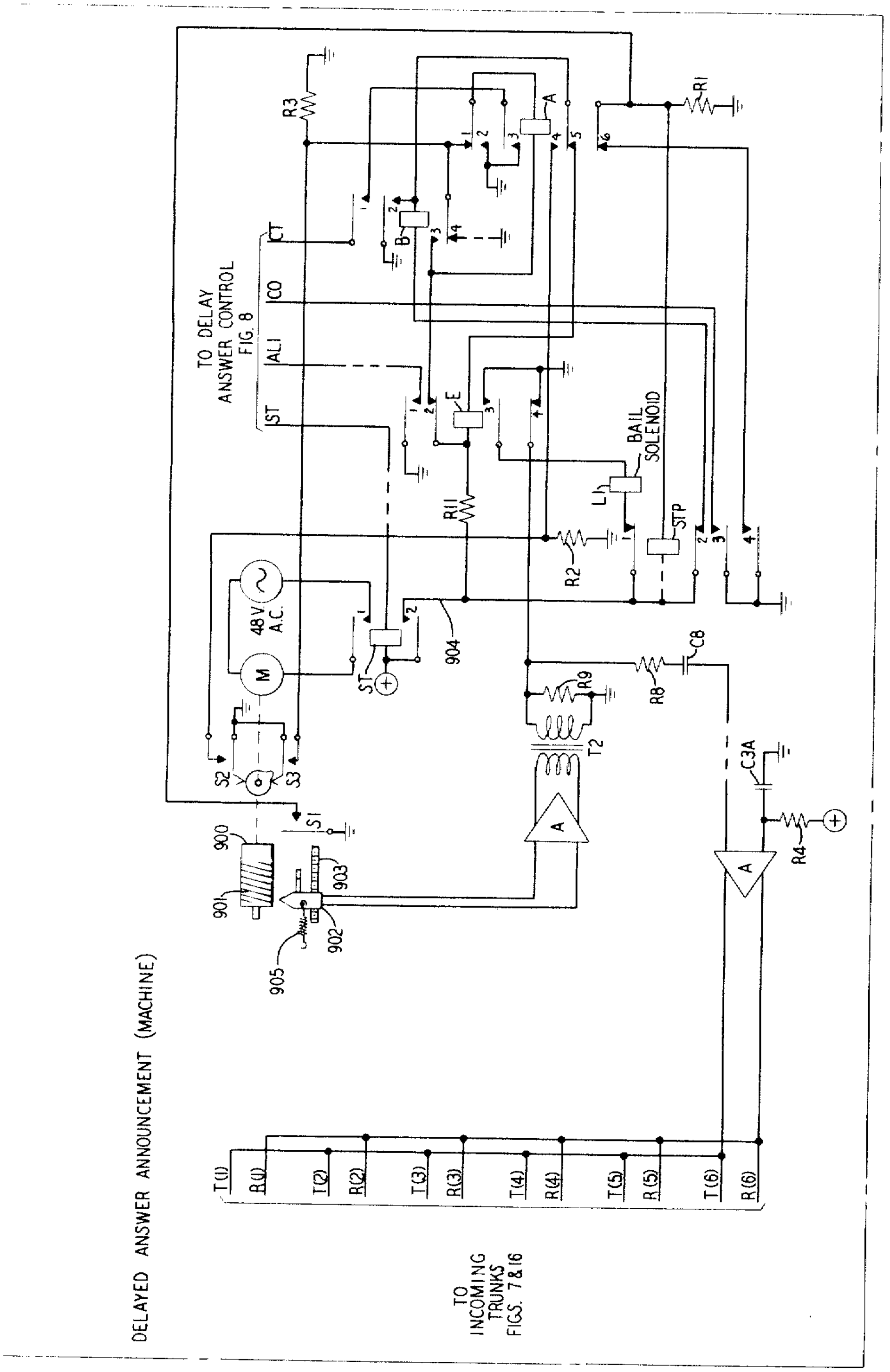
Figure 10:
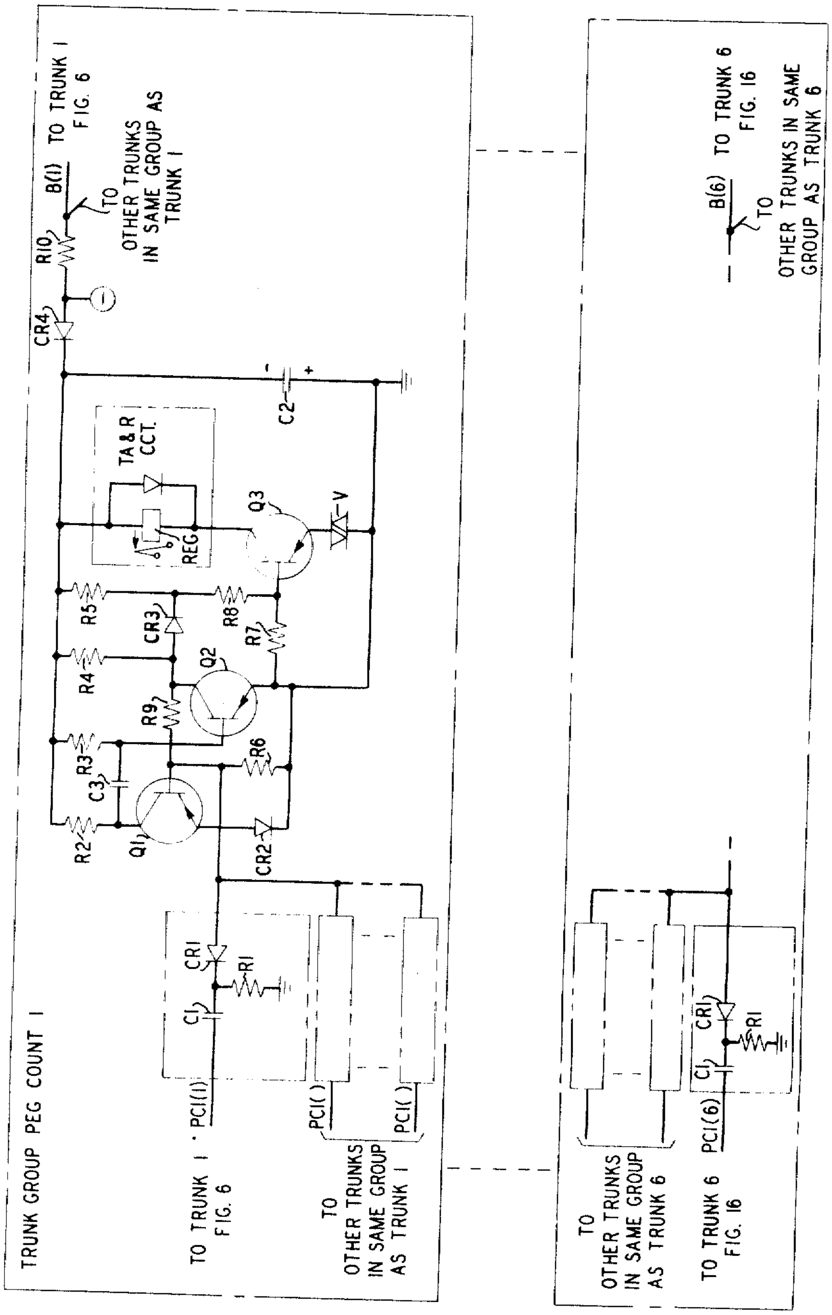

FIGS. 8 and 9 show respectively the control portion and the machine portion of the delayed answer announcement circuitry whereby, if an incoming trunk call is delayed beyond a prescribed interval of time, the common group circuit of FIGS. 12, 13 and 14 will cause the incoming trunk call to be connected to the delayed answer announcement machine of FIG. 9 long enough for a pre-recorded message existing thereon to be transmitted to the calling party. In FIG. 9 is illustrated a magnetic recording drum 900 having pre-recorded thereon in a spiral track 901 a message such as "Your call has been delayed. You may hang up and try again or you may wait for a regular attendant to be connected." When the circuitry of FIG. 9 is brought into play, the pick-up head 902 is driven by a lead screw 903 along the spiral magnetic track reproducing the message contained therein through an amplifier and transformer T2(9) and thence through another amplifier to the tip and ring leads connected to all of the trunks in the call distributor. By this means, any trunk which has been connected to the delayed answer announcement machine will receive this pre-recorded message. Any trunk which has been connected to the delayed answer announcement machine of FIG. 9 will be returned to calling status thereafter such that it can be connected to a regular attendant when the latter becomes available. If, on the other hand, the calling party decides to hang up after the delayed answer announcement, the incoming trunk associated therewith will eventually return to an off-normal condition such that the call will not be attempted to be completed to an attendant. FIG. 10 illustrates six trunk group peg count circuits 1 through 6 and shows one such circuit in detail. This trunk group peg count circuit is for the purpose of making a count of the number of times an incoming trunk in the associated group has been in a calling condition.

*Start conditions*

FIGS. 3 and 4, as shown, illustrate the start condition of the central office circuitry before a call is connected from subscriber S of FIG. 4 to the tip and ring leads T(1) and R(1) of FIG. 4 into the incoming trunk circuit of FIGS. 6 and 7. Under these circumstances, the crossbar switch linkages, illustrated in FIG. 4 by the terminology "LINE LINK" and "TRUNK LINK," have not been completed and the various hold magnets associated with these crossbar switches in the lower part of FIG. 4 are not operated.

The incoming trunk circuit of FIGS. 6 and 7 is in its start condition as shown in the drawing.

The start condition with respect to the area identity control and area identity machine of FIG. 5 is a condition which results when switches D1(5) and SW(5) are closed. With switches D1(5) and SW(5) closed, relay S1(5) is operated in an obvious circuit, thereby causing the motor M(5) to be energized from the 115 volt alternating current source of power. Motor M(5), in operating, causes the magnetic drum 500 to rotate and causes the cams associated with the switches D2(5) and D3(5) to start turning. Each track, such as track 501, on the magnetic drum 500 has pre-recorded therein in seven consecutive recording positions (some one and a half seconds each) the word "Miami" recorded seven times. Each of the cams 507 and 508 contains seven lobes which will close and open the respective contacts D2(5) and D3(5) seven times per revolution of the drum 500. With cams 507 and 508 properly adjusted and with the motor M(5) turning the drum 500, the timing sequence will be as follows: the first lobe of cam 507 will close contact D2(5) for one-tenth of a second, contacts D2(5) and D3(5) will then be both open for 1.6 seconds, the first lobe of cam 508 will then close contact D3(5) for one-tenth of a second, and .035 second after contact D3(5) opens, the second lobe of came 507 will reactuate contact D2(5) to start another cycle. This cyling will be continuous, giving seven cycles per revolution of the drum 500. At the outset relay CO(5) is operated in a circuit extending from ground, over contact 2 of relay COG (5) to negative battery through the winding of relay CO(5). Relay CO(5), in operating, extends ground over its contact 1 to the C1(1) through C1(6) leads extending to the incoming trunks of FIG. 7 and 16, but this grounded lead is of no consequence at the moment. The operated relay CO(5) also extends ground over its contact 2, through the winding of relay COG(5) and through resistance D to negative battery, thereupon causing the operation of relay COG(5) and completing over contact 3 of relay COG(5) a circuit for charging capacitor E to the battery potential as long as relay COG(5) is operated. As soon as relay COG(5) operates, relay CO(5) will release, thereby removing ground from the C1( ) leads to the incoming trunks and removing ground from the winding of the COG(5) relay. The capacitor network across the winding of the operated COG(5) relay will maintain this relay operated for approximately two seconds, which is longer than any one of the recording cycles. As soon as cam 507 closes contact D2(5), ground is extended over the CT lead, through the A diode, through the winding of relay STG(5), and through the C resistance to a negative battery, thereupon operating relay STG(5) which closes over its contact 2 a circuit for charging the D condenser to the negative potential supply, and completes over its contact 1 a circuit extending ground on the CT lead, over contact 1 of relay COG(5) to operate relay ST(5). Relay ST(5), in operating, places ground upon leads C(1) through C(6) to the incoming trunk circuits of FIGS. 7 and 16. This ground extending into the incoming trunk circuits at this time is of no consequence. Both of the contacts D2(5) and D3(5) will remain open for approximately 1.6 seconds after contact D2(5) opens. Both of the operated relays COG(5) and STG(5) will remain operated over this 1.6 second interval due to the discharge from their respective condensers E and D. Relay ST(5) releases as soon as contact D2(5) opens, thereby removing ground from the leads C(1) through C(6) to the incoming trunks. At the end of the 1.6 second interval, contact D3(5) is closed by a lobe on cam 508. Ground is extended from contact D3(5) to reoperate relay CO(5), which thereupon recharges the condenser network of the COG(5) relay and reapplies a ground pulse to the leads C1(1) through C1(6) to the incoming trunk circuits. Contact D3(5) immediately thereupon reopens, allowing relay CO(5) to release, thereby removing ground from the C1(1) et cetera leads to the incoming trunks. Thereafter, once again contact D2(5) recloses to again operate relay ST(5) for a short interval of time to send a ground pulse to the incoming trunk circuits over leads C(1) through C(6).

In effect, the circuitry of FIG. 5, in its normal condition, has relays STG(5) and COG(5) operated continuously, motor M(5) turning continuously, and contacts D2(5) and D3(5) opening and closing in a prescribed sequence of accurately timed intervals. In effect, the ground pulses supplied to the incoming trunks over leads C(1) through C(6) are coincident with the start of the announcement cycle from the magnetic drum 500 and the momentary pulses supplied to the incoming trunk circuits over leads C1(1) through C1(6) are coincident with the end of the announcement cycle from the magnetic drum 500. As the magnetic drum 500 is rotated there will be seven such start-stop cycles per revolution of the drum, as marked by seven such operations and releases of the relays CO(5) and ST(5) of FIG. 5, as controlled by the cam contacts D2(5) and D3(5).

In the control portion of the delayed answer announcement circuitry of FIG. 8, the delayed answer DA key will have been operated in the lower right-hand portion of FIG. 8 and relays CT(8) and BF(8) will be operated in obvious circuits.

In the delayed answer announcement machine of FIG. 9 all of the circuitry will be in its normal condition as shown.

The trunk group peg count circuit of FIG. 10 will be in its normal condition represented by transistor Q2 being fully turned on and transistors Q1 and Q3 being fully turned off, it being assumed that the lead PC1(1) extending into FIG. 10 from the trunk circuit of FIG. 6 is grounded at contact 1 of relay R2(6) and that the lead B(1) extending into FIG. 10 from the trunk circuit of FIG. 6 has no potential on it whatsoever at contact 2 of relay R2(6). With transistor Q3 turned off, the register REG(10) is not operated, thereby indicating no peg count of trunk group usage. In FIG. 10 it will be noted that the trunk group peg count circuit 1 has other PC1( ) leads extending to it from other trunk circuits assumed to be in the same trunk group with incoming trunk No. 1 of FIGS. 6 and 7: in this respect it is also assumed that none of these trunk circuits is off-normal.

Figure 19:
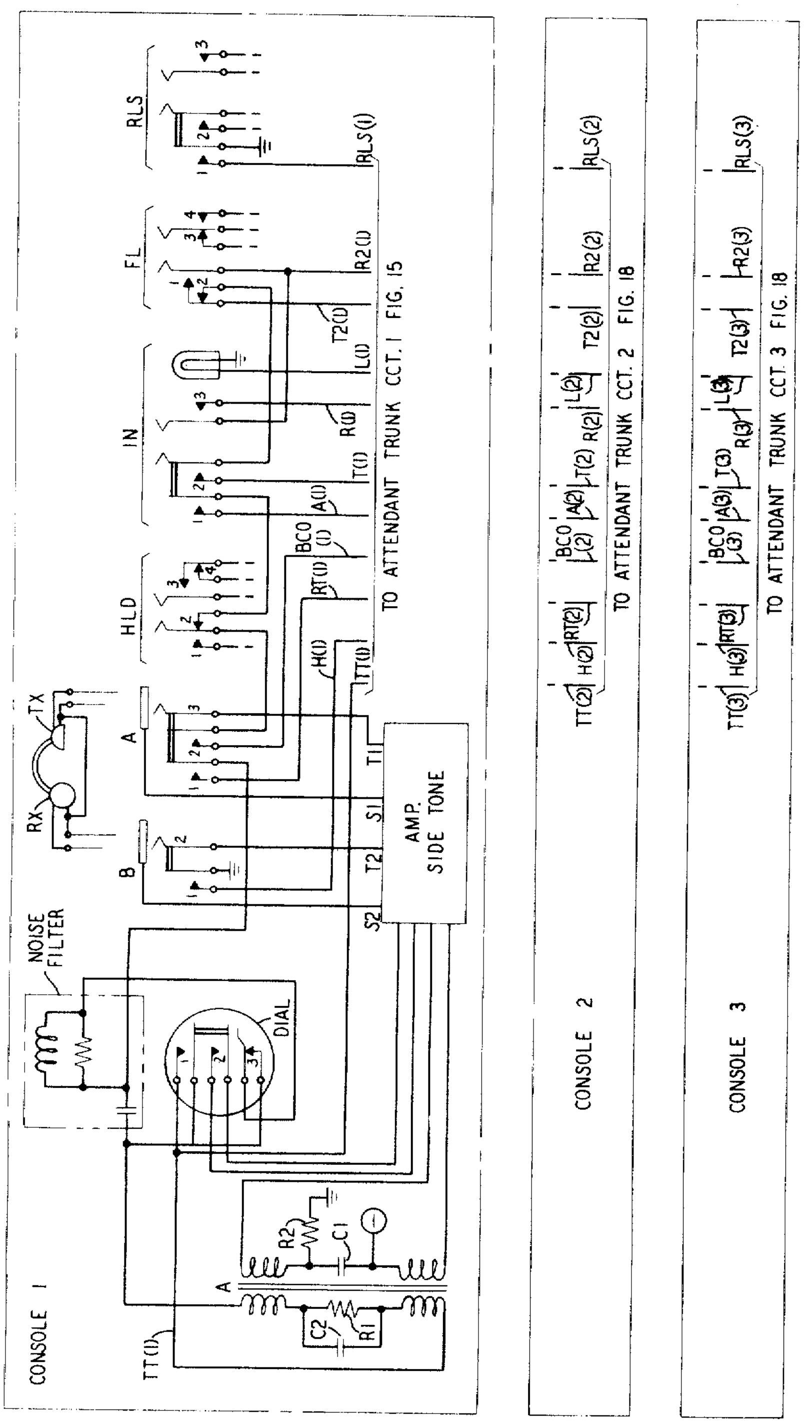

In FIG. 19 are illustrated three consoles of which console No. 1 is shown in detail. It is assumed that the attendant at console 1 has inserted the plugs of her receiver and transmitter into the A and B jacks of FIG. 19 to thereby place console No. 1 in condition to receive calls. With the attendant plugs inserted in the respective A and B jacks of console No. 1, the tip of the A plug is connected to conductor T1 through the tip contact 3 of the A jack and the tip of the B plug is connected to conductor T2 through the tip contact 2 of the B jack; and, the sleeve contact of the A plug is connected to conductor S1 through the sleeve of the A jack and the sleeve of the B plug is connected to conductor S2 through the sleeve of the B jack. The transmitter TX is connected in series between leads T1 and T2 and the receiver RX is connected in series between the conductors S1 and S2.

Figure 15:
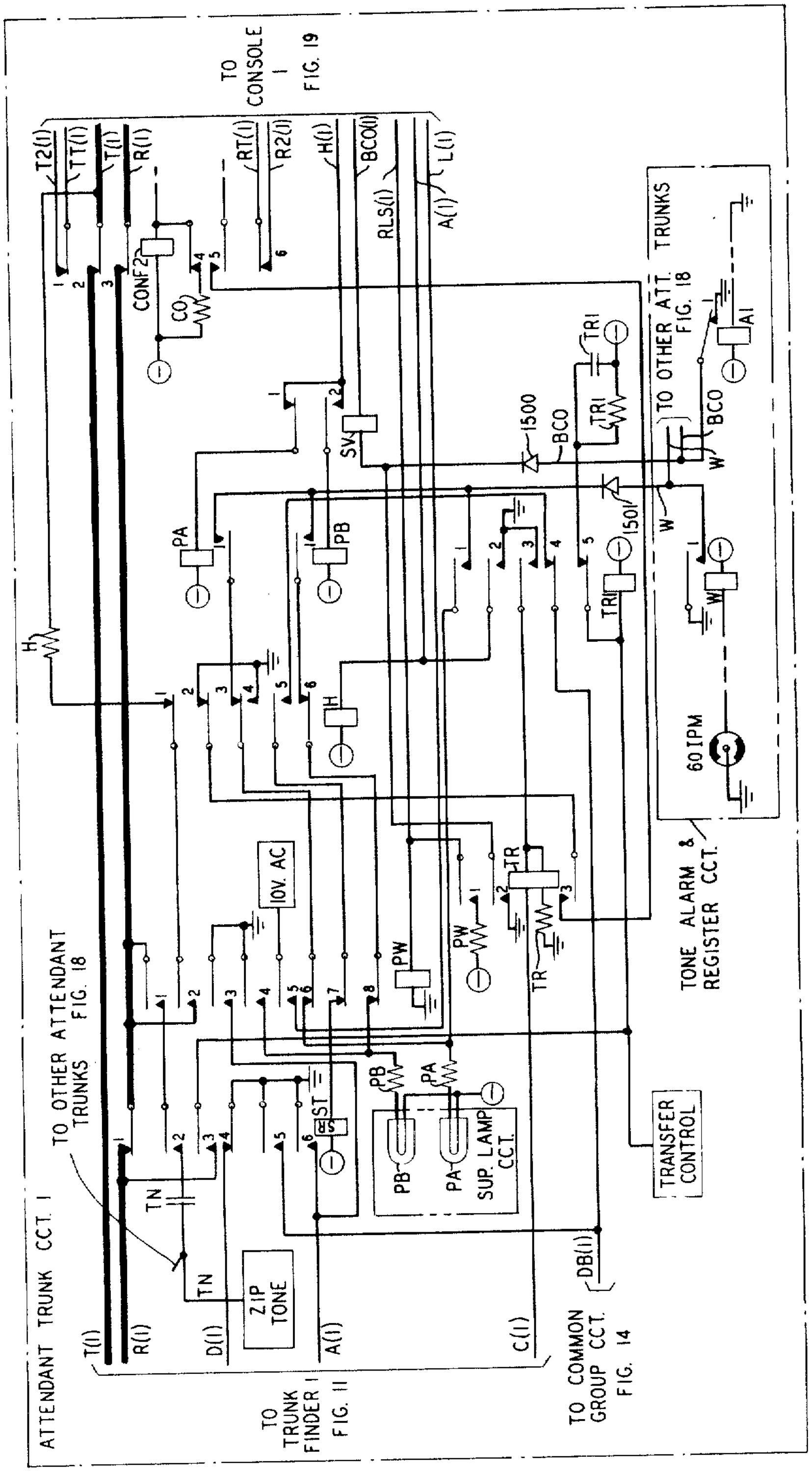

In FIG. 15 relay A1(15) of the Tone, Alarm and Register Circuit is normally operated, thereby extending ground over its contact 1 to the BCO conductor to all attendant trunk circuits, including the attendant trunk circuit of FIG. 15 through the diode 1500. Also, relay W(15) of the Tone, Alarm and Register circuit is operated and released under control of the 60IPM interrupter, thereby applying over its contact 1 pulses of ground occurring at a rate of 60 per minute, which pulses are extended over the W leads to all attendant trunk circuits, including the attendant trunk circuit of FIG. 15 through diode 1501. Relay PA(15) is operated in a circuit extending from ground in FIG. 19, over contact 1 of the B jack, over conductor H(1) into FIG. 15, thence over contact 1 of relay SV(15), to battery through the winding of relay PA(15). Relay PA(15), in operating, extends the 60IPM signal on conductor W over its contact 1, thence over contact 3 of relay H(15) and contact 6 of relay PW(15), through the PA resistance, to battery through the filament of the PA lamp in the supervisory lamp circuit, thereby causing the PA lamp to flash at a 60IPM rate to indicate that console 1 is attended. It will be understood that in FIG. 19 consoles 2 and 3 may also be attended, in which case the attendant trunk circuits diagrammatically indicated in FIG. 18 will be in a similar status to that just described with respect to the attendant trunk No. 1 of FIG. 15.

In the trunk finder No. 1 of FIG. 11, relay D(11) is operated in a circuit extending from ground in FIG. 15, over contact 4 of relay ST(15), thence over lead D(1) into FIG. 11, thence over contact 1 of key SCO(11), to battery through the upper winding of relay D(11).

In the common group circuit of FIGS. 12, 13 and 14, all of the relays are in their normal conditions as shown.

*Console ready*

Even though the attendant has connected to the A and B jacks of FIG. 19, the console is not ready to accept calls until the attendant operates the IN key of FIG. 19. Upon operation of the IN key of FIG. 19, a circuit is completed for operating relays H(15) and SV(15) in series in FIG. 15. This circuit extends from ground in FIG. 15 on the BCO lead, through diode 1500, through the winding of relay SV(15), thence over conductor BCO(1) into FIG. 19, thence over contact 2 of the operated A jack, thence over contact 2 of the HLD key and over contact 1 of the operated IN key, over conductor A(1) back into FIG. 15 and to battery through the winding of relay H(15). Relays H(15) and SV(15) operate in this circuit. Relay SV(15), in operating, releases relay PA(15) and causes the operation of relay PB(15) in a circuit extending from ground on conductor H(1), over contact 2 of relay SV(15), the operation of relay PB(15) accomplishing no circuit operation at this particular instant. Relay H(15), in operating, causes the PA lamp in FIG. 15 to change from a flashing indication at 60IPM to a steady lighted condition in a circuit extending from ground in FIG. 15, over contact 4 of relay H(15) and contact 6 of relay PW(15), through the PA resistance to the PA lamp, the steady lighted condition of the PA lamp indicating to the supervisor that console 1 not only is attended but also is ready to receive calls. Upon the operation of relay H(15), a circuit is completed for operating the start relay ST(15) of the attendant trunk circuit, said circuit extending from ground in FIG. 14, over contact 1 of relay PG(14), over conductor DB(1), into FIG. 15, over contact 4 of relay TR1(15), over contact 5 of relay H(15) and contact 7 of relay PW(15), to battery through the winding of relay ST(15). Relay ST(15), in operating, completes a locking circuit for itself over its own contact 5 to conductor DB(1) in FIG. 15 independently of the operating ground supplied from the common group circuit of FIG. 14. Also, relay ST (15), in operating, removes ground from conductor D(1) extending into FIG. 11, thereby causing the release in FIG. 11 of relay D(11).

*Control ready*

In FIG. 12 the operation by the supervisor of the NITE switch completes an obvious circuit for operating relay A(12) in the Tone, Alarm and Register circuit, the operation of relay A(12) extending ground over its contact 1 to the BCO1 conductor extending into FIGS. 12, 13 and 14. In FIG. 12, relay DS(12) operates over both of its windings in circuits extending from battery, through the G resistance, over contacts 2 and 3 of relay ST(12), through the upper and lower windings of relay DS(12), thence over contacts 1 and 5 of relay ST(12) to ground on lead BCO1. In FIG. 14, relay PG(14) operates in a circuit extending from battery in FIG. 13, through the F resistance over contacts 10 of relays C1(13) and C1A(13), over conductor B1 into FIG. 14, through the winding of relay PG(14), thence over conductor G1 back into FIG. 13, over contacts 1 of relays C1A(13) and C1(13), to ground on conductor BCO1. Realy PG(14), in operating, removes ground in FIG. 14 from the DB( ) leads extending to the attendant trunk circuits, thereby preevnting the operation of any additional attendant trunk circuit start relays such as relay ST(15) of attendant trunk No. 1 until such time as relay PG(14) is again released, as will be described hereinafter. In FIG. 13, circuits are completed for operating relays SR1(13) and SR2(13) from ground on lead BCO1 in FIG. 14, over respective contacts 1 of relays S(14) and CH(14) to respective conductors 1400 and 1401 back into FIG. 13, to battery through the respective windings of relays SR2(13) and SR1(13). Upon the operation of relays SR1(13) and SR2(13), obvious circuits are completed from ground over contacts 2 of these relays to cause the operation of respective relays C1(13) and C1A(13). The operation of either or both of relays C1(13) and C1A(13) causes the release of relay PG(14) to again permit the start relays of attendant trunk circuits to be operated if any are in condition to do so.

In the meantime in FIG. 14 relays CH(14) and S(14) are included in circuits for detecting whether at least one trunk finder, such as the trunk finder of FIG. 11, is available for use as indicated by the released condition of the relay D(11) of FIG. 11. This circuit extends from battery in FIG. 14, through the winding of CH(14), over the contacts of the T jack, to conductor S extending to all of the conductors S(1) through S(3) into the trunk finder circuits of FIGS. 11 and 17. For instance, in FIG. 11 conductor S(1) extends over contact 1 of the released relay D(11) (indicating by its released condition that trunk finder 1 is available to be used) thence over conductor E(1) back into FIG. 14 and over contact 4 of its associated jack No. 1 to conductor F, thence through the winding of relay S(14) to ground on lead BC01. Thus, it will be apparent that if any one or more of the trunk finders is available for use (as indicated by the released conditions of its D( ) relay) relays CH(4) and S(14) will be operated in FIG. 14. On the operation of relays CH(14) and S(14), the relays SR1(13) and SR2(13) are permitted to release after a time interval measured by their slow release characteristics. Upon the release of relays SR1(13) and SR2(13) in FIG. 13, relays C1(13) and C1A(13) are released, thereby causing the re-operation in FIG. 14 of relay PG(14).

It will be observed in FIG. 14 that whenever relay PG(14) is released the position gate is said to be "open" such that any attendant trunk circuits may have their start relays operated; whereas, whenever relay PG(14) is operated, the position gate is said to be "closed" meaning that none of the start relays of any of the attendant trunk circuits can be operated.

Also, in FIG. 13, upon the release of relays SR1(13) and SH2(13) a circuit is completed for operating relay DA(13) extending from ground in FIG. 14, over contacts 2 of relays CH(14) and S(14), over conductor 1402 into FIG. 13, over contact 4 of relay SR1(13), contact 3 of relay SR2(13), to battery through the winding of relay DA(13). Relay DA(13) operates in this circuit and locks over its own contact 1 to ground on conductor 1402. Relay DA(13), in operating, completes over its contact 2 an obvious circuit for operating relay DA1(13).

*Central office initiates call*

The following description of the central office circuitry illustrated in FIGS. 3 and 4 is in accordance with the details thereof set forth in the aforementioned A. J. Busch patent and describes briefly the operations which take place in the central office up to the moment when the ringing signal is transmitted in FIG. 4 over the tip and ring leads T(1) and R(1) into the incoming trunk circuit of FIGS. 6 and 7.

When the calling subscriber S in FIG. 4 places a call to the call distributor circuitry of FIGS. 5 through 19, the common control circuitry of the central office comes into play to extend a connection from subscriber S in the lower left-hand portion of FIG. 4, through LINE LINK and TRUNK LINK crossbar switches to the tip, ring and sleeve leads of an intra-office trunk illustrated in FIGS. 3 and 4. The other end of the intra-office trunk circuit in the lower right-hand portion of FIG. 4 is extended over the TRUNK LINK and LINE LINK crossbar switches to the tip and ring leads T(1) and R(1) to the incoming trunk circuit of FIG. 7. During the process of setting up this connection through the crossbar switches, the eight hold magnets illustrated in the lower left and lower right portions of FIG. 4 will have been operated. In FIG. 4, relay S(4) will have been operated in an obvious circuit extending over the subscriber tip and ring loop. Relay S1(3) of FIG. 3 is operated in a circuit extending from battery, through the winding of relay S1(3), over lead 300 into FIG. 4, thence over contact 1 of relay S(4), over conductor 400 back into FIG. 3, and to ground over contact 8 of relay CH(3). Relay S1(3) provides ground potential over its contacts 7 and 6 and over conductors 301 and 302 into FIG. 4 to the sleeve conductors of the incoming and outgoing ends of the crossbar switch structure to hold operated the two sets of hold magnets illustrated in the lower left and lower right portions of FIG. 4.

The ringing control relay RC(4) in FIG. 4 will have been operated and held operated in a circuit extending frrom battery, through its winding, over its contact 5, over contact 1 of the ringing trip relay RT(4), over conductor 303 into FIG. 3, thence over a contact of the ringing selection switch to conductor 304, extending to ground over contact 3 of relay S1(3). The ringing selection switch illustrated in the lower right-hand portion of FIG. 3, a crossbar switch in accordance with the A. J. Busch patent, will have been operated such that the small circles illustrate the cross point connections being held operated under control of the ringing selection switch hold magnet RSHM(3), which is held operated in a circuit extending from battery, through its winding, conductor 305 extending into FIG. 4, thence over contact 6 of relay RC(4), conductor 401 extending into FIG. 3, and over contact 4 of relay CH(3) to ground on conductor 304.

Relays CS(4) and CH(3) will be released, whereupon ground will extend in FIG. 4 over contact 1 of relay CS(4), over conductor 402 into FIG. 3, thence over contact 1 of relay CH(3) to the junction in the upper left-hand corner of FIG. 3 between the B and C resistances, thereby to maintain the C condenser discharged. The C condenser in FIG. 3 is connected over contact 2 of relay S1(3) and contact 1 of relay F(3) to the starter anode of the CH timer gas tube in the upper right-hand corner of FIG. 3, which tube cannot function as long as the C condenser is maintained discharged. The PU(4) relay of FIG. 4 will have been operated in a circuit extending in FIG. 4 from battery, through its winding, over conductor 403 into FIG. 3, thence over contact 9 of relay CH(3), thence over conductor 306 into FIG. 4, thence over contact 4 of relay RC(4), over conductor 404 into FIG. 3, thence over a crosspoint of the ringing selection switch to conductor 303 back over another contact of the ringing selection switch to off-normal ground on conductor 304. Relay PU(4), in operating extends the operating ground in FIG. 4 on conductor 404 over its own contact 3 to off-normal ground on conductor 304 independently of the connections existing through the ringing selection switch of FIG. 3.

It will be noted in FIG. 4 that the windings of relay CS(4) are disconnected from the tip and ring loop extending to the incoming trunk of FIG. 7 by virtue of the operation of relay RC(4), and specifically by virtue of the fact that contacts 1 and 10 of relay RC(4) are disconnected from the circuit.

Under these circuit conditions of the central office circuitry of FIGS. 3 and 4, ringing current will be applied to the trunk circuit extending to the call distributor incoming trunk of FIGS. 6 and 7. Ringing ground extends from the lower right-hand portion of FIG. 3, through the ringing selection switch to conductor 405 into FIG. 4, thence over contact 1 of relay PU(4) and over contact 2 of relay RC(4) to the tip conductor extending through the crossbar switches to the tip lead T(1) extending to the incoming trunk of FIG. 7. In FIG. 3, the battery supply for ringing is indicated in a small box within the confines of the ringing selection switch and is designated to indicate that the potential on the lead of interest is minus 48 volt direct current potential with 20 cycle ringing current superimposed thereon: this battery potential extends through the ringing selection switch to conductor 406 into FIG. 4, through the winding of the ringing trip relay RT(4), over conductor 307 back into FIG. 3, over a contact of the ringing selection switch, conductor 407 into FIG. 4, over contact 2 of relay PU(4), and over contact 9 of relay RC(4) to the ring lead extending through the crossbar switches to the ring lead R(1) extending to the incoming trunk circuit of the call distributor in FIG. 7.

*Incoming trunk detects call*

It will be recalled from previous description that the normal condition of the incoming trunk circuit of FIGS. 6 and 7 is represented as shown on the drawing by all of the relays therein being in the released condition. Under these circumstances a circuit exists from the lower left-hand corner of FIG. 7 over the T(1) lead from the central office trunk circuit of FIG. 4, over contact 1 of relay G(7), through the left-hand winding of relay R(7), over conductor 700 into FIG. 6, thence through the left-hand winding of relay R1(6), back through the right-hand winding of relay R1(6), thence over conductor 701 back into FIG. 7, through the right-hand winding of R(7), and over contact 2 of relay G(7) to conductor R(1) extending to the central office circuitry of FIG. 4. The windings of relay R(7) are of relatively low impedance (such as 200 ohms each) while the windings of relay R1(6) are of relatively high impedance (such as 12,500 ohms for the left-hand winding and 7500 ohms for the right-hand winding): under these circumstances it will be appreciated that the sum of the four windings of relays R1(6) and R(7) represent to the tip-ring loop extending back to the central office a total impedance in the neighborhood of some 20,400 ohms. This relatively high impedance (20,400 ohms) represents to the central office an "on-hook" signal indicating that the trunk circuit of FIGS. 6 and 7 is in an unanswered condition. At certain times during the operation of the circuitry of FIGS. 6 and 7, as will appear from subsequent description, a short circuit will be placed across conductors 700 and 701, either in FIG. 7 or in FIG. 6, thereby short-circuiting the windings of relay R1(6) and presenting to the central office the sum of 400 ohms impedance through the windings of only relay R(7): this relatively low impedance (400 ohms) will represent to the central office circuit an "off-hook" signal from the trunk circuit of FIGS. 6 and 7 indicating that this trunk circuit is in an answered condition.

The incoming ringing potential and ground signals existing on the ring and tip leads R(1) and T(1) extending into FIG. 7 from the central office will cause the operation of relay R1(6), relay R(7) not being able to operate in this circuit due to the relatively small current flowing therein as a result of the high impedance on-hook condition of the trunk circuit. In FIG. 6, the operation of relay R1(6) causes the operation of relay R3(6) in an obvious circuit extending over contact 1 of relay R1(6). Upon the operation of relay R3(6), a circuit is completed for causing the operation of relay R2(6) extending from ground, over contact 2 of relay R3(6), over contact 12 of relay CR(6), contact 5 of relay CA(6), through thermistor A and to battery through the winding of relay R2(6): after a short delay determined by the characteristics of thermistor A (a short time interval after the completion of the circuit thermistor A will warm up due to the current passing therethrough and as a consequence will reduce its resistance to a point where sufficient current will be allowed to pass through the winding of relay R2(6) to cause it to operate), relay R2(6) will operate and will complete a locking circuit for itself over its own contact 3, thereby short-circuiting thermistor A allowing it to cool down and allowing relay R2(6) to remain locked operated.

Relay R2(6), in operating, completes an obvious circuit over its contact 5 to cause the peg count totalizer in FIG. 6 to register a usage of the trunk circuit. Relay R2(6), in operating, also causes the lamp TK1 in FIG. 6 to light steadily at the supervisor's lamp position to indicate that a call has been accepted by this particular trunk. This circuit extends from battery in FIG. 7, through the D resistance, over contact 2 of relay AN1(7), over conductor 702 into FIG. 6, thence over contact 3 of relay BF(6), over contact 10 of relay R2(6), to ground through the filament of lamp TK1. In addition to the above functions, relay R2(6), in operating, causes the trunk group peg count circuit of FIG. 10 to register a use of a trunk in the trunk group of which the trunk of FIGS. 6 and 7 is a member and partially completes a circuit for causing the operation in FIG. 6 of the trunk start relay ST(6). Of course it will be appreciated, as more fully described hereinafter, that the operation of the start relay ST(6) of the incoming trunk circuit of FIG. 6 is contingent upon the common group circuit of FIGS. 12, 13 and 14 allowing this to take place.

As mentioned above, the operation of relay R2(6) causes the trunk group peg count circuit of FIG. 10 to register one trunk usage in the trunk group in question. Upon the operation of relay R2(6), ground in FIG. 6 is removed from contact 1 of this relay and lead B(1) is connected over contact 2 of the relay to conductor PC1(1) both extending into the circuitry of FIG. 10. In the upper right-hand portion of FIG. 10 lead B(1) is therefore connected to lead PC1(1) at the left-hand side of FIG. 10 indicated as extending from trunk No. 1 of FIG. 6. When this negative battery potential is applied to conductor PC1(1), a negative pulse is transmitted through the Zener diode CR1 to the base of transistor Q1. This negative pulse will appear at the base circuit of transistor Q1 for a length of time depending upon how long it takes the combination of condenser C1 and resistance R1 to charge up the capacitance of condenser C1, which time element might be in the order of 100 microseconds. Prior to the existence of this negative pulse the condition of the circuitry shown in FIG. 10 is that transistor Q2 is fully on and transistors Q1 and Q3 are turned off. Transistor Q1 is held in a turned off condition by virtue of the fact that ground is applied to the emitter through Zener diode CR2 and to the base through resistance R6 thereby back-biasing transistor Q1. Transistor Q3 is turned off by virtue of the fact that ground is applied to its emitter through varistor V and to its base through resistance R7 thereby back-biasing transistor Q3 to maintain it in a turned-off condition. The base of transistor Q2 is held at a negative potential through resistance R3; and, the emitter of transistor Q2 is maintained at ground potential by a direct connection thereto. Thus, transistor Q2 is fully turned on, to in effect transfer the ground on its emitter across the low impedance base-collector junction to the left-hand electrode of Zener diode CR3. When the short duration negative pulse appears on the base circuit of transistor Q1, this transistor becomes forward-biased for the duration of the pulse, thereupon becoming turned-on, at which point the collector of transistor Q1 (the left-hand electrode of condenser C3) is in effect connected to ground potential: this positive swing in voltage at the collector of transistor Q1 causes a positive pulse to be extended through condenser C3 to the base circuit of transistor Q2, thereby turning off transistor Q2: when transistor Q2 is turned off, the collector circuit thereof (the left-hand electrode of Zener diode CR3) is allowed to swing in a negative direction, thereby extending a negative pulse to the base of transistor Q3: transistor Q3 thereupon becomes forward biased and in effect connects ground potential through its emitter-base-collector low impedance junction through the winding of the traffic register REG to negative potential on the left-hand electrode of Zener diode CR4. The traffic register REG thereupon actuates a counter to register the fact that one of the trunks in the trunk group associated with this particular trunk group peg counter has been taken into use. As soon as the negative pulse on the base of transistor Q1 subsists (as indicated above to be in the area of 100 microseconds), transistor Q1 will again become reverse-biased by virtue of ground potential extending to the base and emitter thereof, whereupon transistor Q1 will be turned off: when transistor Q1 turns off, its collector swings toward negative potential, thereby applying through capacitor C3 a negative potential to the base of transistor Q2 to again turn on transistor Q2: when transistor Q2 is turned on, its collector again swings toward ground potential, applying a positive pulse through Zener diode CR3 to the base of transistor Q3 to turn off transistor Q3: when transistor Q3 is turned off, the traffic register REG is released and the circuit has been returned to normal in a very short interval of time (perhaps the order of 100 to 200 microseconds) in order to be in condition to register another indication from another trunk circuit in the same group on other PC1( ) lead indicated within the upper box of FIG. 10 at the left-hand side.

As was mentioned above, the operation of relay R2(6) enables the operation of the trunk start relay ST(6) if the common group circuit of FIGS. 12, 13 and 14 permits this action to take place. In this respect a circuit is extended from battery in FIG. 6, through the winding of relay ST(6), over contact 2 of relay C0(6), contact 6 of relay R2(6), over the closed contact of the T1 jack, to the ST(1) lead extending into the common group circuit to FIG. 13. Whether or not the ST(6) relay of the incoming trunk circuit will be operated depends upon whether or not the trunk gate in the common group circuit of FIG. 13 is open or closed.

*Trunk call enters trunk gate*

In FIG. 13, with reference to relay TG(13), if this relay is released it will be noted that ground is applied to all of the start leads ST(1) through ST(6) of the incoming trunk circuits, thereby to permit the operation of their respective start relays; whereas, if relay TG(13) is operated, the trunk gate is said to be "closed" such that none of the start leads to the incoming trunks have ground appearing thereon. Furthermore, if relay TG(13) is operated, ground is applied over contact 1 thereof to the DA lead extending to the delayed answer announcement circuitry of FIG. 8 to initiate a timing operation for causing a machine announcement to be supplied to any trunk waiting to be connected to an attendant if the wait extends beyond a prescribed interval of time.

It has been assumed, in accordance with previous discussion, that the normal starting condition of the common group circuit of FIG. 13 finds the trunk gate relay TG(13) released. Therefore, the start relay ST(6) of incoming trunk circuit of FIGS. 6 and 7 will operate in the heretofore described circuit extending to ground over contact 2 of relay TG(13). In FIG. 6, upon the operation of relay ST(6), this relay completes a locking circuit for itself extending over its own contact 3 and contact 1 of relay BF(6) to ground over contact 2 of relay R3(6). Upon the operation of relay ST(6) in FIG. 6, ground is extended over contact 10 of relay CO(6) and contact 2 of relay ST(6) to the ST1(1) lead extending into FIG. 12, and ground extends over contact 11 of relay CO(6) and contact 1 of relay ST(6) to the ST2(1) lead extending into FIG. 12. In FIG. 12 the grounds on these two leads ST1(1) and ST2(1) extend through the two windings of relay ST(12) to battery, thereupon causing the operation of this relay. It will be noted in passing that the ST1( ) and ST2( ) leads from all of the other incoming trunks circuits of FIG. 16 also extend to the windings of relay ST(12) in FIG. 12, such that as long as any one trunk has its start relay operated, the relay ST(12) of the common group circuit of FIG. 12 will be operated. Relay ST(12), in operating, causes the release of relay DS(12), the release thereof completing circuitry for operating relay CW(13) of FIG. 13. This circuit extends from ground in FIG. 12, over contact 1 of relay DS(12) over contact 6 of relay ST(12), to conductor 1200 into FIG. 13, to battery through the upper winding of CW(13), and from ground in FIG. 12, over contact 2 of relay DS(12), over contact 4 of relay ST(12), over conductor 1201 into FIG. 13, and to battery through the lower winding of relays CW(13), which relay thereupon operates. Relay CW(13), in operating, extends ground over its contact 3 and over contacts 1 of relays SAA(13) and SA(13) to the G1 lead, through the winding of relay TG(13), over the B1 lead, over contacts 6 of relays SA(13) and SAA(13), through resistance A, and to negative battery through the winding of relay BS(13). Relays BS(13) and TG(13) operate in the immediately described circuit. The operation of relay TG(13) removes ground from the start leads ST(1) through ST(6) to all of the incoming trunk circuits so that any trunk not having its start relay operated at this particular time is excluded from the trunk gate until such time as relay TG(13) again releases.

As has been mentioned above, when the trunk gate of the common group circuit is closed, as indicated by the operation of relay TG(13) in FIG. 13, ground is extended from FIG. 13, over contact 1 of relay TG(13), over the DA lead to the delay answer announcement circuitry of FIG. 8 to start a timing period to determine whether or not a delayed answer announcement should be supplied to trunks which have not been answered. Since the present detailed description is concerned with describing those operations leading up to the answer of an incoming trunk call in a regular manner, that is by an attendant, the detailed description of what takes place in connection with a delayed answer announcement will be reserved for subsequent description in the detailed description of a trunk call which is given a special answer by connecting it to the delayed answer announcement machine of FIG. 9. It will be assumed for the present purposes that the connection of the incoming trunk call presently waiting in incoming trunk No. 1 of FIGS. 6 and 7 is connected through to a regular attendant at console No. 1 in FIG. 19 before the time-out period of the delayed answer announcement circuitry of FIG. 8. The total period of time measured by the delayed answer announcement circuit of FIGS. 8 and 9 is approximately 25 seconds, which for present purposes it will be assumed does not occur prior to the time that the connection is completed from the trunk circuit of FIGS. 6 and 7 to the console No. 1 of FIG. 19.

As has been mentioned previously, whenever there are any trunk finders, such as the trunk finder of FIG. 11, available for accepting calls, it being recalled that an idle trunk finder is always associated with an idle available console position, the common group circuit of FIGS. 13 and 14 will have registered an indication of this condition by the operation in FIG. 14 of relays CH(14) and S(14), by the operation in FIG. 13 of relays DA(13) and DA1(13) and by the released condition in FIG. 13 of relays SR1(13) and SR2(13). As long as this condition prevails, ground will be applied to conductors 1302 and 1303 in FIG. 13 from respective contacts 2 and 3 of relay DA1(13) and from contacts 1 of relays SR1(13) and SR2(13).

In FIG. 13, as long as relays CW(13), TG(13) and BS(13) are operated, indicating that the trunk gate is closed but that incoming trunk calls exist which have not been taken care of, the grounded conductors 1302 and 1303 will be extended over contacts 2 and 1 of relay CW(13) and contacts 1 and 2 of relay BS(13) to conductors 1301 and 1300 extending into FIG. 12 to battery through the windings of relay CP(12). Relay CP(12) operates in the previously described circuit and initiates a timing operation consisting of the successive energizations of the windings of slow operate relays SO(12) and SO1(12) in obvious circuits shown in FIG. 12. If relay CP(12) remains operated long enough, relay SO1(1) will operate in about 8 to 11 seconds after the operation of relay CP(12), to thereby cause the energization of relay TO(12). Also, at the time that relay CP(12) is operated, an obvious circuit is completed for energizing the winding of relay SX(12) which, being a slow operate relay, is arranged to operate in some fifteen to thirty seconds after the operation of relay CP(12), to thereby in turn cause the operation of relay TO(12) in the event that some circuit difficulty has prevented the normal operation of relay SO1(12) prior to the time when relay SX(12) would operate. The operation of relay TO(12), if such ever occurs, causes the operation of relay TO1(12) and initiates other switching operations in connection with the common group circuitry. These circuit operations will result, as mentioned hereinbefore, only under the circumstance that a call-blocked condition exists, namely trunk circuits inside the trunk gate waiting for their calls to be extended where there apparently are idle available trunk finders and consoles to handle these calls. The net effect of the operation of relays TO(12) and TO1(12), if these operations ever occur, is to open the trunk gate by releasing relay TG(13) and to open the position gate by releasing relay PG(14), to thereby admit all waiting trunks and all available positions to the common control circuit, at which time the contacts of relay TO1(12) will connect together in FIG. 14 all of the start leads ST(1) through ST(6) corresponding to all trunk groups, thereby to cause all idle trunk finders to start looking for trunks at the same time—a so-called trunk finder shower. When the trunk finder shower has completed its operation, the common group circuit will return to its normal condition and proceed to open and close the trunk and position gates under normal circumstances.

The detailed operation of this trunk finder shower will be described separately hereinafter: for present purposes it will be assumed that the incoming trunk call presently being described will have been completed along with all other trunk calls presently existing inside the trunk gate in sufficient time to prevent the time-out period of the common group circuitry of FIG. 12. As soon as all of the trunks inside the trunk gate have been dealt with, relay ST(12) in FIG. 12 will become released, thereby causing the release in FIG. 13 of relay CW(13) which in turn will cause the release of the trunk gate relay TG(13) and relay BS(13), thereby causing the release of relay CP(12) in the timing arrangement of FIG. 12 to recycle the work timing function as previously described. It will therefore be assumed under the present circumstances that this latter action will take place.

If at any time all of the trunk finders, such as trunk finder No. 1 of FIG. 11, become busy, relays CH(14) and S(14) of FIG. 14 will become released, as will relays DA(13) and DA1(13) of FIG. 13, and relays SR1(13) and SR2(13) will become operated, all as has been mentioned hereinbefore for purposes of opening the position gate—release of relay PG(14)—to allow idle available consoles to accept calls. Under these circumstances it will be noted in FIG. 13 that the ground supplies for conductors 1302 and 1303 will have been removed, thereby causing the release of relay CP(12) to cause the common group call blocking timer to be recycled. This situation merely means that it would not be proper to produce a blocked-call time-out where there were no trunk finders or console positions available to handle these calls. This latter situation is a prime example of a condition under which the delayed answer announcement mechanism of FIGS. 8 and 9 will come into play to provide to any trunks waiting for an answer a message to the effect that the answer will be delayed.

*Trunk finder seizes trunk*

Upon the operation in the incoming trunk circuit of FIGS. 6 and 7 of the start relay (ST(6) when the trunk gate of the common group circuit of FIG. 13 was opened, as indicated by the released condition of relay TG(13), circuitry of the common group circuit was brought into play in order to select an idle trunk finder, such as the trunk finder of FIG. 11, to find the calling trunk and to connect it through an attendant trunk circuit, such as the one shown in FIG. 15, to an idle attendant console such as console 1 of FIG. 19. Relay ST(6), in operating, completes a circuit for operating the trunk group relay G1(14) in FIG. 14 and representing the group of trunks of which the trunk of FIGS. 6 and 7 is one. In FIG. 6 a multiple lead is shown in the lower right hand corner designated with reference numeral 601 and it will be understood that this lead represents conductor G(1) extending to other incoming trunks (not shown) in the same finder sub-group as the trunk of FIGS. 6 and 7. Upon the operation of relay ST(6), ground is extended from FIG. 6 over contact 8 of relay CO(6), over contact 4 of relay ST(6), and over the lead G(1) of FIG. 14 to battery through the winding of relay G1(14), which thereupon operates. Relay G1(1), in operating, extends ground over its contact 2 in FIG. 14 to conductor A1 extending to all of the trunk finders of FIGS. 11 and 17 to indicate to these trunk finders the particular finder level upon which this trunk appears. For instance, in FIG. 11 it will be noted that conductor A1 appears on level 6 of the commutator; whereas, in FIG. 17 conductor A1 appears on level 3 of trunk finder 2 and level 5 of trunk finder 14. Therefore, when one of these three trunk finders is started into operation to find the calling incoming trunk of FIGS. 6 and 7, the grounding of the commutator brush will cause the particular trunk finders to stop in its vertical motion on that particular level and then to hunt in a rotary direction to find the terminal of the calling trunk. It will be assumed that the trunk finder of FIG. 11 is the one which is brought into play to effect the connection since the details thereof are shown. While it will be apparent that others of the relays G1(14) through G6(14) of the common group circuit may very well be operated due to the fact that other incoming trunk circuits may be in a calling condition and may have been accepted by the trunk gate of FIG. 13, nevertheless for present purposes it will be assumed that the incoming trunk of FIGS. 6 and 7 is the only one which has a call waiting thereon. This will simplify the subsequent description. However later an explanation will be set forth with respect to what complications are added by the possible existence of a plurality of operated G( ) relays of FIG. 14.

Upon the operation of relay G1(14) in FIG. 14 of the common group circuit, ground is applied to the start lead ST(1) corresponding to the indicated group of incoming trunks. This circuit extends from ground on the BCO1 lead in FIG. 12, extending into FIG. 13, thence over contact 3 of relay SR1(13), lead 1304 into FIG. 12, over contact 7 of relay TO(12), conductor 1206 back into FIG. 13, and into FIG. 14, over contact 1 of relay G1(14) to the start lead ST(1).

It will be noted that the start lead ST(1) is connected to contact 3 of the jack No. 1 associated with trunk finder 1 of FIG. 11 and that the other five start leads ST(2) through ST(6) are likewise associated with respective contacts 3 of respective jacks 2 through 6 corresponding to other trunk finders, of which only trunk finders No. 2 and 3 of FIG. 17 have been indicated. The fact that start lead ST(1) is associated with contact 3 of jack No. 1 means that trunk finder No. 1 of FIG. 11 is the preferred trunk finder for this particular start lead representing a given group of trunks. This is shown by following the path of the ground on start lead ST(1) over contact 3 of jack No. 1 to conductor D(1), into FIG. 11 where it appears at contact 7 of relay D(11) of trunk finder No. 1. If trunk finder No. 1 of FIG. 11 is available, its relay D(11) will be released, thereby allowing the ground on conductor D(1) to be extended over contact 8 of relay D(11) to battery through the winding of relay A(11) to seize trunk finder No. 1. On the other hand, if trunk finder No. 1 of FIG. 11 is already engaged, its relay D(11) will be operated, whereupon the ground on conductor D(1) will be extended over contact 7 of relay D(11), and over conductor C(1) back into FIG. 14 and over contact 2 of jack No. 1, thence to contact No. 3 of jack No. 2, where if the trunk finder associated with this jack is idle that trunk finder will be seized, and where if that particular trunk finder is also engaged, the start lead will be extended over contact 2 of jack No. 2 and down the line until such time as the next available trunk finder is found and its relay A( ) is operated. Likewise, the respective start leads in FIG. 14 of the other five assumed trunk groups, such as start leads ST(2) through ST(6), have correspondingly certain preferred trunk finders, such as trunk finder No. 2 of FIG. 17 for the trunk group corresponding to start lead ST(3) in FIG. 14, and such as trunk finder No. 3 of FIG. 17 for the incoming trunk group represented by conductor ST(6) in FIG. 14. It has been assumed that the trunk finder of No. 1 of FIG. 11 is available and, since this is the preferred trunk finder for the incoming trunk group including the trunk of FIGS. 6 and 7, the grounded conductor D(1) in FIG. 11 will be extended over contact 8 of relay D(11) to battery through the winding of relay A(11) thereby causing the operation of this relay A(11).

Upon the operation in FIG. 11 of relay A(11), circuits are completed for causing the repeated operation and release of relay C(11) and the vertical stepping magnet VERT(11) until such time as the commutator shown in the lower left hand corner of FIG. 11 reaches the stepping switch level which has its commutator contact grounded, which in the present example it will be recalled is represented by the grounded conductor A1 extending into FIG. 11 from FIG. 14. Therefore, relay C(11) and the vertical stepping magnet VERT(11) will alternately operate and release such that the switch will step in a vertical direction each time the vertical stepping magnet operates until such time as the commutator brush 1100 reaches the grounded contact No. 6 associated with conductor A1, whereupon the vertical stepping will be arrested and the rotary stepping will be initiated searching for the trunk appearance of the trunk of FIGS. 6 and 7, which is indicated in the upper left hand corner of FIG. 11 representing the sixth horizontal level in the two motion trunk finder switch. The circuit for operating relay C(11) extends from ground, over contact 4 of relay A(11), over the contact of the vertical stepping magnet VERT(11), over contact 1 of the rotary stepping magnet ROT(11), through the lower winding of relay C(11), to battery over contact 5 of relay D(11). Relay C(11) operates in this circuit, thereby completing the operating circuit of the vertical stepping magnet VERT(11) extending from ground, over contact 4 of relay A(11), over the contact of relay C(11), over contact 4 of the slow operate relay E(11), through the winding of the vertical stepping magnet, to battery over contact 5 of relay D(11). As soon as the vertical stepping magnet operates, however, it opens at its contact the operating circuit for relay C(11), which thereupon releases, in turn opening the operating circuit of and releasing the vertical stepping magnet. Upon the release of the vertical stepping magnet VERT(11), the previously described operating circuit for relay C(11) is again completed and upon the re-operation of relay C(11) the vertical stepping magnet is operated again. This sequence of events continues causing the commutator brush 1100 to make one vertical step each time the vertical stepping magnet VERT(11) operates until such time as the commutator 1100 hits the grounded commutator segment No. 6 to which is connected conductor A1.

As soon as the commutator brush 1100 reaches the grounded commutator segment No. 6 a circuit is completed in FIG. 11 over the commutator brush 1100, through the lower winding of relay E(11), over contact 1 of the rotary stepping magnet ROT(11), through the lower winding of relay C(11), to battery over contact 5 of relay D(11). Relay C(11) is held operated in this circuit and relay E(11) is energized; but, due to the slow operate characteristic of relay E(11), it will not operate until a prescribed interval of time after its lower winding is energized. When relay E(11) finally operates, it completes a holding circuit for itself extending from ground, over contact 4 of relay A(11), over its own contact 6, through its upper winding, through the winding of the vertical magnet VERT (11), to battery over contact 5 of relay D(11). Although relay E(11) is held operated in this immediately described circuit, the impedance of the upper winding of relay E is sufficiently high to cause the vertical magnet VERT(11) to release, thereby completing a circuit through its contact and contact 1 of the rotary magnet ROT(11) for now controlling relay C(11) to cause rotary stepping. Relay E(11) in operating, also causes the operation of the rotary stepping magnet ROT(11) in a circuit extending over contact 4 of relay A(11), the contact of relay C(11), contact 5 of relay E(11), to battery through the winding of magnet ROT(11). Magnet ROT(11), in operating, causes the release of relay C(11), the release of which in turn causes the release of the rotary magnet ROT(11), which in turn causes the re-operation of relay C(11), etc. such that relay C(11) and the rotary stepping magnet ROT(11) continue to pulsate and drive the trunk finder in a horizontal direction across level No. 6 looking for battery potential on the trunk sleeve conductor, such as sleeve conductor S(1) in the upper left hand corner of FIG. 11 corresponding to trunk No. 1 of FIGS. 6 and 7.

As soon as the rotary stepping has caused the four wipers in the upper left hand corner of FIG. 11 to reach the terminals corresponding to the calling trunk of FIGS. 6 and 7, resistance battery will be found on conductor S(1) in the upper left hand corner of FIG. 11. This resistance battery extends from the winding of relay CO(6) in FIG. 6, over contact 5 of relay ST(6), to conductor S(1) into FIG. 7, thence appearing in the terminal bank of all of the trunk finders of FIGS. 11 and 17, and particularly conductor S(1) in the upper left hand corner of FIG. 11. When the sleeve wiper of the trunk finder of FIG. 11 strikes this terminal, a circuit is completed for partially operating the two-step relay B(11) through its lower winding, said circuit extending from ground over contact 3 of relay A(11), through the upper winding of relay C(11), thence over contact 2 of relay D(11), through the lower winding of relay B(11), through diode 1101, over the sleeve wiper, thence to the sleeve conductor S(1) into FIGS. 7 and 6, over contact 5 of relay ST (6), to battery through resistance B in FIG. 6. Enough current flows through this circuit to hold operated relay C(11) on its upper winding and to cause the two-step relay B(11) to operate sufficiently to close its contact No. 4. When contact 4 of relay B(11) is closed, a circuit is completed through the upper winding of relay B(11) to cause it to fully operate. This circuit extends from battery in FIG. 11, through the upper winding of relay B(11), over contact 4 of relay B(11), thence over contact 2 of the still operated rotary magnet ROT(11), and over the contact of relay C(11) to ground over contact (4) of relay A(11). The energization of the upper winding of relay B(11) causes relay B(11) to fully operate, thereby causing all of its contacts to either close or open, to cut through the connection from the incoming trunk of FIGS. 6 and 7 to the attendant trunk of FIG. 15. The relay operations which take place in the two trunk circuits will be described presently after a description of the final operations which take place within the trunk finder of FIG. 11 upon the operation of relay B(11). Upon the operation of relay B(11), a circuit is completed for causing the operation of relay D(11) extending from ground in FIG. 11, over contact 2 of the vertical off-normal switch VON (which closed its contacts as soon as the vertical stepping of the trunk finder began), thence over contact 5 of relay B(11), to battery through the upper winding of relay D(11).

The operation of relay D(11) opens at its contact 1 the chain circuit which is helping to hold operated in FIG. 14 relays CH(14) and S(14); but, it will be assumed that other trunk finders have their corresponding relays D( ) still released such that the chain circuit relays CH(14) and S(14) will remain operated. Relay D(11) also transfers the start lead in FIG. 11 over its contact 7 so that conductor D(1) is now connected to lead C(1) extending into FIG. 14, thereby to transfer to the next available trunk finder any start lead attempts to cause the operation of relay A(11) in trunk finder of FIG. 11 which has already become engaged. Furthermore, the operation of relay D(11) de-energizes the winding of the slow-release relay A(11) which, however, remains operated for a prescribed interval of time (determined by its slow release characteristic) in order to allow a few circuit operations to take place prior to the actual release of relay A(11). Relay D(11), in operating, also causes the release of relay C(11), of the rotary stepping magnet ROT(11) and of relay E(11). At this time ground extends over contact 3 of relay A(11) to contacts 3 and 4 of relay D(11): ground extends over contact 3 of relay D(11), contact 9 of relay F(11), contact 7 of relay B(11), and through diode 1101 to place ground potential on the sleeve conductor S(1) extending into the incoming trunk circuit of FIGS. 6 and 7 to perform a switching operation which will be described below; and, ground extends over contact 4 of relay D(11) and contact 4 of relay B(11) to hold operated the latter relay. As was mentioned above, relay A(11) in FIG. 11, whose winding became de-energized upon the operation of relay D(11), will remain operated until such time as a circuit operation occurs in the attendant trunk circuit of FIG. 15 to apply ground to lead A(1) extending from FIG. 15 back into FIG. 11, this ground being supplied over contact 3 of relay A(11) prior to the time that relay A(11) becomes released.

*Call completed to attendant console*

As mentioned hereinbefore, upon the operation of relay D(11) of the trunk finder of FIG. 11, solid ground is applied in FIG. 11 through diode 1101 and over the sleeve wiper to the sleeve lead S(1) into the trunk circuit of FIG. 7, thence into FIG. 6, over contact 5 of relay ST(6), to battery through the winding of relay CO(6), which thereupon operates and locks in a circuit over its own contact 5, to ground on the sleeve conductor S(1). Relay CO(6), in operating, de-energizes the winding of relay R2(6), which will release after a period of time determined by its slow release characteristic. In the meantime, the operation of relay CO(6) removes ground from conductor G(1) into the common group circuit of FIG. 14, thereby to release relay G1(14) in FIG. 14 assuming that no other trunk in the same group with the trunk of FIGS. 6 and 7 has applied ground to the same lead G(1) in the lower right hand corner of FIG. 6 on conductor 601. It will be assumed that no other such trunks have grounded this lead G(1) into FIG. 14, thereby permitting relay G1(14) to release, disconnecting ground from the start lead ST(1) in FIG. 14 and removing ground from the leads A1 extending to the trunk finders of FIGS. 11 and 17 for purposes of controlling the vertical stepping commutators, such as the commutator brush 1100 of FIG. 11. Also, the operation of relay CO(6) removes ground in FIG. 6 from conductors STI(1) and ST2(1) extending into the common group circuit of FIG. 12 to the winding of relay ST(12).

Assuming that no other incoming trunk circuits are presently placing calls, ground will have been removed in FIG. 12 from all of the leads ST1(1) through ST1(6) and ST2(1) through ST2(6), thereby allowing relay ST(12) to release, which causes the re-operation of relay DS(12) and the release in FIG. 13 of relays CW(13), BS(13) and TG(13). This action will release relay CP(12) in FIG. 12 (thereby re-cycling the common group timer circuit) and will allow any other trunks waiting to enter the trunk gate to have their start relays operated from the ground in FIG. 13 over contacts 2 through 7 of relay TG(13), all as has been described hereinbefore.

It is entirely probable, and even more likely, that there will be additional trunk circuits having calls waiting, whereupon the relays of the common group circuit of FIGS. 12 and 13 will undoubtedly remain in their previously described condition. And in this respect, there will most likely be more than one G( ) relay of FIG. 14 operated, thereby causing additional trunk finders to look for additional incoming trunk calls. However, these operations of the common group circuit do not effect the operation of the present trunk completion description since the latter takes place substantially independently of the functions of the common group circuit.

Returning now to the description of the operation of relays in the trunk circuit of FIGS. 6 and 7, upon the operation of relay CO(6) a circuit is completed for causing the operation of relay COX(7) in a circuit extending from ground in FIG. 6, over contact 9 of relay CO(6), over conductor 604 extending into FIG. 7, to battery through the winding of relay COX(7), which thereupon operates but accomplishes no active function at the moment except to open at its contact 1 the operating circuit of relay AN1(7) to prevent the operation of this relay, the significance of which will be appreciated in subsequent description of the delayed answer announcement functions in connection with the circuitry of FIGS. 8 and 9 if the answering of an incoming trunk call is delayed beyond a prescribed interval of time.

Eventually, relay R2(6) of FIG. 6 will have released, whereupon a circuit is completed for causing the operation of CA(6) extending from ground in FIG. 6, over contact 3 of relay R3(6), over contact 3 of relay EA(6), contact 1 of relay CO(6), contact 4 of relay R2(6), to battery through the winding of relay CA(6), which operates and locks over its own contact 4 to ground at contact 3 of relay R3(6) independently of relays EA(6), CO(6) and R2(6). Also, the release of relay R2(6) removes ground at its contact 5 from the trunk count totalizer in FIG. 6, and at its contact 1 and 2 causes the trunk group peg count circuit of FIG. 10 to return it to its normal condition.

The operation of relay CA(6) of the incoming trunk circuit of FIG. 6 completes circuits to be presently described for cutting-through the connection from the incoming trunk of FIGS. 6 and 7 through the attendant trunk of FIG. 15 to the console of FIG. 19. Relay TR(15) of the attendant trunk circuit of FIG. 15 is caused to operate in a circuit extending from battery in FIG. 7, through the winding of relay TR(7), over conductor 703 into FIG. 6, thence over contact 1 of relay CA(6), over conductors 605 and C(1) into FIGS. 7 and 11, over contact 5 of relay F(11) and contact 3 of relay B(11) to conductor C(1) extending to the trunk finder of FIG. 15, and thence through the upper winding of relay TR(15) and through the lower winding of relay TR(15) to ground through the TR resistance. Relay TR(15) operates in this circuit but relay TR(7) of the incoming trunk circuit of FIG. 7 does not operate in this circuit. Upon the operation of relay TR(15) in the attendant trunk circuit of FIG. 15, ground is extended over its contact 2 to the left side of the winding of relay SV(15), thereby holding relays SV(15) and PB(15) operated independently of the ground through diode 1500 in FIG. 15. Also, a circuit is completed for operating relay PW(15) extending from battery in FIG. 15, through the PW resistance, over contact 1 of relay TR(15), to ground through the winding of relay PW(15). The operated relay PW(15) applies ground over its contact 3 to conductor A(1) extending into the trunk finder of FIG. 11 to ground the conductor A(1) therein before relay A(11) of the trunk finder releases (see above). Also, the operation of relay PW(15) causes the source of ZIP TONE in FIG. 15 to be extended through the TN condenser, over contact 2 of relay ST(15), contact 1 of relay PW(15), over contact 3 of relay CONF2(15), over the ring conductor R(1) into the console of FIG. 19, thence over contact 3 of the operated IN key, returning to FIG. 15 over conductor R2(1), thence over contact 6 of relay CONF2(15), back to the console over lead RT(1), thence over contact 1 of the A jack, and through the noise filter to the transformer A, returning on conductor TT(1) back into FIG. 15, over contact 1 of relay CONF2(15) over conducttor T2(1) into FIG. 19, over contact 2 of the FL key, contact 2 of the IN key, lead T(1) into FIG. 15, over contact 2 of relay CONF2(15), conductor T(1) into FIG. 11, thence over contact 2 of relay B(11) and contact 3 of relay F(11), over the tip brush of the trunk finder to conductor T(1) into the incoming trunk circuit in FIG. 7, thence over contact 1 of relay TR(7), and over conductor 704 into FIG. 6, through the lower winding of relay BF(6), to ground over contact 8 of relay CA(6). This ZIP TONE will be supplied in this circuit to the telephone set of the operator at the console of FIG. 19 by induction through the retard coil A in FIG. 19 until the relay ST(15) of the attendant trunk circuit in FIG. 15 releases. In the meantime, the operation in FIG. 15 of relay PW(15) causes the PB lamp in FIG. 15 to light steadily and causes the PA lamp to become extinguished: the circuit for causing lamp PB to light steadily extends from ground in FIG. 15, over contact 4 of relay PW(15), through the PB resistance and the winding of the PB lamp to battery; and, the circuit for causing the PA lamp of FIG. 15 to become extinguished is the opening of contact 6 of relay PW(15). Also, the operation of relay PW(15) causes the IN lamp in the console of FIG. 19 to light steadily in a circuit extending from the source of 10 volt alternating current potential in FIG. 15, over contact 5 of relay PW(15), over the L(1) conductor into FIG. 19, to ground through the filament of the IN lamp.

While the foregoing circuit operations are taking place, the operation of relay PW(15) opens its contact 7 and de-energizes the winding of relay ST(15). After a period of time determined by the slow release characteristic of relay ST(15), this relay will release, thereby completing at its contact 1 the tip-ring circuit between the incoming trunk of FIGS. 6 and 7 and the console of FIG. 19, removes ZIP TONE at its contact 2, reapplies over its contact 4 ground to conductor D(1) extending into the trunk finder of FIG. 11 to supplement the ground supplied in FIG. 11 over contact 2 of the vertical off-normal switch VON, opens at its contact 5 a further point in the locking circuit in the relay ST(15), and removes at its contact 6 ground supplied to conductor A(1) to the trunk finder of FIG. 11, which ground is now being supplied over contact 3 of relay PW(15).

Relay ST(15), in releasing in the attendant trunk circuit of FIG. 15, thereby completing the tip-ring loop between the incoming trunk of FIGS. 6 and 7 and the attendant's telephone circuit in FIG. 19, completes a circuit for operating relay BF(6) in the incoming trunk circuit of FIG. 6. This circuit extends from ground and battery over respective contacts 8 and 9 of relay CA(6), through the lower and upper windings of relay BF(6), conductors 704 and 606 into FIG. 7, over respective contacts 1 and 3 of relay TR(7), to the respective tip and ring conductors T(1) and R(1) to the trunk finder of FIG. 11, thence over contacts 3 and 1 of relay F(11), over contacts 2 and 1 of relay B(11), tip and ring conductors T(1) and R(1) into the attendant trunk circuit of FIG. 15, where the conductor R(1) extends over contact 1 of relay ST(15) and where the tip and ring conductors extend over contacts 2 and 3 of relay CONF2(15), conductors T(1) and R(1) to the console of FIG. 19, where conductor R(1) extends over contact 3 of the IN key, conductor R2(1) into FIG. 15, contact 6 of relay CONF2(15), lead RT(1) back to FIG. 19, over contact 1 of the A jack, through the noise filter and contact 3 of the dial, through the left hand windings and resistance R1 of the A induction coil, back to conductor TT(1) to FIG. 15, thence over contact 1 of relay CONF2(15), conductor T2(1) into FIG. 19, over contact 2 of the FL key and contact 2 of the IN key, returning to the tip conductor T(1) back into FIG. 15. Relay BF(6) of the incoming trunk of FIGS. 6 and 7 operates in this circuit as an indication that the call previously existing in this trunk circuit has been answered and, in operating, releases relay ST(6).

The operation of relay BF(6) is going to cause ringing trip operations to take place in the central office circuitry of FIGS. 3 and 4 and is going to cause the area identity machine of FIG. 5 to provide to the answering attendant at the console of FIG. 19 the pre-recorded word or phrase identifying the area of origin of this particular incoming trunk.

*Central office ringing trip*

The operation in FIG. 6 of relay BF(6), indicating that this incoming trunk call has been answered, causes a ringing trip operation to take place in the central office circuitry of FIGS. 3 and 4. This ringing trip function is accomplished by contact 2 of relay BF(6) in completing a circuit between conductors 700 and 701 in FIG. 6, thereby short-circuiting the winding of relay R1(6), the short-circuit across conductors 700 and 701 extending into FIG. 7 across the winding of relay R(7), thereby reducing the impedance presented to the central office circuitry from some 20,400 ohms (the total impedance of all of the windings of relays R(7) and R1(6) of the incoming trunk circuit) to a very low impedance of only about 400 ohms (represented by only the R(7) relay windings). As has been mentioned hereinbefore, this change of impedance signaling back to the central office circuitry of FIGS. 3 and 4 from the relatively high impedance to the relatively low impedance represents a change of signal from "on-hook" to "off-hook" (unanswered to answered condition of the trunk circuit of FIGS. 6 and 7). It will be recalled from previous descriptions of the central office circuitry of FIGS. 3 and 4, that the ringing signal had been supplied from the central office to the incoming trunk of FIGS. 6 and 7 through the winding of relay RT(4) which, in turn, was in series with the tip-ring loop because of the operated condition of the ringing control relay RC(4). When the loop changes from a high impedance to a low impedance, sufficient current is allowed to flow in the tip-ring loop circuit to cause the operation of the ringing trip relay RT(4). The operation of the ringing trip relay RT(4) causes the release in FIG. 4 of the ringing control relay RC(4), which in turn releases relay PU(4) and causes the release of the ringing selection switch hold magnet RSHM of FIG. 3, thereby opening all of the circuits extending through the crosspoints of the ringing selection switch of FIG. 3 (including relay RT(4) itself). Upon the release of the ringing control relay RC(4), its contacts 10 and 1 complete the tip and ring loop to the windings of the called supervisory relay CS(4) causing it to operate, ground extending through the upper winding of relay CS(4) and over contact 1 of relay RC(4) to the tip conductor extending to the trunk circuit of FIG. 7 and battery extending through the lower winding of relay CS(4) and over contact 10 of relay RC(4) to the ring conductor extending to the incoming trunk circuit of FIG. 7, such that relay CS(4) can operate in series with the low impedance represented by the winding of relay R(7) of the incoming trunk circuit of FIG. 7.

Prior to the operation of relay CS(4), ground was extended over its contact 1 to conductor 402 into FIG. 3, over contact 1 of relay CH(3), to the junction of resistance B and condenser C in the upper left-hand corner of FIG. 3, thereby causing condenser C to remain at substantially ground potential. However, upon the operation of relay CS(4), this ground potential is removed at contact 1 of relay CS(4), thereby allowing condenser C in FIG. 3 to start building up a charge to the positive 130 volt direct current source through resistances B and C. The charge on capacitor C is passed over contact 2 of relay S1(3) and contact 1 of relay F(3) to the starter anode of the gaseous timer tube CH in FIG. 3. The circuitry is arranged such that in some two to five seconds after condenser C begins to accumulate a charge, sufficient potential will be present on the starter anode of the tube CH to cause it to fire and thereby extend a substantial amount of current from the 130 volt source of direct current through its main anode to its cathode, thence over contact 2 of relay F(3), through the upper winding of the relay CH(3), over contact 6 of relay CH(3), to ground over contact 4 of relay S1(3) and to ground over conductor 308 into FIG. 4 at contacts 2 of relays CS(4) and S(4). Relay CH(3) operates in this circuit and locks through its lower winding, over its own contact 5, to ground on conductor 308. Relay CH(3), in operating, completes over its contact 11 a circuit for making a charge for this call, completes a circuit over its contact 10 to conductor 309 extending into FIG. 4, and thence over contact 7 of relay RC(4) to supply an additional holding ground to the sleeve of the connection extending through the TRUNK and LINE LINK frames of the central office toward the automatic call distributor incoming trunks of FIGS 6 and 7.

The present status of the central office circuitry finds relays S(4) and CS(4) operated and relays RC(4), PU(4) and RT(4) released in FIG. 4 and finds in FIG. 3 relays S1(3) and CH(3) operated with relay F(3) released and with the ringing selection switch in the lower right hand corner of FIG. 3 disconnected. The hold magnets in the lower left portion of FIG. 4 of the central office are being held operated from ground over conductor 301 at contact 7 of relay S1(3); while, the hold magnets in the lower right hand corner of FIG. 4 are being held operated from ground on conductor 302 from contact 6 of relay S1(3) and over contact 7 of relay RC(4) to ground over conductor 309 from contact 10 of relay CH(3). Under these circumstances, a talking connection exists between subscriber S in FIG. 4 and the automatic call distributor console attendant of FIG. 19.

*Trunk area identification*

When relay BF(6) operated in FIG. 6 of the incoming trunk circuit as an indication that the incoming trunk call had been answered by the console attendant of FIG. 19, circuits were completed for enabling the area identity control circuitry of FIG. 5 to momentarily operate the relay AN(7) of FIG. 7 in order to provide to the connected attendant about a one-and-a-half second announcement (such as a word or a phrase pre-recorded on the magnetic drum of FIG. 5) indicating the area of origin of this particular trunk group, such as the city of "Miami." As has been mentioned hereinbefore in connection with a detailed description of the circuitry of the area identity control of FIG. 5, a ground pulse is supplied by the operation of relay ST(5) over leads C(1) through C(6) to all trunk circuits and about one-and-a-half seconds later relay CO(5) is operated to supply ground over conductors C1(1) through C1(6) to all incoming trunks, the grounds appearing on these conductors C(1) et cetera and C1(1) et cetera are only momentary pulses since relay ST(5) and CO(5) are operated only for a very short interval of time. In FIG. 7, when a momentary ground pulse is supplied over conductor C(1) from the area identity control of FIG. 5 this momentary ground pulse is extended over contact 5 of relay AN(7), contact 2 of relay CO1(7), conductor 705 into FIG. 6, thence over contact 4 of the operated relay BF(6), conductor 607 back into FIG. 7, over contact 1 of relay CT(7), to battery through the winding of relay AN(7) operating same. Relay AN(7), in operating, completes a circuit over its own contact 4 to lock itself operated under control of relay CT(7). At its contacts 2 and 6, relay AN(7) connects the tip and ring conductors extending to the console of FIG. 19, through resistances F and G, over conductors T(1) and R(1) into the area identity control circuit of FIG. 5, where they pick-up through transformer T1 the trunk area identity recorded on channel 501 of the magnetic drum 500. The word or phrase pre-recorded on channel 501, such as "Miami," will be extended through the incoming trunk of FIGS. 6 and 7, the trunk finder of FIG. 11 and the attendant trunk of FIG. 15 to the telephone set of the attendant at console No. 1 of FIG. 19, thereby appraising the console attendant of the fact that this incoming call originated in the Miami area. About one-and-a-half seconds after the operation of relay AN(7), the area identity control of FIG. 5 (relay CO(5) in particular) applies a momentary ground pulse to conductor C1(1) extending into FIG. 7, over contact 3 of relay AN(7), contact 3 of relay CT(7), to battery through the winding of relay CT, thereby operating relay CT(7) which locks over its own contact 2 to ground on conductor 706 from contact 5 of relay BF(6) in FIG. 6. Relay CT(7), in operating, opens at its contact 1 the locking circuit for relay AN(7), which thereupon releases, restoring the tip-ring loop between the central office circuitry of FIGS 3 and 4 and the console attendant of FIG. 19.

From the previous detailed description it will be recalled that a connection now exists from the calling subscriber S in FIG. 4, through the central office circuitry of FIGS. 3 and 4, through the call distributor incoming trunk circuit of FIGS. 6 and 7, thence through the trunk finder of FIG. 11 and the attendant trunk circuit of FIG. 15 to the attendant at console No. 1 in FIG. 19. In the central office circuitry of FIGS. 3 and 4, the eight hold magnets in the lower part of FIG. 4 are operated, relays S1(3) and CH(3) are operated in FIG. 3, and in FIG. 4 relays S(4) and CS(4) are operated. In the incoming trunk circuit of FIG. 6 relays R3(6), CA(6), CO(6) and BF(6) are operated; and, in FIG. 7 relays COX (7), CT(7) and R(7) are operated. In the trunk finder of FIG. 11 relays B(11) and D(11) are operated, the vertical off-normal switch VON is operated, and the four leads S(1), R(1), T(1), and C(1) from the incoming trunk circuit of FIG. 7 are connected over the corresponding trunk finder brushes to the circuitry of FIG. 11. In the attendant trunk circuit of FIG. 15 relays SV(15), PB(15), H(15), PW(15) and TR(15) are operated, the PA lamp is extinguished, and the PB lamp is lighted steadily. In console No. 1 of FIG. 19 the attendant's receiver RX and transmitter TX are inserted in the circuit by being connected into the respective B and A jacks, the IN key is operated and the IN lamp is lighted steadily. Under these circumstances, the attendant of console No. 1 in FIG. 19 is in communication with the calling subscriber S in FIG. 4.

*Release of connection*

Release of the connection can take place in one of three ways: (1) the console attendant in FIG. 19 may release prior to the release of the calling subscriber S in FIG. 4, (2) the calling subscriber S may release before the attendant at the console and (3) both the calling subscriber S and the attendant at the console may release at substantially the same time.

If the attedant at the console of FIG. 19 releases first she will temporarily operate the RLS key of FIG. 19. This will cause the release of the IN key, due to a well known mechanical interlock in the key shelf, and will momentarily apply a ground pulse to conductor RLS(1) extending into the attendant trunk circuit of FIG. 15. The release of the IN key breaks the tip and ring loop at the console, thereby causing the release in FIG. 6 of relay BF(6). The release of relay BF(6) removes the short-circuit from the winding of relay R1(6) thereby presenting to the tip and ring loop back to the central office the high impedance on-hook signal. Due to this high impedance tip-ring loop signal, relay CS(4) in the central office circuit of FIG. 4 will release, relay R1(6) will re-operate and relay R(7) will release. In the central office circuitry upon the release of relay CS(4), a circuit is completed from ground over its contact 1, conductor 402 into FIG. 3, over contact 2 of relay CH(3), through the resistance if the RL timer to battery. The RL timer is arranged to close its contact some fifteen to thirty seconds after the energization of its heater winding. At the conclusion of this time-out interval, the delay relay RL(3) will operate its contact, thereby extending ground over its contact, over contact 3 of relay CH(3), conductor 310, into FIG. 4 to battery through the winding of relay RC(4). Relay RC(4), in operating, causes the release in FIG. 3 of relay S1(3), the release of which in turn causes the release of the hold magnets in the lower left-hand portion of FIG. 4, thereby disconnecting the line link and trunk link connections. The operation of relay RC(4) in the central office circuit of FIG. 4 causes the release in FIG. 6 of relay R1(6), the release of which in turn causes the successive releases of relays R3(6) and CA(6). Upon the release of relay BF(6), relay CT(7) is also released. Also, upon the release of relay S1(3) in the central office circuitry, relay CH(3) is released, in turn de-energizing the delay timer RL, and the hold magnets in the lower right-hand part of FIG. 4 are released, thereby completing the breaking of the connection between the central office and the call distributor. Of course it will be appreciated in FIG. 4 that as soon as the calling subscriber crossbar linkage is broken, relay S(4) releases. In the meantime, upon the operation in FIG. 19 of the RLS key, ground is momentarily extended over conductor RLS(1) into the attendant trunk circuit of FIG. 15 to shunt down relay PW(15). Also, the mechanical opening of the IN key in FIG. 19 causes the release in FIG. 15 of relays SV(15), PB(15) and H(15), and causes the re-operation in FIG. 15 of relay PA(15). In FIG. 15 upon the release of relay PW(15), ground is removed at its contact 3 from conductor A(1) extending into the trunk finder of FIG. 11 where the removal of this ground from this conductor causes the release of relay B(11). The release of relay B(11) removes ground from the sleeve conductor S(1) extending back to the trunk circuit of FIG. 7 and completes a circuit for operating the release relay RLS(11) of the trunk finder extending in FIG. 11 from battery in the Tone, Alarm and Register circuit, through the lower winding of relay RM(11) therein, thence through the winding of relay RLS(11), over contact 3 of the still operated vertical off-normal switch VON, contact 3 of relay E(11), contact 6 of relay B(11), over the contact of the SCO key and over the lead D(1) into the attendant trunk circuit of FIG. 15 to ground over contact 4 of relay ST(15). The operation of the release magnet RLS(11) in the trunk finder of FIG. 11 causes the entire trunk finder mechanism to return in a rotary and vertical direction to its starting point, where the vertical off-normal switch VON will again be opened, thereby to release the RLS(11) magnet. The trunk finder of FIG. 11 will then be returned to its normal condition; but, relay D(11) will remain operated from ground supplied from the attendant trunk circuit of FIG. 15 over conductor D(1). Of course, when the trunk finder of FIG. 11 breaks its connection with the incoming trunk of FIGS. 6 and 7, relay TR(15) in the attendant trunk circuit of FIG. 15 will also release, and relays CO(6) and COX(7) of the incoming trunk circuit of FIGS. 6 and 7 will release. These release operations described above cause the entire circuitry to revert to its normal condition.

If the calling subscriber S in FIG. 4 hangs up first, relay S(4) will release, thereby causing the release in FIG. 3 of relay S1(3), the release of which will in turn cause the release of the hold magnets in the lower left-hand part of FIG. 4. The release of relay S1(3), with relay CH(3) still operated, completes a circuit in FIG. 3 from ground, over contact 7 of relay CH(3), contact 5 of relay S1(3), to the RL timer, which will again time a fifteen to thirty second interval prior to the operation of relay RC(4). It will be observed that a loop circuit still exists from the windings of relay CS(4) over the crossbar linkage in the lower right-hand corner of FIG. 4, to the incoming trunk of FIGS. 6 and 7 where relay R(7) is operated and where relay R1(6) is released due to the shunting action across its windings of the operated relay BF(6), which in turn is still being held operated over the tip-ring loop to the attendant's telephone circuit in FIG. 19. If the attendant at the console of FIG. 19 operates the release key RLS, the entire circuitry will collapse in accordance with the description given above. However, if the delay relay RL(3) of FIG. 3 completes its time-out interval, as has been described hereinbefore, all of the relays of the central office circuitry of FIGS. 3 and 4 will collapse, thereby causing the release in FIG. 7 of relay R(6), the release of which will in turn cause the release in FIG. 6 of relay R3(6) and the release of relays CA(6), BF(6), and CT(7). Relays CO(6) and COX(7) of the incoming trunk circuit of FIGS. 6 and 7 will remain operated until ground is removed from the sleeve lead S(1) extending to it from the trunk finder of FIG. 11. Assuming that the console attendant operates her release key RLS of FIG. 19 shortly thereafter, or prior thereto, the trunk finder of FIG. 11, the attendant trunk of FIG. 15 and the console of FIG. 19 will all be returned to their normal conditions.

Obviously it will be appreciated that if the attendant at the console of FIG 19 and the calling subscriber S in FIG. 4 both hang up at substantially the same time, all of the foregoing circuit operations will take place simultaneously such that at one time or another all the circuitry described will have been returned to its normal condition.

One other release situation which has not been described above is the situation where the calling subscriber S of FIG. 4 releases or disconnects before the incoming trunk circuit of FIGS. 6 and 7 has been answered at all. This description will be covered below in the detailed description of a call which is routed to the delay answer announcement machinery of FIGS. 8 and 9.

DETAILED DESCRIPTION—SPECIAL ANSWER (MACHINE)

A detailed description will now be given of the circuit operations which follows upon a delay in completing an incoming trunk call in a regular manner to an attendant at a console of FIG. 19. In this description the delay answer announcement circuitry of FIGS. 8 and 9 will come into play to in effect "answer" the incoming call if an unreasonable amount of delay occurs before the call has been answered regularly by an attendant.

It will be necessary in this description to return to that point in the previous detailed description where the calling condition had just begun in the incoming trunk circuit of FIGS. 6 and 7. At that point, it will be recalled, in the central office circuitry of FIGS. 3 and 4, all of the hold magnets in the lower left and lower right portions of FIG. 4 will be operated, as will relays S(4), RC(4) and S1(3), along with the ringing selection switch hold magnet RSHM(3) in the lower right hand corner of FIG. 3. In the incoming trunk circuit of FIGS. 6 and 7, relay R1(6) will be operated, as will relays R3(6), R2(6) and ST(6). It will be recalled that under these circumstances the ringing signal and battery is being transmitted from the central office circuitry of FIGS. 3 and 4 over the tip-ring loop to the incoming trunk circuit of FIGS. 6 and 7, particularly to the windings of relays R(7) and R1(6), in series with the ringing trip relay RT(4) of the central office circuitry of FIG. 4, which relay RT(4) cannot operate due to the high impedance "on-hook" signal being present in the tip-ring loop from the incoming trunk circuit of FIGS. 6 and 7. In the common group circuit of FIGS. 12, 13 and 14, the circuitry may be assumed to be in the condition at the beginning of the previous detailed description where in FIG. 12 relay ST(12) is operated, thereby causing the operation in FIG. 13 of relays CW(13), BS(13) and TG(13). Also, in FIGS. 13 and 14, relays DA(13), DA1(13), CH(14), S(14), PG(14) and G1(14) are all operated, with relays SR1(13), SR2(13), C1(13), C1A(13), SA(13) and SAA(13) all released. This condition of the common group circuit of FIGS. 12, 13 and 14 represents a condition under which an attempt is being made to complete this call by seizing an idle trunk finder, such as the trunk finder of FIG. 11, and where the position gate, relay PG(14), is closed and where the trunk gate, relay TG(13), is closed. It will be recalled that upon the operation of the trunk gate relay TG(13) to in effect close the trunk gate against accepting any further incoming trunk calling conditions, ground is extended from FIG. 13 over contact 1 of relay TG(13), to the DA lead, extending into the delay answer announcement circuitry of FIG. 8, to initiate the timing operation which is of immediate interest at the moment. It will be assumed in the description to follow that no trunk finders are available to serve the incoming trunk of FIGS. 6 and 7, as evidenced by the operation of all of their D( ) relays such as relay D(11) of FIG. 11. This assumption will cause the timing circuitry of the delay answer announcement control of FIG. 8 to cause the incoming trunk call of FIGS. 6 and 7 to be routed to the delayed answer announcement machine of FIG. 9.

*Delayed answer time-out*

If the trunk gate of the common group circuit remains closed, as indicated by the operated condition in FIG. 13 of relay TG(13), conductor DA extending from FIG. 13 into FIG. 8 will continue to remain grounded. If this conductor DA in FIG. 8 remains grounded continuously for a period of about twenty-five seconds, indicating a delay interval during which some trunks have not been answered, the circuitry of FIGS. 8 and 9 will, at the end of this twenty-five second interval, cause the trunk circuits which are still in a calling condition, such as the incoming trunk of FIGS. 6 and 7, to be connected to the delayed answer announcement machine of FIG. 9 as a special answer consisting of a message to the effect that the call has been delayed. At the end of the announcement the particular trunks to which the announcement has been provided will be returned to their calling conditions such that they can be connected thereafter to a regular attendant if the calling subscriber remains off-hook.

The timing arrangement of FIGS. 8 and 9 may be divided conveniently into three portions: a first period of approximately twelve seconds is timed from the instant that the DA conductor in FIG. 8 is grounded up until the closing of contact 2 associated with cam No. 2 of the timer T1(8); a second timing interval extends from the instant that contact 2 of cam No. 2 of times T1(8) is closed up until contact No. 2 of cam No. 2 of the timer T2(8) closes, and this time interval is approximately ten seconds; and, it takes about three seconds for the machine of FIG. 9 to be brought into operation after the end of the above mentioned second timing interval, whereby the message on track 901 of the magnetic drum 900 in FIG. 9 can be transmitted to the incoming trunks connected thereto. Once the machine of FIG. 9 is brought into operation, the length of time consumed by the transmission of the delayed answer announcement message to the incoming trunks depends of course, upon the prerecorded length thereof.

In FIG. 9 a motor M(9) is used to cause the rotation of the recording drum 900 having the prerecorded message recorded in spiral track 901 thereon, and the recording-reproducing head 902 is engaged by a lead screw 903 for both recording and reproduction thereby to produce and to reproduce the spiral track 901. Contact switch S1 is a switch which is carried along the axial length of the drum 900 by the head 902 during the recording interval when the message is placed upon the drum such that the switch S1 automatically indicates the physical end of the prerecorded message as a prescribed length along the lead screw 903. When reproduction is brought into effect, as will be described presently, the head 902 is caused to engage lead screw 903, which in turn is caused to rotate by the action of motor M(9), thereby to carry the head 902 lengthwise along the magnetic drum 900. Eventually the head 902 will cause the limit switch S1 to close, thereby indicating the end of the prerecorded message. Upon the closing of switch S1, the delay answer announcement circuitry and machine of FIGS. 8 and 9 will be released from its connection with the incoming trunks.

When ground appears on the DA conductor in the lower right hand corner of FIG. 8 (indicating that the trunk gate has been closed—relay TG(13) of FIG. 13 is operated), this ground on conductor DA extends over contact 1 of the operated DA key, thence over contact 2 of relay AN(8), to battery through the winding of the clutch magnet 800, and over contact 1 of cam No. 1, to battery through the motor M of timer T1(8). The clutch magnet 800, being energized, causes the clutch 801 to complete engagement between the motor M and the cam shaft thereby causing the cams 1 and 2 to begin to rotate. After approximately twelve seconds contact 2 of cam No. 2 will close, thereby causing the operation of relay AN(8) in a circuit extending from ground, over this cam contact, and over contact 3 of relay AN1(8), to battery through the winding of the slow release relay AN(8). Upon the operation of relay AN(8), ground is extended over its contact 1 to the conductors AN(1) through AN(6) to all of the incoming trunk circuits: the effect of this ground signal on the incoming trunk circuits will be described below. Upon the operation of relay AN(8), ground is removed from the timer T1(8) at contact 2 of relay AN(8), thereby causing the timer T1(8) to completely return to its starting condition, thus removing ground from the operating circuit of relay AN(8), which relay however will not release until a prescribed interval of time determined by its slow release characteristic. Relay AN(8), in operating, completes a circuit for causing the operation of relay T1A(8) extending from the ground on contact 1 of the DA key, over contact 3 of relay AN(8), over contact 4 of relay AN1(8), to battery through the winding of relay T1A(8), which relay operates and locks over its contact 1 independently of relay AN(8). Contact 1 of cam No. 1 of the timer T1(8) is arranged to open a fraction of a second after contact 2 of cam No. 2 closes, thereby stopping the rotation of motor M of timer T1(8) immediately if relay AN(8) has not operated quickly enough: this will cause the clutch magnet 800 to remain energized and to hold the contacts in this condition until such time as relay AN(8) does operate. Eventually relay AN(8) will release, after a very short interval of time depending upon its slow release characteristics, thereby to have transmitted to all of the incoming trunk circuits a short pulse of ground potential over its contact 1 approximately twelve seconds after the initiation of the delay answer announcement timing interval.

The operation of relay T1A(8) initiates the second (approximately ten seconds) timing interval by extending ground over its contact 3. and over contact 2 of relay RAG(8) to timer T2(8). This causes the operation of clutch magnet 802 and energizes the motor M of timer T2(8), thereby to cause the rotation of cams No. 1 and 2 of this timer upon the closing of the clutch 803. After approximately ten seconds, contact 2 of cam No. 2 closes, thereby extending ground from contact 2 of relay T1A(8) over contact No. 2 of cam 2, on the timer T2(8), to battery through the winding of relay RAG(8), which thereupon operates and locks over its own contact 3 independently of the timer T2(8). The operation of relay RAG(8) de-energizes timer T2(8) causing it to return to its normal condition. Contact No. 1 of cam No. 1 of timer T2(8) also de-energizes motor M of timer T2(8) in the event that relay RAG(8) does not operate in sufficient time. Upon the operation of relay RAG(8), relay ST(8) is operated in an obvious circuit from ground over contact 1 of relay RAG(8), relay ST(8) locking over its own contact 2 to ground over contact 1 of relay CO(8).

The operation of relay ST(8) initiates the beginning of the functioning of the machine of FIG. 9 by extending ground in FIG. 8 over contact 3 of relay ST(8), to conductor ST extending into FIG. 9, and thence to battery through the winding of relay ST(9), relay ST(9) operating in this circuit to start the operation of motor M(9) over contact 1 of relay ST(9), and applying battery over its contact 2 to lead 904 to the circuitry consisting of relays A(9), B(9), E(9) and STP(9). Upon the operation of relay ST(9), a circuit is completed for operating relay A(9) extending from ground, over contact 4 of relay B(9), contact 1 of relay A(9), through the winding of relay A(9), contact 2 of relay E(9), through resistance R11, to battery at contact 2 of relay ST(9) on conductor 904. Relay A(9), in operating, locks to ground over its own contact 2 and completes a circuit extending from contact S2, over contact 4 of relay A(9) to the right hand side of the winding of relay B(9), thence through the winding of relay B(9), over contact 2 of relay STP(9), to battery on conductor 904. Upon the first closure of contact S2 (the operation of contact S3 prior to the operation of contact S2 accomplishes no circuit operation), relay B(9) is operated by the momentary ground pulse from contact S2 and locks over its own contact 2 to ground. Upon the operation of relay B(9), ground is extended over contact 3 of relay A(9), contact 1 of relay B(9), over conductor CT into FIG. 8, thence over contacts 1 of relays D(8) and STA(8), and contact 2 of the operated relay CT(8), to battery through the winding of relay AN1(8). Relay AN1(8), in operating, applies ground over its contact 1 to conductors AN1(1) through AN1(6) into all of the incoming trunk circuits, the circuit operation resulting therefrom to be described below. About one second after the momentary closure of contact S2 in FIG. 9, contact S3 is closed momentarily thereby causing the release of relay A(9) by applying a shunting ground over contact 3 of relay B(9) to the left hand side of the winding of relay A(9). Relay A(9), in releasing, removes ground from conductor CT extending into FIG. 8, thereby allowing relay AN1(8) to release, having applied a momentary ground pulse to all of the incoming trunk circuits over conductors AN1(1) through AN1(6). Upon the opening of contact S3 in FIG. 9, relay E(9) is allowed to operate in a circuit extending from ground over contact 2 of relay B(9), contact 5 of relay A(9), through the winding of relay E(9), to battery on conductor 904 through resistance R11. Upon the operation of relay E(9), a circuit is completed over its contact 3 to cause the operation of the bail solenoid L1(9) in an obvious circuit over contact 1 of relay STP(9). The operation of the bail solenoid L1(9) causes the reproducing head 902 to be engaged by the lead screw 903 and causes the reproducing head 902 to be lowered in operative relationship to the magnetic track 901 on the drum 900. Also, the operation of relay E(9) removes at its contact 4 the shunting ground on the output of transformer T2 thereby permitting the output of the reproducing head 902 to be extended through the amplifier, through transformer T2, thence through resistance R8 and condenser C8, to the tip and ring conductors of the incoming trunk circuits through another amplifier, to transmit over these tip and ring leads the prerecorded message being picked up from the magnetic drum 900. Upon the operation of relay E(9), ground is extended from FIG. 9 over contact 1 of relay E(9), and over conductor AL1 into FIG. 8, where it extends over contact 1 of relay ST(8) to battery through the winding of the slow release relay TA(8), which thereupon operates and locks over its own contact 3 to ground on contact 1 of relay CO(8).

Eventually, at the end of the prerecorded message on drum 900, the reproducing head 902 will have been advanced under control of the lead screw 903 to a point where the limit switch S1 will be closed, indicating the end of the prerecorded message. Upon the closure of switch S1 a circuit is completed for operating the stop relay STP(9) extending from ground, over switch S1, through the winding of relay STP(9), to battery on conductor 904. Upon the operation of relay STP(9), the bail solenoid L1(9) is released, thereby causing the reproducing head 902 to become disengaged from the lead screw 903 and returned to its normal position under the action of the return spring 905 and opening switch S1. Relay STP(9), in operating, completes a locking circuit for itself from ground, over its own contact 4 and contact 6 of relay A(9) to battery through its winding, releases relay B(9), and extends over its contact 3 ground potential onto conductor CO extending into FIG. 8. In FIG. 8, ground on conductor CO extends over contact 2 of relay TA(8), to battery through the winding of relay TA1(8), which operates and completes an obvious circuit over its contact 4 for causing the operation of relay CO(8). Relay CO(8), in operating, extends over its contact 2, ground potential to conductors CO(1) through CO(6) to all of the incoming trunk circuits, the circuit operation taking place incident thereto to be discussed hereinafter, and opens at its contact 1 the locking circuit for relays TA(8) and ST(8) which thereupon become de-energized. Relay ST(8) releases at once, relay TA(8) releasing after a short interval of time determined by its slow release characteristic. Upon the release of relay TA(8), relay CO(8) and relay TA1(8) are allowed to release, it being noted that relay CT(8) remains operated over the short interval of time that relay AN1(8) was operated, thereby preventing the continued operation of relay CO(8). In FIG. 8 it will be noted that relays RAG(8) and T1A(8) have been released by this time, relay RAG(8) having been released upon the release of relay T1A(8) which in turn took place at the time that relay AN1(8) operated momentarily.

Upon the operation of relay STP(9) in FIG. 9, relay B(9) was released, thereby allowing the release of relay E(9), to in turn enable relay A(9) to become re-operated to initiate another cycle of reproduction. The reproducing cycle will be repeated continuously as long as relay ST(9) in FIG. 9 is held operated. If relay ST(9) becomes released during the process of reproducing the message on drum 900, relays B(9), E(9) and bail solenoid L1(9) all become released thereby returning the delayed answer announcement machine circuitry of FIG. 9 to normal.

The net result of the above functions of the delayed answer announcement control and machine of FIGS. 8 and 9 is to apply to all incoming trunk circuits over conductors AN(1) through AN(6) a momentary ground pulse after about twelve seconds, followed about ten seconds thereafter by a momentary ground pulse on conductors AN1(1) through AN1(6), in turn followed at the end of the prerecorded message (or at an earlier time if the start relay ST(9) of FIG. 9 is released before the end of the message) by a momentary ground pulse on conductors CO(1) through CO(6).

It will be appreciated, with reference to the lower right hand corner of FIG. 8, particularly the DA lead extending thereto from the common group circuit of FIG. 13, that if ground is removed from the DA lead (indicating that the trunk gate has become reopened) before relay ST(9) is operated in FIG. 9, the entire functioning of the circuit of FIG. 8 recycles, whereas the circuitry of FIG. 9 has never been brought into play. It will further be appreciated that if the ground on the DA lead in the lower right hand corner of FIG. 8 is removed at some time after the operation of relay ST(9), then the circuitry of both FIGS. 8 and 9 will go to the end of their operations and then return to normal. With these above circuit operations in mind the action of the incoming trunk circuit will now be described to illustrate how the delayed answer announcement is actually implemented in the incoming trunk circuit of FIGS. 6 and 7.

*Release before answer*

It has been assumed above that the incoming trunk circuit of FIGS. 6 and 7 is in the circuit condition representing circumstances under which ringing signal is being transmitted thereto over the tip and ring conductors from the central office circuitry of FIGS. 3 and 4. It will be recalled, under these circumstances, that in FIG. 6 relays R1(6), R2(6), R3(6) and ST(6) are operated and that in FIG. 7 none of the relays therein are operated. One of three situations may prevail at this point: first, the calling condition in the trunk of FIGS. 6 and 7 may be answered regularly by completing the trunk call to an attendant, as has been described in detail hereinbefore; secondly, the calling subscriber S in FIG. 4 may decide to hang up before the call is answered in any fashion whatsoever; and, thirdly, the delayed answer announcement circuitry of FIGS. 8 and 9 may cause the incoming trunk call to be routed to a delayed answer announcement machine for a special answer because of a delay in routing the call to a regular answer.

If the calling subscriber S in FIG. 4 decides to hang up before the call has been answered in any fashion whatsoever, the trunk circuit of FIGS. 6 and 7 will collapse. In doing so, relay R3(6) will be released with relay R2(6) still operated, due to its slow-release characteristic, and the abandoned call totalizer will make a count of this abandonment by being operated momentarily (until relay R2(6) releases) in a circuit extending from ground in FIG. 6, over contact 4 of relay R(3), over contact 9 of relay R2(6), to battery through the winding of the register REG of the abandoned call totalizer.

In the central office circuitry of FIGS. 3 and 4, relays S1(3), S(4), and RC(4) are operated and the ringing selection switch hold magnet RSHM(3) is operated. If the calling subscriber S in FIG. 4 disconnects, the calling tip and ring loop will be opened, thereby causing the release in FIG. 4 of relay S(4). The release of S(4) will cause the release in FIG. 3 of relay S1(3) and the release in FIG. 4 of relay 4 RC(4), which in turn causes the release of the ringing selection switch hold magnet RSHM(3) in FIG. 3, in turn removing the ringing condition and the tip-ring loop from the incoming trunk circuit of FIGS. 6 and 7. In FIGS. 6 and 7, relay R1(6) will release, causing the release of relays R3(6), R2(6) and ST(6), thereby reverting the trunk circuit of FIGS. 6 and 7 to its completely idle condition, during which releasing operations, as above described, the abandoned call is counted.

The release of the central office trunk circuit of FIGS. 6 and 7 prior to the time when the delayed answered announcement circuitry of FIGS. 8 and 9 may have become fully effective will be described below in connection with a description of this particular type of an answer condition.

*Delayed answer announcement*

As has been mentioned previously, the delayed answer timing is begun as soon as the trunk gate is closed, as indicated by the operation in FIG. 13 of relay TG(13), and it makes no difference whether the trunk of FIGS. 6 and 7 is inside of the gate (relay ST(6) operated) or outside of the gate (relay ST(6) released). The trunk circuit of FIGS. 6 and 7 is assumed to be in a ringing condition without having been answered, this condition being represented by the operation in FIGS. 6 and 7 of only the relays R1(6), R2(6), and R3(6). For the sake of a specific example, it will be assumed that the trunk of FIGS. 6 and 7 is inside the gate as indicated by the operation in FIG. 6 of relay ST(6). It will further be assumed that the trunk gate remains closed, as indicated by the operation in FIG. 13 of relay TG(13), until the delayed answer announcement circuitry of FIGS. 8 and 9 has run its complete cycle.

It will be recalled from previous description, with reference to FIGS. 8 and 9, that approximately twelve seconds after the trunk gate is closed a momentary ground pulse will be supplied over contact 1 of relay AN(8) to conductors AN(1) through AN(6) to all of the incoming trunk circuits. This momentary ground pulse appearing on conductor AN(1) in FIG. 7 extends over contact 4 of relay CO1(7), contace 1 of relay AN1(7), conductor 707 in FIG. 6, thence over contact 9 of relay EA(6), over contact 8 of relay R2(6), conductor 608 into FIG. 7, to battery through the winding of relay CO1(7), causing this relay to operate. Relay CO1(7), in operating, locks over its own contact 3 to ground independently of the conductor AN(1) extending thereto from FIG. 8, and at its contact 1 prepares a circuit for operating relay AN1(7) upon the occurrence some thirteen seconds later of a momentary ground pulse on conductor AN1(1) extending into FIG. 7 from FIG. 8. When this latter ground pulse appears on conductor AN1(1) in FIG. 7 it extends over conductor 708 to FIG. 6, thence over contact 7 of relay EA(6), contact 7 of relay R2(6), over conductor 609 into FIG. 7, thence over contact 1 or relay CO1(7), contact 10 of relay AN1(7), contact 1 of relay COX(7), to battery through the windings of relay AN1(7), which relay thereupon operates. Relay AN1(7), in operating, completes a locking circuit from battery, through its windings over contact 1 of relay COX(7), over its own contact 9, conductor 709 extending into FIG. 6, thence to ground over contact 8 of relay EA(6); and, the operation of relay AN1(7) causes relay CO1(7) to release.

Relay AN1(7), in operating, completes over its contact 11 a short-circuit between conductors 700 and 701, thereby to shunt down the relay R1(6) and to cause the operation in FIG. 7 of relay R(7), and by virtue of returning to the central office the low impedance off-hook signal, causes the central office circuitry of FIGS. 3 and 4 to go through the ringing trip operation and initiate a charge for the call, as has been described hereinbefore. Furthermore, at this point the operation of relay AN1(7) completes over its contacts 4 and 6 a circuit from the output of the delay answer announcement machine of FIG. 9, over conductors R(1) and T(1) into FIG. 7, thence through respective resistances H and J, over contacts 4 and 6 of relay AN1(7), through condensers T and R, over contacts 1 and 7 of relay AN(7), and over contacts 1 and 2 of relay G(7) to the tip and ring conductors T(1) and R(1), back toward the central office to provide to the calling subscriber S of FIG. 4 the pre-recorded delayed answer announcement message reproduced from the magnetic drum 900 in FIG. 9.

At the end of the delayed answer announcement message, conductor CO(1) is momentarily grounded from FIG. 8 into FIG. 7, thence over contact 3 of relay AN1(7), over conductor 710 into FIG. 6, to battery through the winding of relay EA(6). Relay EA(6) operates in this circuit and locks in a circuit extending from its winding, over its own contact 10, contact 3 of relay CA(6), to ground over contact 3 of relay R3(6). Relay EA(6), in operating, maintains the shunt across conductors 700 and 701 in a circuit extending in FIG. 6 from conductor 700, over contact 4 of relay EA(6), over conductor 600, over contact 7 of relay CO(6), back to conductor 701, thereby maintaining the releasing shunt across the winding of relay R1(6) and maintaining operated relay R(7). This situation maintains the low impedance off-hook signal back to the central office.

Relay EA(6), in operating, also causes the release of relay AN1(7), thereby re-establishing the tip-ring loop toward the trunk finders and disconnecting the central office tip-and-ring loop from the announcement machine of FIG. 9. At the time, previously, when relay AN1(7) was operated as an incident to the delayed answer announcement message being transmitted back toward the central office, the circuit over its contact 2 is opened, thereby extinguishing the trunk lamp TK1 of FIG. 6 in the supervisor's lamp circuit; however, upon the subsequent release of relay AN1(7) at the completion of the delayed answer message, this circuit over its contact 2 is again completed to again light the trunk lamp TK1 in FIG. 6 to indicate that a call is waiting. Relay EA(6), in operating, also completes over its contact 1 an additional ground for holding operated relay ST(6) if this particular trunk is already inside the trunk gate; and, relay EA(6), in operating, places an idle line terminating resistor across the tip and ring leads toward the trunk finder, this circuit extending from the tip lead T(1) in the upper right hand corner of FIG. 7, over contact 1 of relay TR(7), over conductor 704 into FIG. 6, thence over contact 11 of relay EA(6), conductor 712 into FIG. 7, through the idle line terminating resistance H, over contact 2 of relay COX(7), and thence over contact 3 of relay TR(7) to the ring conductor R(1) extending to the trunk finders.

At this point in the description the calling subscriber S in FIG. 4 has two choices: first, the calling subscriber S may disconnect as a result of the announcement to the effect that the call will be delayed; and second, the calling subscriber S in FIG. 4 may wait for the call to be answered regularly by a console attendant. If the calling subscriber S in FIG. 4 chooses to release or disconnect under these circumstances, the circuit operation will be the same as that previously described in connection with the release by subscriber S before the release by the console attendant under circumstances where the call had been completed to an attendant. It will be recalled, that under those circumstances the relay timer RL of FIG. 3 comes into play to time an interval of some fifteen seconds or more before the central office circuitry will open the tip and ring loop toward the incoming trunk circuit of FIGS. 6 and 7. If this occurs before the automatic call distributor has dealt with the still remaining calling condition in the incoming trunk of FIGS. 6 and 7, the incoming trunk circuit of FIGS. 6 and 7 will collapse due to the release of relay R(7), thereby reverting the trunk circuit to its normal idle condition. On the other hand, as long as the calling subscriber S in FIG. 4 remains off-hook, the calling condition will remain in the trunk circuit of FIGS. 6 and 7 and eventually the call will be answered by a regular attendant position.

No particular problem arises under circumstances where the call existing in the trunk circuit of FIGS. 6 and 7 is completed through a trunk finder and an attendant trunk to a console position prior to the time that the end of a pre-recorded delayed answer announcement occurs, as indicated by the operation in FIG. 6 of relay EA(6). If the call is completed regularly at any time prior to the operation of relay EA(6), relays CO(6) and CA(6) in FIG. 6 will be operated, as will relay COX(7) in FIG. 7, the operation of these relays preventing the operation of relay EA(6) and causing the release in FIG. 7 of relays CO1(7) and AN1(7) if these relays have been operated at this time. This situation will cause the call to be completed through a trunk finder, such as the trunk finder of FIG. 11, in accordance with previous detailed description, thereby cutting short whatever progress has been made to or through a delayed answer announcement recording.

The only real problem exists in the event that the automatic call distributor circuitry attempts to complete the call to a regular attendant after relay EA(6) has operated, indicating the end of the delayed answer announcement and denoting the fact that the calling trunk of FIGS. 6 and 7 has been specially answered. The action of the call distributor circuitry in this connection will be described presently.

*Trunk finder seizes trunk*

It will be assumed that the calling subscriber S in FIG. 4 has received the delayed answer announcement message from the machine of FIG. 9 and that, therefore, in the incoming trunk of FIGS. 6 and 7, relays R2(6), R3(6), ST(6), EA(6), and R(7) are operated indicating that the incoming trunk circuit of FIGS. 6 and 7 has been routed to a delayed answer announcement message which has become completed. Also, it will be assumed that the calling subscriber S in FIG. 4 has chosen to disconnect thereby releasing relay S(4) and causing the central office time-out mechanism to come into play, but that the incoming trunk of FIGS. 6 and 7 will be attempted to become completed to a regular attendant before the central office circuitry can time-out and remove the tip-ring loop to the incoming trunk of FIGS. 6 and 7. It is under these circumstances that the previous difficulty had occurred in automatic call distributors because first of all, traffic personnel have had no record of the number of such calls abandoned after having been routed to a delayed answer announcement, and operating people have been plagued by having such calls completed to attendants who thereupon find that the calling subscriber has disconnected.

From previous description it will be recalled that if the trunk finder of FIG. 11 is brought into play to complete the calling incoming trunk circuit of FIGS. 6 and 7 through to an attendant, relay CO(6) in the incoming trunk circuit is energized at the time that the trunk finder of FIG. 11 seizes the incoming trunk of FIGS. 6 and 7. Normally, upon the operation of relay CO(6), as has been described hereinbefore, relay R2(6) would be released and a circuit would be completed for causing the immediate operation of relay CA(6) in a circuit extending from battery in FIG. 6, through the winding of relay CA(6), over contact 4 of relay R2(6), thence over contact 1 of relay CO(6), and over contact 3 of relay EA(6), which normally is released, thence to ground over contact 3 of relay R3(6). However, under the present assumed circumstances relay EA(6) is operated as an indication that this particular incoming trunk has been routed to a special answer, namely the machine announcement from FIG. 9. Therefore, the above-described operating circuit for relay CA(6) now extends over contact 2 of relay EA(6) through thermistor B and to ground over contact 3 of relay R3. Thermistor B represents a fairly high resistance in a cooled condition but, due to the passage of the small amount of current therethrough, will gradually heat up and thereby reduce its resistance. The initial resistance of thermistor B is too high to allow relay CA(6) to operate; however, after approximately 500 milliseconds thermistor B will have heated up to a point where the amount of current flowing therethrough is sufficient to allow relay CA(6) to operate.

*Calling party disconnect test*

At the time when relay CO(6) operates to start the circuit functions which will ultimately connect the calling trunk to an attendant console position, it opens at its contact 7 the short-circuit across the windings of relay R1(6), thereby presenting to the central office a high impedance off-hook signal comprising the sum of the impedances of the windings of relays R1(6) and R(7). When this high impedance tip-ring loop off-hook signal is transmitted back to the central office of FIG. 4, relay CS(4) therein will be released due to the high impedance of this circuit. If, as has been assumed, the calling subscriber S of FIG. 4 has disconnected, relay S(4) will also be released and the release of both of the relays S(4) and CS (4) will cause the collapse of the central office circuitry and the release in FIGS. 6 and 7 of both of the relays R1(6) and R(7). However, in the event that the calling subscriber S of FIG. 4 has not released, the momentary release of relay CS(4) will not affect the central office circuitry during the short 500 millisecond interval of time necessary to cause the operation in FIG. 6 of relay CA(6).

At the end of the 500 millesecond interval of time required for the operation of relay CA(6), this relay will operate, thereby completing over its contacts 8 and 9 the previously described circuit whereby relay BF(6) can operate over the tip-ring loop to the answering attendant and thereby re-establish over contact 2 of relay BF(6) the short-circuit across conductors 700 and 701 to again present to the central office an off-hook low impedance signal. Relay R(7) will remain operated in this low impedance circuit back to the central office provided that the central office has not become disconnected in the meantime. Upon the operation of relay CA(6), relay EA(6) is released and the connection can continue to be established between the calling subscriber S of FIG. 4 and the attendant at the console of FIG. 19, all as has been described in detail hereinbefore. It will be noted however in this respect that the 500 millesecond interval of time required to operate relay CA(6) under control of the operated relay EA(6) represents a very short interval of time during which the off-hook low impedance signal being transmitted from the trunk of FIGS. 6 and 7 back toward the central office (as a result of the special answer which this trunk has received from the delayed answer announcement machine of FIG. 9) was changed to a high impedance on-hook signal and then returned to a low impedance off-hook signal at the end of the 500 millesecond interval of time provided that the central office has remained in an off-hook condition during this 500 millesecond interval. Also, it is to be noted that the 500 millesecond on-hook signal of high impedance transmitted back toward the central office does not affect the central office circuitry provided that the calling subscriber S in FIG. 4 has remained off-hook. The effect of the central office circuitry and the call distributor circuitry in the event that the calling subscriber S of FIG. 4 has released or disconnected will be described below.

*Controlled release of abandoned call*

The present description is going to deal with that situation whereunder the call placed by the calling party S in FIG. 4 into the incoming trunk circuit of FIGS. 6 and 7 has been "answered" by virtue of the fact that the incoming trunk of FIGS. 6 and 7 has been connected to the delayed answer announcement machine of FIG. 9, the announcement has been transmitted to the calling subscriber S in FIG. 4, and the trunk of FIGS. 6 and 7 has been returned to its "calling" condition, the calling subscriber S in FIG. 4 not having disconnected as yet. At a convenient point in the subsequent description it will be assumed that the calling subscriber will disconnect; but, this particular circuit operation will be allowed to take place at a convenient point in the description in order to show what happens when the incoming trunk circuit of FIGS. 6 and 7 detects the "on-hook" condition of the central office just prior to completing the call to an attendant at a console such as in FIG. 19. It will be assumed in this description that the trunk finder of FIG. 11 has been started such that it has just seized the "calling" incoming trunk of FIGS. 6 and 7, thereby to attempt to complete a connection between it and console No. 1 of FIG. 19 through the attendant trunk circuit of FIG. 15. Before discussing the detailed circuit operation which takes place incident to the momentary testing of the calling party disconnect feature, the status of each of the circuits of interest will be reviewed as a starting point.

In the central office circuitry of FIGS. 3 and 4, relays S1(3), CH(3), S(4) and CS(4) are all operated indicating that the calling subscriber S of FIG. 4 is still off-hook and indicating that the call distributor incoming trunk of FIGS. 6 and 7 is presently in an "answered" condition, and indicating that a charge has been made for this call.

At the console of FIG. 19, the starting condition, as has been described in detail hereinbefore, is represented by the fact that the attendant has the transmitter TX and the receiver RX of her telephone set inserted into the A and B jacks and the attendant has operated the IN key.

The present condition of the attendant trunk circuit of FIG.15 finds relays SV(15), PB(15), H(15) and ST(15) operated in circuits described hereinbefore in detail.

In the trunk finder circuit of FIG. 11, as has been described in detail hereinbefore, it is assumed that relay D(11) is released and that ground has just been extended thereto over conductor D(1) from the common group circuit of FIG. 14 as a start condition.

In the incoming trunk circuit of FIGS. 6 and 7, relay EA(6) will be locked operated (as an indication that this trunk has been previously routed to a delayed answer announcement machine) in a circuit extending from battery through its winding, over its contact 10, contact 3 of relay CA(6) to ground over contact 3 of relay R3(6). Relay R3(6) is held operated in a circuit extending from battery, through its winding, over conductor 711 into FIG. 7, to ground over contact 1 of relay R(7). Relay R(7) is held operated over the tip-ring loop back to the relay CS(4) of the central office in a circuit extending from contact 1 of relay G(7) through its left hand winding, over conductor 700 into FIG. 6, over contact 4 of relay EA(6), conductor 600, over contact 7 of relay CO(6), conductor 701 back into FIG. 7, and through the right hand winding of relay R(7) to contact 2 of relay G(7). The short-circuit across conductors 700 and 701, due to the operation of relay EA(6) and the release of relay CO(6), has shunted down relay R1(6), thereby to present to the central office the low impedance off-hook signal of an answered trunk. Also, in the incoming trunk of FIGS. 6 and 7, relay R2(6) is held operated in a circuit extending from battery, through its winding, over its contact 3, contact 5 of relay CA(6), contact 12 of relay CO(6), to ground over contact 2 of relay R3(6), and in a parallel circuit over contact 1 of relay BF(6), to ground over contact 1 of relay EA(6).

It will be assumed that the trunk finder of FIG. 11 has just been started to find the calling trunk of FIGS. 6 and 7. This starting condition is represented by the ground appearing in FIG. 11 on conductor D(1) from the common group circuit of FIG. 14. This ground extending over contact 8 of relay D(11), to battery through the winding of relay A(11), which relay thereupon operates. As will be recalled from previous description, the operation of relay A(11) causes the interrupted operation of relay C(11) in series with the vertical stepping magnet VERT(11), thereby to cause the commutator brush 1100 to step vertical looking for a grounded commutator segment, such as the one grounded by conductor A1 on level 6 in the lower left hand corner of FIG. 11. When the grounded commutator segment is found, relay E(11), a slow operate relay, is energized in series with the winding of relay C(11), thereby maintaining operated the latter relay to in turn stop the vertical stepping of the commutator brush. Eventually relay E(11) operates and locks in a circuit through its upper winding in series with the vertical magnet VERT(11), causing the latter magnet to release due to the reduced current flow. The operation of relay E(11) transfers the stepping circuit from the vertical magnet VERT(11) to the rotary stepping magnet ROT(11) and the latter, in conjunction with relay C(11), steps the wipers in the upper left hand corner of FIG. 11 in a horizontal direction, across level 6 of the trunk finder, looking for resistance battery on the sleeve lead S(1) extending thereto from the trunk circuit of FIGS. 6 and 7. When the wipers of the trunk finder have found resistance battery on the sleeve lead, the lower winding of relay B(11) is energized in series with the upper winding of relay C(11), sufficiently to allow the two-step relay B(11) to close its contact 4, thereby causing it to become fully operated under the control of the operated rotary stepping magnet ROT (11). The operation of relay B(11) cuts-through the tip and ring leads T(1) and R(1) and the C(1) lead and causes the operation of relay D(11). The operation of relay D(11) closes the connection from the sleeve lead S(1) in the upper left hand corner of FIG. 11 through diode 1101 to the lead A(1) extending to ground in the attendant trunk circuit, provides an additional locking path for relay B(11), opens the multiple chain circuit in the common group circuit of FIG. 14, transfers the trunk finder start lead at contact 7 of relay D(11), removes battery from the vertical magnet VERT(11) and relays C(11) and E(11), and short-circuits the upper winding of relay C(11), causing relay C(11) to release along with the rotary magnet ROT(11) and relay E(11). The energizing winding of relay A(11) is opened at contact 8 of relay D(11); but, relay A(11) is made slow-to-release in order to maintain a holding ground on the sleeve conductors S(1) and A(1) during the time required by the attendant trunk circuit of FIG. 15 to place a holding ground on conductor A(1) extending into FIG. 11 from FIG. 15, supplied in FIG. 15 over contact 6 of the operated relay ST(15).

In connection with the attendant trunk circuit of FIG. 15, it will be recalled from previous detailed description that the status of the attendant trunk circuit is not changed from is normal condition until relay TR(15) operates upon the establishment of the connection from the incoming trunk circuit of FIGS. 6 and 7 to the attendant trunk circuit of FIG. 15 through trunk finder of FIG. 11. In this regard, it will be recalled that relay TR(15) is operated in series with the corresponding relay TR(7) of the incoming trunk circuit over contact 1 of relay CA(6) when this latter relay is operated in the incoming trunk circuit. Until relay TR(15) operates, relay ST(15) remains locked operated in a circuit extending from battery, through its winding, over contact 7 of relay PW(15), contact 5 of relay H(15), contact 4 of relay TR1(15), to ground over contact 5 of relay ST(15).

In the incoming trunk circuit of FIGS. 6 and 7, when the trunk finder of FIG. 11 applies ground potential through diode 1101, and over the sleeve wiper to the sleeve lead S(1) leading into FIG. 7, this ground extends over conductor S(1) into FIG. 6, over contact 5 of relay ST(6), to battery through the winding of relay CO(6) which thereupon operates. Relay CO(6), in operating, opens at its contact 12 the locking circuit for relay R2(6), which thereupon is allowed to release after a very short interval of time determined by its slow-release characteristic. At the same time that the operation of relay CO(6) causes the de-energization of the winding of relay R2(6), it also opens at its contact 7 the short-circuit existing across the windings of relay R1(6), thereby placing the windings of relay R1(6) and R(7) in series in the tip-ring loop back to the central office, to provide toward the central office the high impedance on-hook signal.

It will be here assumed that immediately prior to this change of signal from the trunk circuit of FIGS. 6 and 7 back to the central office from the low impedance off-hook signal to the high impedance on-hook signal, the calling subscriber S in FIG. 4 has released thereby causing the release of relays S(4) and S1(3), and the hold magnets in the lower left hand portion of FIG. 4. As will be recalled from previous description, this circuit action in the central office of FIGS. 3 and 4 will have caused the timing relay RL of FIG. 3 to have started its fifteen to thirty second time-out period before causing the central office circuitry toward the call distributor to go on-hook. At this time, therefore, we have the incoming trunk of FIGS. 6 and 7 attempting to complete a call to an attendant at the console of FIG. 19 where, for all intents and purposes, the central office is still off-hook but where the calling subscriber is actually no longer connected to the central office circuitry. Meanwhile, in the trunk circuit of FIGS. 6 and 7, relay R2(6) will have released after a very short interval of time, thereby completing an energizing circuit for the winding of relay CA(6) extending in FIG. 6 from battery, through the winding of relay CA(6), over contact 4 of relay R2(6), over contact 1 of relay CO(6), over contact 2 of relay EA(6), through the thermistor B, to ground over contact 3 of relay R3(6). Also, as will be recalled from previous description, thermistor B will initially represent a high impedance to prevent the operation of relay CA(6) but will, under the action of continued current flow therethrough, reduce its impedance in approximately 500 milleseconds to a point where sufficient current will be allowed to flow to cause the operation of relay CA(6). However, under the assumed circumstances, before the end of the 500 millesecond interval necessary to cause the operation of relay CA(6), relays R1(6) and R(7) will have both become released by the complete collapse of the central office circuitry initiated by the immediate release of relay CS(4) under the high impedance on-hook loop signaling condition because of its inability to remain operated on the small amount of current flowing in the tip-ring loop between the control office and the call distributor. With both relays R(7) and R1(6) released, relay R3(6) of FIG. 6 becomes released, to in turn cause the release in FIG. 6 of relay ST(6) and EA(6), leaving operated in the incoming trunk circuit of FIGS. 6 and 7 only relay CO(6), which is held operated in the circuit extending from battery, through its winding, over its contact 5, over the sleeve conductor S(1) into FIG. 11, over the sleeve wiper of the trunk finder, through diode 1101, over contact 7 of relay B(11), contact 9 of relay F(11), contact 3 of relay D(11), contact 2 of the eleventh rotary step switch 11RS, to conductor A(1) extending into the attendant trunk circuit of FIG. 15, to ground over contact 6 of relay ST(15). Also, in the trunk finder of FIG. 11, relay B(11) is held operated in a circuit extending from battery, through its upper winding over its contact 4, over contact 4 of relay D(11), and contact 2 of the switch 11RS, to ground on the A(1) lead into the attendant trunk circuit of FIG. 15; and, relay D(11) is held operated in a circuit extending from battery through its upper winding, over contact 5 of relay B(11), to ground over contact 2 of the vertical off-normal switch VON.

Under these circumstances it is necessary to release the trunk finder of FIG. 11 which is still held connected to the trunk circuit of FIGS. 6 and 7. This release operation is accomplished by causing the operation in FIG. 15 of relay TR1(15) in a circuit extending from ground in FIG. 6, over contact 1 of the released relay R3(6), over contact 3 of the operated relay CO(6), over contact 2 of the unoperated relay CA(6), over conductor R(1) into FIG. 7, thence to the trunk finder of FIG. 11, over contact 1 of relay F(11), over contact 1 of relay B(11), over conductor R(1) into the attendant trunk circuit of FIG. 15, thence over contact 3 of the operated relay ST(15), to battery through the winding of relay TR1(15), which thereupon operates. Relay TR1(15), in operating, opens at its contact 4 the locking circuit for relay ST(15), which thereupon becomes de-energized and will release in a very short interval of time determined by its slow-release characteristic. Upon the release of relay ST(15), relay TR1(15) is released and ground is removed at contact 6 of relay ST(15) from the conductor A(1) extending back into the trunk finder of FIG. 11, thereby to allow relay B(11) to release and to remove ground from the sleeve conductor S(1) extending back into the trunk circuit of FIGS. 6 and 7, thereby to allow relay CO(6) to release. Upon the release in the trunk circuit of FIGS. 6 and 7 of relay CO(6), this trunk circuit is returned to its completely normal condition.

Upon the release in FIG. 11 of relay B(11), a circuit is completed for operating the release magnet RLS(11) of the trunk finder extending from battery in the Tone, Alarm and Register circuit shown in FIG. 11, through the winding of the release magnet RLS(11), over contact 3 of the vertical off-normal switch VON, over contact 3 of relay E(11), contact 6 of relay B(11), contact 2 of relay A(11), to ground over contact 2 of the vertical off-normal switch VON, relay D(11) remaining operated on the ground supplied at contact 2 of relay A(11), as well as from the ground on conductor D(1) extending over the contact of the SCO key in FIG. 11, from contact 4 in FIG. 15 of relay ST(15). Upon the operation of the release magnet RLS(11), the wipers and brushes of the trunk finder of FIG. 11 are caused to return to their completely normal position, thereby releasing the vertical off-normal switch VON and leaving relay D(11) operated through its upper winding to the ground supplied from the attendant trunk circuit over conductor D(1).

In essence, what has happened during the previous description is that just prior to the time when the automatic call distributor would have connected what appears to be a "calling" trunk to an available attendant position, after having been previously routed to a special answer in the form of the prerecorded message supplied from the delayed answer announcement machine of FIG. 9, the automatic call distributor causes the incoming trunk of FIGS. 6 and 7 to transmit to the central office a very short interval of on-hook signaling to ascertain whether or not the calling subscriber S of FIG. 4 has disconnected. Finding that the calling subscriber has disconnected, the incoming trunk of FIGS. 6 and 7 completely collapses and causes the release of the trunk finder FIG. 11, thereby precluding the completion through to the attendant of what appears to be a legitimate call but which has no calling subscriber. In this regard, it will be noted in the incoming trunk circuit of FIGS. 6 and 7 that having detected the disconnection by the calling subscriber S in FIG. 4, and immediately following the release of relay R3(6) causing the de-energization of the winding of relay EA(6), relay EA(6) will delay its release for a short interval of time determined by its slow-release characteristic. During this release time of relay EA(6), a circuit is completed from ground over contact 4 of relay R3(6), over contacts 6 of relay EA(6), to battery through the register in the Abandoned Call Totalizer circuit in the upper central part of FIG. 6, thereby completing a count of at least one call serviced by this particular incoming trunk and which was abandoned after having been connected to a special answer by the delayed answer announcement machine. In effect then, the special calling party disconnect test feature described immediately above has solved two of the vexing problems of traffic and operating personnel in automatic call distributors; namely, a count has been secured of a call abandoned after having been answered by a delayed answer announcement machine and the completion of an abandoned call has been prevented so as not to bother attendants with unnecessary work.

*Trunk finder shower*

It will be recalled, in connection with the previous description of the operation of the common group circuitry of FIGS. 12, 13 and 14, that there may be more than one relay G1(14) through G6(14) operated indicating that more than one trunk is already inside of the trunk gate waiting to be served and that each of these trunk circuits already inside the trunk gate will maintain operated in FIG. 12 relay ST(12). Assuming that there are attendant trunk-trunk finder combinations available to serve these calls, relays CH(14) and S(14) will be operated in FIG. 14. Relay CP(12) in FIG. 12 will have been operated at the instant that the trunk gate closed, assuming that there are trunk finders such as the one in FIG. 11 available to serve these incoming calls. The operation of relay CP(12) initiates a series of relay timing operations consisting of relays SO(12), SO1(12) and SX(12), which period of time if allowed to persist long enough (some twenty-five to thirty seconds), will eventually result in the operation of relay TO(12) as an indication that too long a period of time has elapsed with trunk finders available and calling trunks not served.

The operation of relay TO(12) causes the operation in FIG. 12 in an obvious circuit of relay TO1(12). The operation of these two relays initiates what has been referred to hereinbefore as a trunk finder "shower." Under these circumstances, the operation of relay TO(12) causes the operation of relays SA(13) and SAA(13) in respective circuits extending from ground in FIG. 12, over contacts 1 and 2 of relay TO(12), over conductors 1202 and 1203 into FIG. 13, to battery through the windings of relays SA(13) and SAA(13) causing these relays to operate. The operation in FIG. 13 of relays SA(13) and SAA(13) causes the release of relays TG(13) and BS(13), thereby opening the trunk gate and allowing all waiting trunk calls to enter the trunk gate. Also the operation of relay TO(12) causes the operation in FIG. 13 of relays C1(13) and C1A(13) in respective circuits extending from ground in FIG. 12, over respective contacts 5 and 8 of relay TO(12), over conductors 1204 and 1205 into FIG. 13, to battery through the respective windings of relays C1(13) and C1A(13). The operation of relays C1(13) and C1A(13) causes the release in FIG. 14 of relay PG(14), thereby opening the position gate and allowing all available attendant-trunk console combinations to enter the position gate. Simultaneously with these operations, the operation of relay TO1(12) connects together through its contacts 1 through 5 all of the start leads ST(1) through ST(6) of FIG. 14, and extends ground in FIG. 12 on lead BCO1, over contact 1 of relay CP(12), over contact 6 of relay TO(12), over conductor 1206 into FIG. 13, through FIG. 13 into FIG. 14, to the armatures of all of the relays G1(14) through G6(14) such that any trunk which is inside the gate waiting for a call, and has its corresponding G1(14) through G6(14) relay operated, will extend the ground on conductor 1206 to all of the start leads simultaneously, thereby causing all available trunk finders to immediately start hunting for trunks in a "shower" of trunk finders.

If all trunk circuits have been dealt with, relay ST(12) will become released in FIG. 12, thereby causing the release in FIG. 13 of relay CW(13) which in turn will cause the release of relay CP(12), to in turn release all of the relays SO(12), SO1(12), SX(12), TO(12), and TO1(12), to revert the circuitry of FIGS. 12, 13 and 14 to its normal condition where the trunk gate will again accept calls. On the other hand, if all of the attendant trunk-console pairs have been brought into operation to serve calling trunks before the shower is over with, relays CH(14) and S(14) in FIG. 14 will become released, thereby causing the operation in FIG. 13, all as has been described in detail hereinbefore, of relays SR1(13) and SR2(13) to in turn cause the release in FIG. 13 of relays DA(13) and DA1(13) to thereby release relay CP(12) of FIG. 12 to accomplish the same reversion. Upon the release of relay CP(12) in FIG. 12, the trunk and position gates (relays TG(13) and PG(14) of FIGS. 13 and 14) will again continue to function normally to admit trunks to the trunk gate when all of the trunks therein have been dealt with and to admit console positions to the position gate as soon as all of those inside the gate have been utilized in accepting calls.

It is to be understood that the above-described arrangements are illustrative of the application of the principles of the invention. Numerous other arrangements may be devised by those skilled in the art without departing from the spirit and scope of the invention.

What is claimed is:

1. In an automatic switching system wherein a calling condition at the calling end of a trunk is effective to cause said trunk to be regularly answered by connecting the answering end thereof to an available attendant position, wherein a prescribed amount of delay in effecting an attendant connection causes a calling trunk to be specially answered by temporarily connecting the answering end thereof to a delayed answer announcement circuit, and wherein the answering end of a specially answered calling trunk is subsequently connectable to an available attendant position:

(A) means in said trunk for indicating whether or not said trunk is in a calling condition and whether or not a said calling trunk has been specially answered;

(B) signaling means in said trunk selectively controllable by said indicating means (1) to apply an on-hook signal to the calling end of a said unanswered calling trunk and (2) to apply an off-hook signal to the calling end of a said specially answered calling trunk;

(C) means for signifying availability and unavailability of an attendant position; and, (D) means controlled by said signifying means and by said indicating means to connect the answering end of a said specially answered calling trunk to an available position;

(1) timing means for causing said signaling means of said specially answered calling trunk to change said off-hook signal to an on-hook signal for a prescribed time duration and (2) switching apparatus controlled by said timing means to connect the answering end of said specially answered trunk to an available position at the end of said time duration provided said specially answered trunk remains in a calling condition throughout said time duration.

2. The invention defined in claim 1

(A) wherein the calling end of said trunk comprises at least two conductors extending therefrom;

(B) wherein said signaling means comprises (1) a variable impedance bridging said two conductors and (2) impedance control means selectively controllable (a) to vary said impedance to one value representing an on-hook signal and (b) to vary said impedance to another value representing an off-hook signal; and, (C) wherein said timing means controls said impedance control means to vary said impedance from said other value to said one value during said time duration.

3. The invention defined in claim 2

(A) wherein said variable impedance comprises an impedance network having distributed series impedance;

(B) wherein said impedance control means comprises switch means for at times short-circuiting part of said series impedance; and, (C) wherein said switch means is controlled by said indicating means and by said timing means.

4. In an automatic switching system wherein a calling condition at the calling end of a trunk is effective to cause said trunk to be regularly answered by connecting the answering end thereof to an available attendant position, wherein a prescribed amount of delay in effecting an attendant connection causes a calling trunk to be specially answered by temporarily connecting the answering end thereof to a delayed answer announcement circuit, and wherein the answering end of a specially answered calling trunk is subsequently connectable to an available attendant position:

(A) the calling end of said trunk comprising at least two conductors extending therefrom;

(B) detecting means in said trunk for detecting whether or not said trunk is in a calling condition, said detecting means comprising a plurality of detecting relays, each detecting relay having energizing winding means of prescribed impedance, said winding means arranged in series, and said series arrangement of winding means bridging said two conductors;

(C) denoting means in said trunk controlled by said detecting means for denoting whether or not a said calling trunk has been specially answered;

(D) impedance control means in said trunk selectively controllable (1) in one manner to short-circuit part of said series winding means thereby to provide across said two conductors a relatively low impedance off-hook bridge signal and (2) in another manner to allow all of said series windings to provide across said two conductors a relatively high impedance on-hook bridge signal;

(E) said impedance control means controlled by said denoting means (1) in said one manner to provide an on-hook bridge in a said unanswered calling trunk and (2) in said other manner to provide an off-hook bridge in a said specially answered calling trunk;

(F) means for signifying availability and unavailability of an attendant position; and, (G) connecting means controlled by said signifying means and by said detecting means and by said denoting means to connect the answering end of a said specially answered calling trunk to an available attendant position;

(H) said connecting means comprising (1) timing means for measuring a prescribed time duration, (2) said impedance control means controlled by said timing means to change said off-hook bridge to an on-hook bridge while said time duration is being measured, and (3) switching apparatus controlled by said timing means to connect the answering end of said specially answered trunk to an available position at the end of said time duration provided said specially answered trunk remains in a calling condition throughout said time duration.

5. The invention defined in claim 4

(A) wherein said denoting means comprises at least one denoting relay controlled by said detecting relays;
(B) wherein said timing means comprises at least one timing control relay; and,
(C) wherein said impedance control means comprises relay contacts controlled by said denoting relay and by said timing control relay.

6. The invention defined in claim 5
(A) wherein two said detecting relays are provided, at least one of said detecting relays having two windings, the winding means of the other said detecting relay being in series between said two windings; and,
(B) wherein said relay contacts controlled by said denoting relay and by said timing control relay are arranged to at times short-circuit the impedance represented by the winding means of said other detecting relay.

7. The invention defined in claim 6
(A) wherein said two windings represent a relatively low impedance; and,
(B) wherein said winding means of said other detecting relay represents a relatively high impedance;
(C) whereby whenever said relay contacts short circuit said high impedance, only the said low impedance remains bridging said two conductors as an off-hook signal; and,
(D) whereby whenever said relay contacts remove the short circuit from said high impedance, the said high and low impedances remain in series bridging said two conductors as an on-hook signal.

8. The invention defined in claim 7
(A) wherein said two windings of said one detecting relay are both of relatively low impedance;
(B) wherein said winding means of said other detecting relay comprises two windings each of relatively high impedance;
(C) wherein at least one of said two detecting relays is operated whenever a calling condition at the calling end of said trunk energizes the winding thereof; and,
(D) wherein said denoting relay is operated under the control of said one operated detecting relay.

9. The invention defined in claim 8
(A) wherein whenever said relay contacts remove the short circuit from said high impedance windings, only the said other detecting relay operates to detect a calling condition;
(B) wherein whenever said relay contacts short circuit said high impedance windings, only the said one detecting relay operates to detect a calling condition;
(C) wherein no said detecting relay operates in the absence of a calling condition; and,
(D) wherein said denoting relay is operated under the control of any operated detecting relay.

10. The invention defined in claim 9 wherein said switching apparatus is controlled by said timing means and by said detecting relays to connect the answering end of said trunk to an available attendant position provided said other detecting relay remains operated throughout said time duration.

11. The invention defined in claim 10
(A) wherein operable registering means is provided for registering calls abandoned after delayed answer announcement; and,
(B) wherein said registering means is operated under the control of said detecting relays and of said operated denoting relay whenever both of said detecting relays are released prior to the end of said time duration.

12. In an automatic switching system wherein responsive to a calling condition at the calling end of an incoming trunk the answering end thereof is temporarily connected to a special answering circuit for a special answer upon unavailability of a regular answering circuit and wherein the answering end of said specially answered calling trunk is subsequently connectable to an available regular circuit for a regular answer:
(A) signaling means in said trunk
(1) settable in an on-hook condition to apply to the calling end thereof an on-hook signal indicating that said trunk is unanswered and
(2) settable in an off-hook condition to apply to said calling end an off-hook signal indicating that said trunk is answered;
(B) means to signify availability and unavailability of a regular answering circuit; and,
(C) connecting means controlled by said signifying means upon availability of a regular circuit
(1) to change the setting of the signaling means of a specially answered calling trunk from an off-hook condition to an on-hook condition for a prescribed time duration and
(2) to cause said specially answered trunk to be regularly answered at the end of said duration, by connecting the answering end thereof to said available regular circuit, provided said specially answered trunk remains in a calling condition throughout said duration.

13. The invention defined in claim 12
(A) wherein the calling end of said trunk comprises at least two conductors extending therefrom;
(B) wherein said signaling means comprises
(1) a variable impedance bridging said two conductors and
(2) impedance control means selectively controllable
(a) to vary said impedance to one value representing an on-hook signal and
(b) to vary said impedance to another value representing an off-hook signal; and,
(C) wherein said connecting means controls said impedance control means to vary said impedance from said other value to said one value during said time duration.

14. The invention defined in claim 13
(A) wherein said variable impedance comprises an impedance network having distributed series impedance;
(B) wherein said impedance control means comprises switch means for at times short-circuiting part of said series impedance; and,
(C) wherein said switch means is controlled by said connecting means.

15. An automatic switching system comprising:
(A) a plurality of incoming trunks each having
(1) a calling end,
(2) an answering end,
(3) means responsive to a calling signal incoming to the calling end thereof to detect that said trunk is a calling trunk, and
(4) signaling means
(a) settable in an on-hook condition to apply to said calling end an on-hook signal indicating that said trunk is unanswered and
(b) settable in an off-hook condition to apply to said calling end an off-hook signal indicating that said trunk is answered;
(B) a plurality of regular answering circuits;
(C) a special answering circuit;
(D) means controlled by said regular circuits to signify availability and unavailability of a regular circuit;
(E) special connecting means controlled by said detecting means and by said signifying means upon unavailability of a regular circuit
(1) to cause a calling trunk to be specially answered by connecting the answering end thereof to said special circuit, (2) to change the setting of the signaling means of said specially answered trunk from an on-hook condition to an off-hook condition, and (3) to cause said specially answered trunk to be returned to a calling condition by disconnecting the answering end thereof from said special circuit; and, (F) regular connecting means controlled by said detecting means and by said signifying means upon availability of a regular circuit (1) to change the setting of the signaling means of a specially answered calling trunk from an off-hook condition to an on-hook condition for a prescribed time duration and (2) to cause said specially answered trunk to be regularly answered at the end of said duration, by connecting the answering end thereof to an available regular circuit, provided said specially answered trunk remains in a calling condition throughout said duration.

16. The invention defined in claim 15

(A) wherein the calling end of said trunk comprises at least two conductors extending therefrom;

(B) wherein said signaling means comprises (1) a variable impedance bridging said two conductors and (2) impedance control means selectively controllable (a) to vary said impedance to one value representing an on-hook signal and (b) to vary said impedance to another value representing an off-hook signal; and, (C) wherein said regular connecting means controls said impedance control means to vary said impedance from said other value to said one value during said time duration.

17. The invention defined in claim 16

(A) wherein said variable impedance comprises an impedance network having distributed series impedance;

(B) wherein said impedance control means comprises switch means for at times short-circuiting part of said series impedance; and, (C) wherein said switch means is controlled by said regular connecting means.

18. The invention defined in claim 17

(A) wherein said detecting means comprises a plurality of detecting relays, each detecting relay having energizing winding means of prescribed impedance, said winding means arranged in series, and said series arrangement of winding means bridging said two conductors;

(B) wherein said impedance network comprises the said series arrangement of impedance winding means bridging said two conductors;

(C) wherein said switch means is selectively controllable (1) in one manner to short-circuit part of said series winding means thereby to provide across said two conductors a relatively low impedance off-hook bridge signal and (2) in another manner to allow all of said series windings to provide across said two conductors a relatively high impedance on-hook bridge signal; and, (D) wherein said switch means is controlled in said other manner by said regular connecting means during the said time duration.

19. In an automatic switching system wherein a calling signal incoming at the calling end of a trunk is effective to cause said trunk to be regularly answered by connecting the answering end thereof to an available attendant position, wherein a prescribed amount of delay in effecting an attendant connection causes a calling trunk to be specially answered by temporarily connecting the answering end thereof to a delayed answer announcement machine, and wherein the answering end of a specially answered calling trunk is subsequently connectable to an available attendant position:

(A) the calling end of said trunk comprising two conductors for receiving said calling signal;

(B) two detecting relays in said trunk, a first said detecting relay having energizing winding means of relatively high impedance, the second said detecting relay having energizing winding means of relatively low impedance, said winding means arranged in series bridging said two conductors, said detecting relays responsive to energization by said calling signal such that only said first detecting relay is operated whenever the winding means of both of said detecting relays are energized in series across said two conductors and such that only said second detecting relay is operated whenever the winding means of said second detecting relay is energized in series with a short-circuited winding means of said first detecting relay, said two detecting relays being released whenever the winding means thereof are de-energized due to the absence of a calling signal;

(C) a special answer denoting relay in said trunk controlled by said detecting relays (1) to be released whenever any said detecting relay is operated in an unanswered calling trunk and (2) to be operated whenever any said detecting relay is operated in a specially answered calling trunk;

(D) contact means (1) controlled by said operated denoting relay to short-circuit said winding means of said first detecting relay thereby to provide across said two conductors a relatively low impedance off-hook bridge signal in a said specially answered calling trunk and (2) controlled by said released denoting relay to remove said short-circuit thereby to provide across said two conductors a relatively high impedance on-hook signal in a said unanswered calling trunk;

(E) means for signifying availability and unavailability of an attendant position; and, (F) connecting means controlled by said signifying means and by said denoting means and by said detecting means to connect the answering end of a said specially answered calling trunk to an available attendant position;

(G) said connecting means comprising (1) start means for starting said connecting function, (2) timing means controlled by said start means for measuring a prescribed time duration from the start of said connecting function, (3) means controlled by said start means for removing said short-circuit while said time duration is being measured, and (4) switching apparatus controlled by said timing means and by said detecting relays to complete said connection, by connecting the answering end of said specially answered trunk to an available position, at the end of said time duration provided said specially answered trunk remains in a calling condition throughout said time duration.

20. The invention defined in claim 19

(A) wherein said start means comprises a start relay in said trunk operable to start said connecting function;

(B) wherein are provided front and back contacts controlled by said start relay;

(C) wherein said denoting relay contact means comprises front and back contacts controlled by said denoting relay;

(D) wherein a front contact of said denoting relay and a back contact of said start relay are in series in shunt of the winding means of said first detecting relay; and, (E) wherein said timing means is controlled by a make contact of said start relay.

References Cited

UNITED STATES PATENTS

| | | | |
|---|---|---|---|
| 2,922,847 | 1/1960 | Dunning | 179—27.1 |
| 2,925,472 | 2/1960 | Pharis | 179—6 |
| 3,003,033 | 10/1961 | Kuksa | 179—6 |
| 3,090,835 | 5/1963 | Kroning et al. | 179—6 |
| 3,111,561 | 11/1963 | Dunning | 179—27 |
| 3,176,082 | 3/1965 | Nilsson | 179—18.03 |

KATHLEEN H. CLAFFY, *Primary Examiner.*

L. A. WRIGHT, *Assistant Examiner.*

UNITED STATES PATENT OFFICE
CERTIFICATE OF CORRECTION

Patent No. 3,335,231 August 8, 1967

Preston R. Gray et al.

It is hereby certified that error appears in the above numbered patent requiring correction and that the said Letters Patent should read as corrected below.

Column 45, after line 55, insert the following:

(E) said connecting means comprising

Signed and sealed this 24th day of September 1968.

(SEAL)
Attest:

Edward M. Fletcher, Jr.
Attesting Officer

EDWARD J. BRENNER
Commissioner of Patents